US012715092B2

(12) United States Patent
Hietpas et al.

(10) Patent No.: US 12,715,092 B2
(45) Date of Patent: Aug. 25, 2026

(54) DUPLEX NAILER, MAGAZINE, AND DUPLEX NAIL FOR THE SAME

(71) Applicant: MILWAUKEE ELECTRIC TOOL CORPORATION, Brookfield, WI (US)

(72) Inventors: Logan M. Hietpas, Glendale, WI (US); Marcus Wechselberger, Milwaukee, WI (US); David A. Bierdeman, New Berlin, WI (US); Jeremy J. Keifenheim, West Bend, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 0 days.

(21) Appl. No.: 18/693,723

(22) PCT Filed: Nov. 23, 2022

(86) PCT No.: PCT/US2022/080424
§ 371 (c)(1),
(2) Date: Mar. 20, 2024

(87) PCT Pub. No.: WO2023/097272
PCT Pub. Date: Jun. 1, 2023

(65) Prior Publication Data

US 2024/0391075 A1 Nov. 28, 2024

Related U.S. Application Data

(60) Provisional application No. 63/395,206, filed on Aug. 4, 2022, provisional application No. 63/355,038, filed
(Continued)

(51) Int. Cl.

| | |
|---|---|
| ***B25C 1/00*** | (2006.01) |
| ***B25C 1/04*** | (2006.01) |
| ***B25C 1/06*** | (2006.01) |

(52) U.S. Cl.
CPC .............. *B25C 1/005* (2013.01); *B25C 1/047* (2013.01); *B25C 1/06* (2013.01)

(58) Field of Classification Search
CPC ........... B25C 1/005; B25C 1/047; B25C 1/06; B25C 5/1658; B25C 1/184; B25C 5/1665; B25C 5/1668; B25C 1/003; B25C 1/008
See application file for complete search history.

(56) References Cited

U.S. PATENT DOCUMENTS

| | | | |
|---|---|---|---|
| 1,160,191 | A | 11/1915 | Neider |
| 1,242,924 | A | 10/1917 | Collings |

(Continued)

FOREIGN PATENT DOCUMENTS

| | | | |
|---|---|---|---|
| CN | 2141482 | Y | 9/1993 |
| CN | 2431433 | Y | 5/2001 |

(Continued)

OTHER PUBLICATIONS

International Search Report and Written Opinion for Application No. PCT/US2022/080424 dated Mar. 31, 2023 (17 pages).

*Primary Examiner* — Veronica Martin
(74) *Attorney, Agent, or Firm* — Michael Best & Friedrich LLP

(57) ABSTRACT

A powered fastener driver configured to drive fasteners having a first head and a second head and including a magazine assembly configured to receive the fasteners and a nosepiece assembly including a channel from which consecutive fasteners from the magazine assembly are driven.

20 Claims, 59 Drawing Sheets

Related U.S. Application Data on Jun. 23, 2022, provisional application No. 63/303,367, filed on Jan. 26, 2022, provisional application No. 63/282,892, filed on Nov. 24, 2021.

(56) References Cited

U.S. PATENT DOCUMENTS

| | | | | |
|---|---|---|---|---|
| 1,705,371 | A | 3/1929 | Mehlman | |
| 1,751,800 | A | 3/1930 | Dickson | |
| 2,874,603 | A | 2/1959 | Boettcher | |
| 3,060,440 | A | 10/1962 | Pfaff et al. | |
| 3,096,680 | A | 7/1963 | Dudgeon | |
| 3,099,108 | A | 7/1963 | Kalkbrenner | |
| 3,342,659 | A | 9/1967 | Baum et al. | |
| 4,162,728 | A | 7/1979 | Uzumcu et al. | |
| 4,679,975 | A | 7/1987 | Leistner | |
| D300,508 | S | 4/1989 | Viening | |
| 4,913,611 | A | 4/1990 | Leistner | |
| D309,703 | S | 8/1990 | Walker | |
| 5,011,354 | A | 4/1991 | Brownlee | |
| D357,855 | S | 5/1995 | Keith et al. | |
| 5,588,788 | A | 12/1996 | Dominguez | |
| 5,755,545 | A | 5/1998 | Banks | |
| 5,897,279 | A | 4/1999 | Bentley et al. | |
| 6,062,789 | A | 5/2000 | Pope | |
| 6,758,018 | B2 | 7/2004 | Sutt, Jr. | |
| D564,345 | S | 3/2008 | Prada | |
| D604,153 | S | 11/2009 | Wantz | |
| 7,788,787 | B2 | 9/2010 | Shelton et al. | |
| 8,033,005 | B1 | 10/2011 | Heskel et al. | |
| 8,251,686 | B1 | 8/2012 | Heskel et al. | |
| 8,333,538 | B2 | 12/2012 | Shelton et al. | |
| D679,540 | S | 4/2013 | Eaton | |
| 9,573,260 | B2 | 2/2017 | Walters, Jr. et al. | |
| 11,655,838 | B2 | 5/2023 | Hollenbeck | |
| 2006/0067805 | A1 | 3/2006 | Reed | |
| 2008/0251567 | A1 | 10/2008 | Shkolnikov et al. | |
| 2014/0331474 | A1* | 11/2014 | Walters, Jr. | B25C 1/005 227/127 |
| 2017/0232806 | A1* | 8/2017 | Sakamoto | B60C 19/00 152/152.1 |
| 2019/0039219 | A1 | 2/2019 | Suarez | |
| 2020/0114500 | A1 | 4/2020 | Bierdeman et al. | |
| 2020/0398414 | A1* | 12/2020 | Peng | B25C 1/188 |
| 2022/0176532 | A1* | 6/2022 | Nakajima | B25C 1/188 |
| 2023/0001559 | A1 | 1/2023 | Chen | |

FOREIGN PATENT DOCUMENTS

| | | | |
|---|---|---|---|
| CN | 2466413 | Y | 12/2001 |
| CN | 2613634 | Y | 4/2004 |
| CN | 201129339 | Y | 10/2008 |
| CN | 201598829 | U | 10/2010 |
| CN | 202194910 | U | 4/2012 |
| CN | 104712632 | A | 6/2015 |
| CN | 104712633 | A | 6/2015 |
| CN | 207005032 | U | 2/2018 |
| CN | 207278655 | U | 4/2018 |
| CN | 207647933 | U | 7/2018 |
| CN | 209638183 | U | 11/2019 |
| CN | 308689045 | S | 6/2024 |
| DE | 2843446 | A1 | 4/1980 |
| DE | 202020003119 | U1 | 8/2020 |
| EM | 009030265-0002 | | 11/2022 |
| GB | 6208314 | | 11/2022 |
| WO | 2016015489 | A1 | 2/2016 |

* cited by examiner

DUPLEX NAILER, MAGAZINE, AND DUPLEX NAIL FOR THE SAME

CROSS-REFERENCE TO RELATED APPLICATIONS

This application is a national stage filing under 35 U.S.C. § 371 of International Application No. PCT/US2022/080424 filed on Nov. 23, 2022, which claims priority to U.S. Provisional Patent Application No. 63/395,206 filed on Aug. 4, 2022, U.S. Provisional Patent Application No. 63/355,038 filed on Jun. 23, 2022, U.S. Provisional Patent Application No. 63/303,367 filed on Jan. 26, 2022, U.S. Provisional Patent Application No. 63/282,892 filed on Nov. 24, 2021, the entire contents of each of which is incorporated herein by reference.

BACKGROUND OF THE INVENTION

The present invention relates to a duplex nailer including a magazine, and fasteners for the duplex nailer.

Existing nails are used to hold structures together. Some nails are duplex nails with a first head on an end of the nail, and a second head that is spaced inward on the nail. These types of nails are used to temporarily hold structures together and only penetrate the structure up to the second head. This allows removal of the nail from the structure via the first head. Nails can be collated and used with a powered nailer.

SUMMARY OF THE INVENTION

The invention provides, in one aspect, a fastening device including a magazine that has an end cap channel with a first compartment interconnected with and spaced from a second compartment by a connector compartment. The first compartment and the second compartment cooperatively configured to receive a portion of a fastener. A distance is defined between the first compartment and the second compartment, and the first and second compartments and the distance cooperate to define a parameter of the fastener that is receivable in the magazine.

The invention provides, in another aspect, a fastening device including a fastener and a magazine. The fastener has a body with a tip and a second end opposite the tip, a first head positioned at the second end, and a second head positioned between the first end and the second end. The magazine has an end cap channel with a first compartment interconnected with and spaced from a second compartment by a connector compartment. The first compartment is configured to receive the first head and the second compartment is configured to receive the second head. A first distance is defined between the first head and the second head, and a second distance is defined between the first compartment and the second compartment. The second distance is the same as the first distance and limits at least one parameter of the fastener that is receivable in the magazine.

The invention provides, in another aspect, a fastening device including a fastener and a magazine. The fastener has a body with a tip and a second end opposite the tip, a first head positioned at the second end, and a second head positioned between the first end and the second end. The magazine has an end cap channel with a first compartment and a second compartment that are connected via a connector compartment. The first head is received in the first compartment and the second head is received in the second compartment.

The invention provides, in another aspect, a magazine for a fastening device including a magazine channel that has a rectangular cross-sectional shape to receive a fastener, a slot interconnected with the magazine channel to receive the fastener, and an end cap that has an end cap channel. The end cap being positioned opposite the slot. The end cap channel has a first compartment and a second compartment that are connected via a connector compartment. Each of the first compartment and the second compartment has a first width, and the connector compartment has a second width that is smaller than the first width.

The invention provides, in another aspect, a fastener for a fastening device. The fastener includes a body that has a tip and a second end opposite the tip, a first head positioned at the second end, and a second head positioned between the first end and the second end and spaced from the first head. The body defines an elongated axis of the fastener. The first head has a first shape and the second head has a second shape in cross-section across the elongated axis.

The invention provides, in another aspect, a powered fastener driver including a magazine assembly configured to receive fasteners, a nosepiece assembly including a channel from which consecutive fasteners from the magazine assembly are driven along a driving axis, the nosepiece assembly including a base portion coupled to the magazine assembly and a cover portion pivotally coupled to the base portion, the base portion and the cover portion cooperatively defining the channel, the cover portion including a dry-fire lockout link pivotally coupled thereto, the dry-fire lockout link including a first end on a first side of the nosepiece assembly and a second end on an opposite side of the nosepiece assembly, a pusher assembly slidably coupled to the magazine assembly, the pusher assembly configured to bias the fasteners within the magazine assembly toward the channel, the pusher assembly including a pusher body positioned on the first side of the nosepiece assembly, and a dry-fire lockout extension coupled to the pusher body, and a workpiece contact assembly movable relative to the nosepiece assembly between an extended position and a retracted position, wherein, in a first position of the dry-fire lockout extension is spaced apart from the first end of the dry-fire lockout link such that the second end of the dry-fire lockout link is in an unblocked position in which the second end is spaced apart from a path of movement of the workpiece contact assembly thereby allowing movement of the workpiece contact assembly, and wherein in a second position of the dry-fire lockout extension engages the first end of the dry-fire lockout link such that the second end of the dry-fire lockout link is in a blocked position in which the second end is positioned in the path of movement of the workpiece contact assembly thereby blocking movement of the workpiece contact assembly.

The invention provides, in another aspect, a powered fastener driver including a magazine assembly configured to receive fasteners, and a nosepiece assembly including a channel from which consecutive fasteners from the magazine assembly are driven, the nosepiece assembly including a base portion coupled to the magazine assembly and a cover portion pivotally coupled to the base portion, the base portion and the cover portion cooperatively defining the channel, the cover portion including a recess that extends generally parallel to the channel.

The invention provides, in another aspect, a magazine for a fastening device including a wall that defines a magazine channel including a rectangular cross-sectional shape, the magazine channel configured to receive a fastener, a slot interconnected with the magazine channel and configured to receive the fastener, the slot defined by a first surface of the wall and a second surface of the wall, the first surface being in a first plane that is parallel to an axis of the fastener and the second surface being in a second plane that is at a non-parallel angle relative to the axis of the fastener, and an end cap including an end cap channel in communication with the slot.

The invention provides, in another aspect, a powered fastener driver including a housing, a storage chamber cylinder positioned within the housing, a cylinder at least partially positioned within the storage chamber cylinder, a frame positioned within the housing and configured to close the cylinder, a piston movable within the cylinder from a top-dead-center (TDC) position to a driven or bottom-dead-center (BDC) position, a driver blade attached to the piston for movement therewith along a driving axis from the TDC position toward the BDC position for driving a fastener into a workpiece, a lifter operable to move the piston and driver blade from the BDC position toward the TDC position, a drive unit operably coupled to the lifter to provide torque thereto, causing the lifter to rotate, and a bumper supported between the housing and the cylinder, the bumper including a cylindrical portion and a flange positioned at an end of the cylindrical portion, the cylindrical portion configured to positioned on a first outer surface of the cylinder and the flange configured to be positioned on a second outer surface of the cylinder, at least a portion of the cylindrical portion being in contact with the housing and at least a portion of the flange being in contact with the housing.

The invention provides, in another aspect, a powered fastener driver including a housing, a storage chamber cylinder positioned within the housing, a cylinder at least partially positioned within the storage chamber cylinder, a frame positioned within the housing and configured to close the cylinder, a piston movable within the cylinder from a top-dead-center (TDC) position to a driven or bottom-dead-center (BDC) position, a driver blade attached to the piston for movement therewith along a driving axis from the TDC position toward the BDC position for driving a fastener into a workpiece, a lifter operable to move the piston and driver blade from the BDC position toward the TDC position, a drive unit operably coupled to the lifter to provide torque thereto, causing the lifter to rotate, and a bumper supported between the housing and both the storage chamber cylinder and the cylinder, the bumper including a cylindrical portion and a flange positioned at an end of the cylindrical portion, the cylindrical portion configured to positioned on a first outer surface of an outer wall of the storage chamber cylinder and the flange configured to be positioned on both a second outer surface of the outer wall and an outer surface of the cylinder.

The invention provides, in another aspect, a powered fastener driver including a housing, a storage chamber cylinder positioned within the housing, a cylinder at least partially positioned within the storage chamber cylinder, a frame positioned within the housing and configured to close the cylinder, a piston movable within the cylinder from a top-dead-center (TDC) position to a driven or bottom-dead-center (BDC) position, a driver blade attached to the piston for movement therewith along a driving axis from the TDC position toward the BDC position for driving a fastener into a workpiece, a lifter operable to move the piston and driver blade from the BDC position toward the TDC position, a drive unit operably coupled to the lifter to provide torque thereto, causing the lifter to rotate; and a bumper supported between the housing and the frame, the bumper having an interface that is complementary to a recess of the housing. In some aspects the recess is formed from a material that is different than the material of the housing.

The invention provides, in another aspect, a powered fastener driver including a magazine assembly configured to receive fasteners and including a first end and a second end opposite the first end, a plurality of dampeners coupled to the second end of the magazine assembly, and a nosepiece assembly including a channel from which consecutive fasteners from the magazine assembly are driven, the nosepiece assembly including a base portion movably coupled to the magazine assembly and a cover portion pivotally coupled to the base portion, the base portion and the cover portion cooperatively defining the channel, wherein the dampeners are positioned between the base portion and the magazine assembly to reduce vibration therebetween.

The invention provides, in another aspect, a powered fastener driver including a housing, a magazine assembly configured to receive fasteners, a nosepiece assembly including a channel from which consecutive fasteners from the magazine assembly are driven, the nosepiece assembly including a base portion coupled to the magazine assembly and a cover portion pivotally coupled to the base portion, the base portion and the cover portion cooperatively defining the channel, the cover portion including a dry-fire lockout link pivotally coupled thereto, the base portion including a first side and a second side opposite the first side, a cylinder within the housing, a piston movable within the cylinder from a top-dead-center (TDC) position to a driven or bottom-dead-center (BDC) position, a driver blade attached to the piston for movement therewith along a driving axis from the TDC position toward the BDC position for driving a fastener into a workpiece, the driver blade movable within the channel, a lifter operable to move the piston and driver blade from the BDC position toward the TDC position, a drive unit operably coupled to the lifter to provide torque thereto, causing the lifter to rotate, and a workpiece contact assembly coupled to the housing and movable from an extended position to a retracted position in response to contact with a workpiece, the workpiece contact assembly including a first section that is coupled to a second section, the second section including a first portion configured to slide relative to the first side of the base portion, a second portion configured to slide relative to the second side of the base portion, a connecting portion connecting the first portion and the second portion, the connecting portion overlapping at least a portion of the nosepiece assembly in a forward direction and a downward direction, and a plurality of tabs configured to contact the workpiece, at least one tab extending from each of the first portion, the second portion, and the connecting portion. In some aspects, the base portion includes a first slot extending along the first side and a second slot extending along the second side, each of the first slot and the second slot extending parallel to the channel, and the first portion includes a projection configured to be received in the first slot and the second portion including a projection configured to be received in the second slot.

Figure 1:
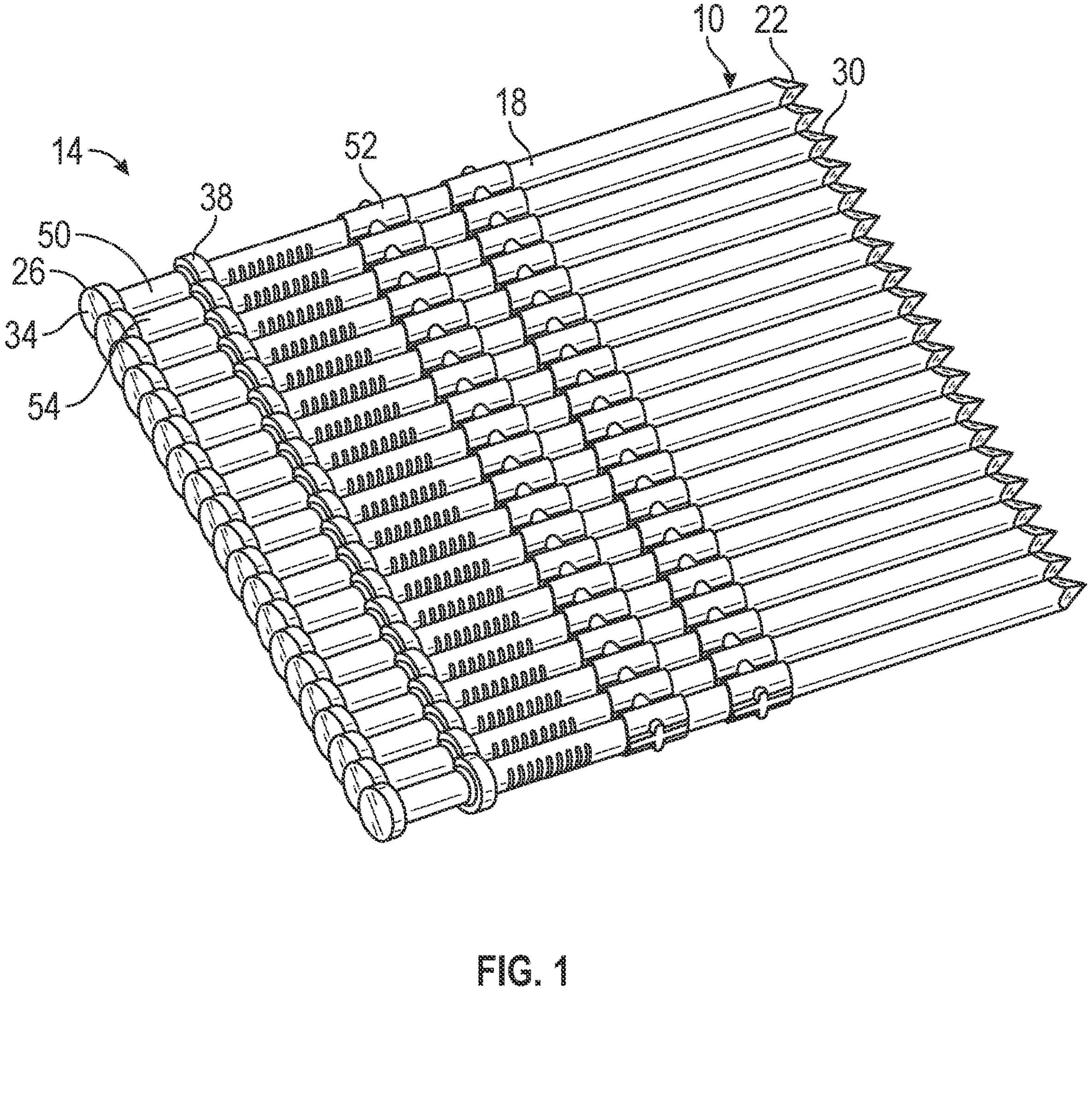
FIG. 1 is a perspective view of a collated strip of nails.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

FIGS. 1-6 illustrate duplex nails 10 that can be used with a powered impact or nailer device (e.g., powered by a battery pack, etc.) to secure an item to a workpiece. A plurality of the nails 10 may be secured together to form collated nails 14. The collated nails 14 may be positioned within a magazine of the nailer device for firing the nails 10 into the workpiece. The nail 10 may be used to secure a first workpiece (e.g., a first beam) to a second workpiece (e.g., a second beam).

With reference to FIGS. 1-3 and 5, the nail 10 includes a body 18 having a first end or tip 22 and a second, opposite end 26. The body 18 has a round cross-sectional shape, although the body may have another cross-sectional shape (e.g., rectangular, oval, etc.). A point or tip 30 is disposed at the first end 22 and is configured to be driven into the workpiece (e.g., during a firing operation of the nail device or manual impact by a hammer). The illustrated point 30 has a chamfered-conical profile.

Figure 2:
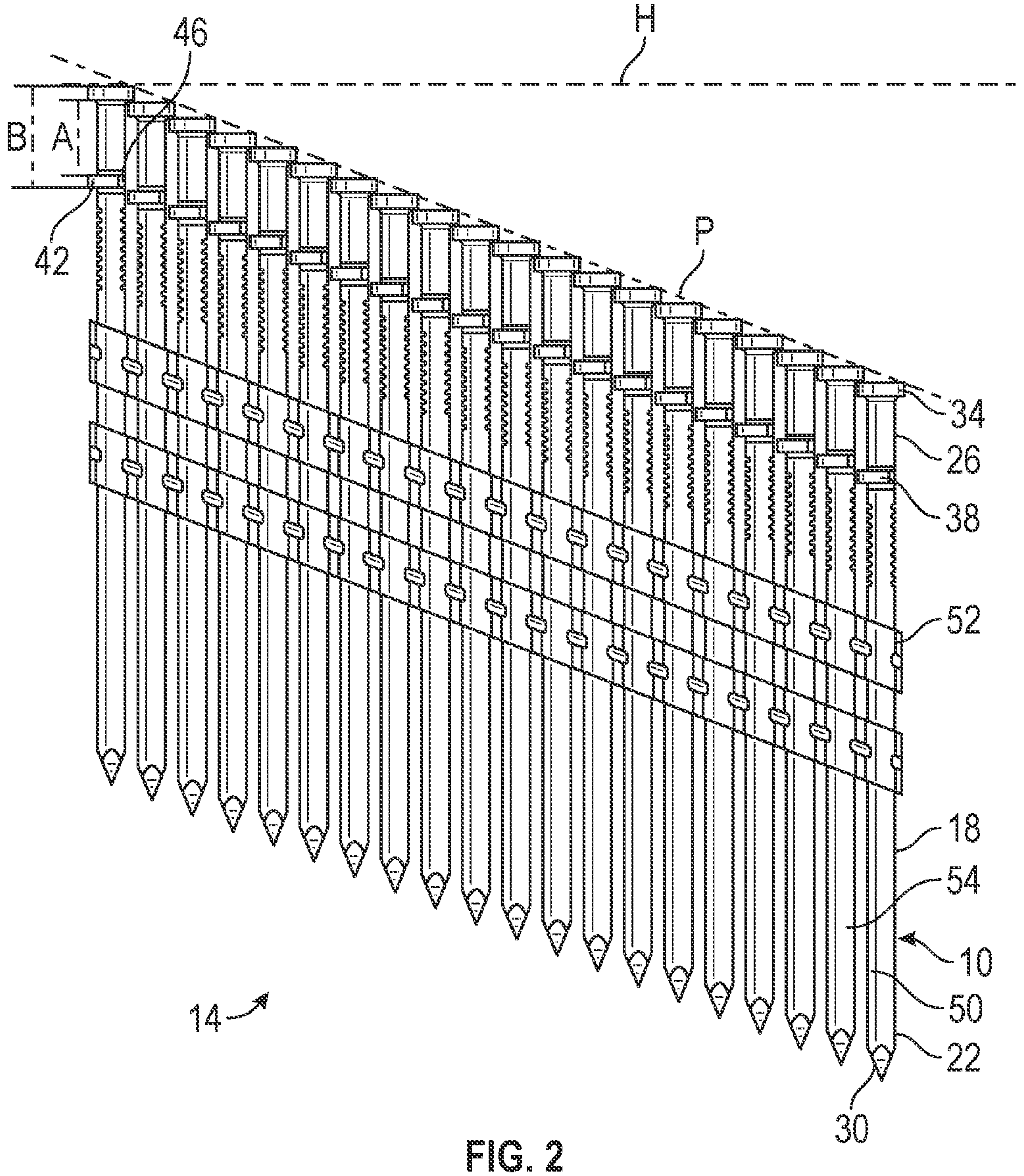
FIG. 2 is a front view of the collated strip of nails of FIG. 1.
Figure 5:
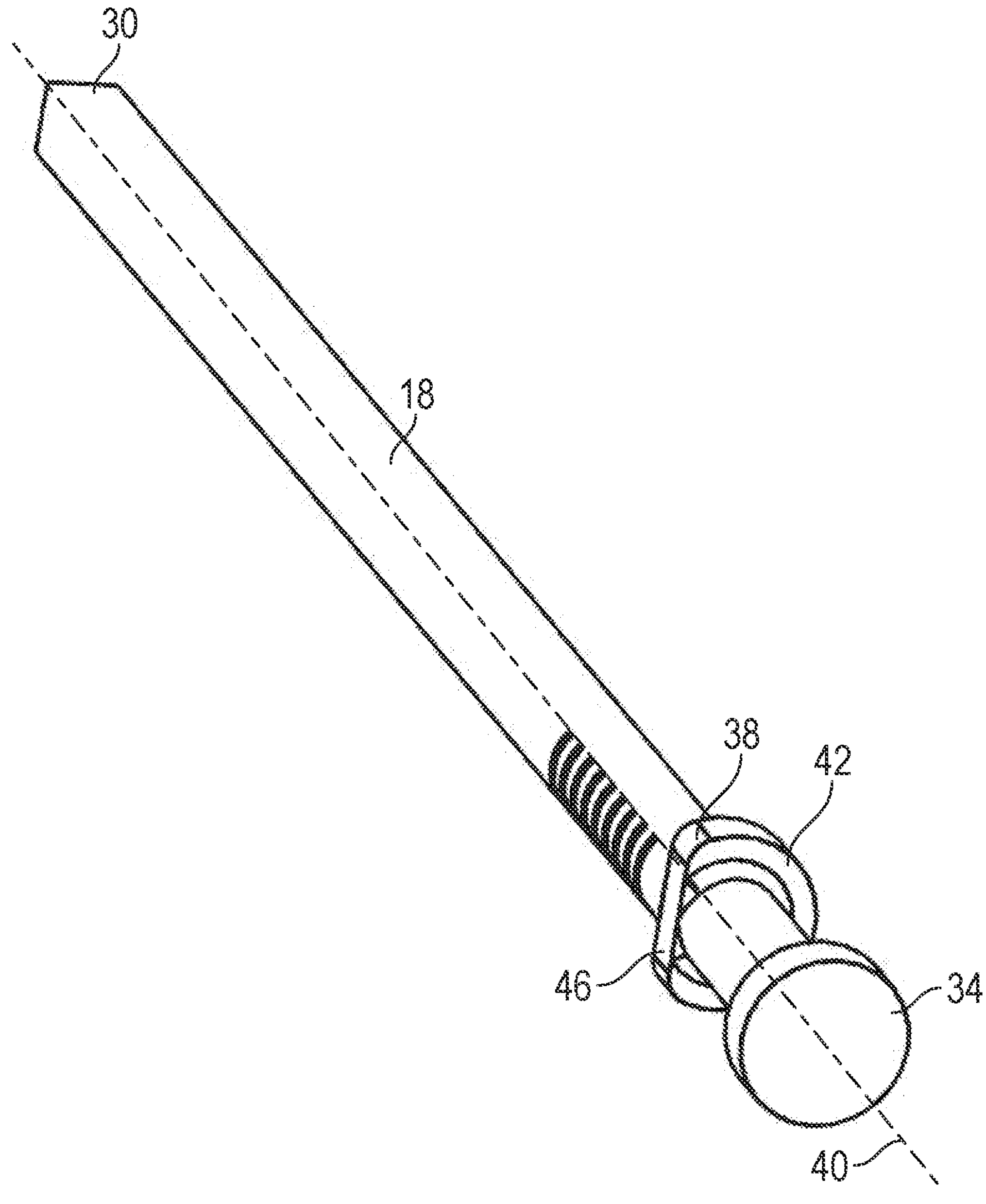
FIG. 5 is a perspective view of a nail of the collated strip of nails of FIG. 1.

As best shown in FIGS. 1, 2, and 5, the nail 10 also includes a first head 34 and a second head 38. The first head 34 is positioned at the second end 26, and the second head 38 is positioned between the first end 22 and the second end 26. With reference to FIGS. 2, 3, 8, and 12, the second head 38 is spaced from the first head 34 a distance along an axis 40 of the nail 10 and closer to the first end 22 than the second end 26. In the illustrated embodiment, an inner distance A between a second face of the first head 34 and a first face of the second head 38 is between 10 mm and 20 mm. An outer distance B between a second face of the first head 34 and a second face of the second head 38 is between 13.7 mm and 23.7 mm. For example, in one exemplary embodiment, the inner distance A is at least 10.9 mm and the outer distance B is less than or equal to 18.8 mm. In another exemplary embodiment, the inner distance A is 13.3 mm and the outer distance B is 16.8 mm. A thickness of the first head 34 (measured along the axis 40) is the same as a thickness of the second head 38. In some embodiments, the thickness of the first head 34 may be different from the thickness of the second head 38. For example, the first head 34 may have a greater thickness relative to the thickness of the second head 38, or the first head 34 may have a smaller thickness relative to the thickness of the second head 38. In the illustrated embodiment, the thickness of the heads 34, 38 is 1.75 mm. In other embodiment, the thickness may range from 1.5 mm to 2.25 mm. The illustrated duplex nails 10 with the first and second heads 34, 38 facilitate temporary attachment of the first workpiece to the second workpiece by engaging the nail with the first workpiece up to the second head 38.

Figure 6:
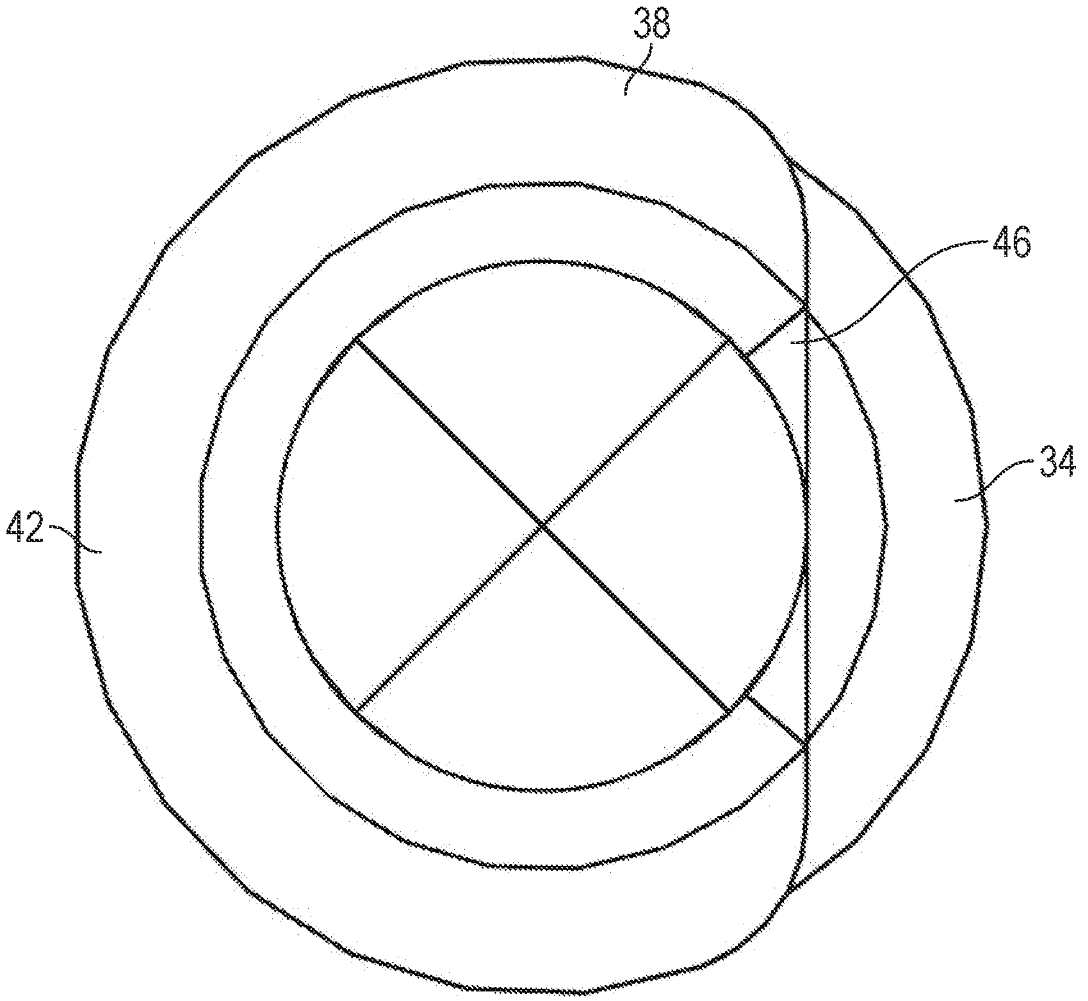
FIG. 6 is a bottom view of the nail of FIG. 5.
Figure 7:
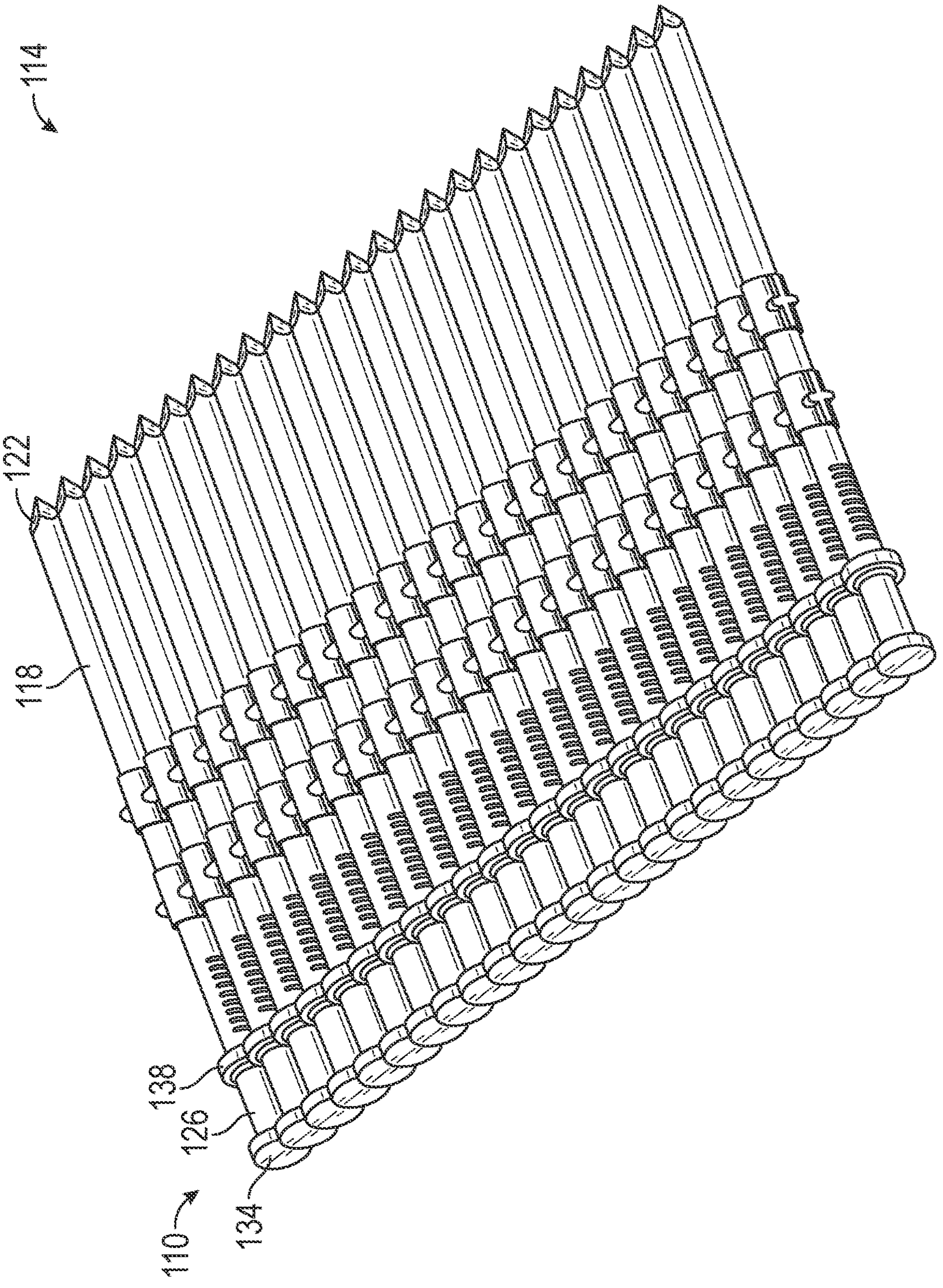
FIG. 7 is a perspective view of a collated strip of nails according to another embodiment of the invention.

With reference to FIGS. 5 and 6, the first head 34 is concentric with the body 18 about the axis 40. The first head 34 is cylindrically-shaped and has a diameter C that is larger than a diameter of the body 18. In the illustrated embodiment, the diameter C of the first head 34 is 6.0 mm, although in other or additional embodiments, the diameter C of the first head 34 may range from 5.4 mm to 6.6 mm. Also, the diameter D of the body 18 between the first head 34 and the second head 38 is 3.33 mm, although in other or additional embodiments, the diameter D of the body 18 between the first head 34 and the second head 38 may range from 2.93 mm to 3.73 mm. The second head 38 has a first portion 42 that is concentric with the body 18 about the axis 40, and a clipped or truncated portion 46. Stated another way, the first portion 42 defines a rounded side of the second head 38, and the truncated portion 46 defines a second, flat side of the second head 38. In some embodiments, such as that illustrated in FIGS. 1-7, the maximum radius of the first portion 42 is greater than the radius of the body 18, and the maximum radius of the first portion 42 is larger than the radius of the first head 34. In other embodiments, the maximum radius (and therefore the maximum diameter) of the first portion 42 is less than the radius (and therefore diameter) of the first head 34. In some embodiments, the radius of the truncated portion 46 is the same as or smaller than the radius of the first head 34.

As illustrated in FIG. 6, the truncated portion 46 is tangential to the body 18. Stated another way, a distance between a center point of the body 18 and the truncated portion or second side 46 along a radius of the body 18 is the same as the radius of the body 18. In some embodiments, the truncated portion 46 may lie in a plane beyond a plane that is tangent to the body 18. In other embodiments, the truncated portion may have other shapes (e.g., angled sections forming a "V" with the point of the "V" on the outer surface of the body 18 at or adjacent a radial extent of the body 18, one or more curved surfaces curving toward the outer surface of the body 18 at or adjacent the radial extent, etc.).

The nail 10 may be formed from any material (e.g., metal, composite, etc.) suitable for fastening the first workpiece to the second workpiece. In some embodiments, the nail 10 is formed from 1040 steel. The nail 10 may also have a coating (e.g., zinc or an aluminum-zinc coating). The tip 30 and the body 18 may include a withdrawal coating to inhibit withdrawal of the nail 10 from the workpieces.

Figure 3:
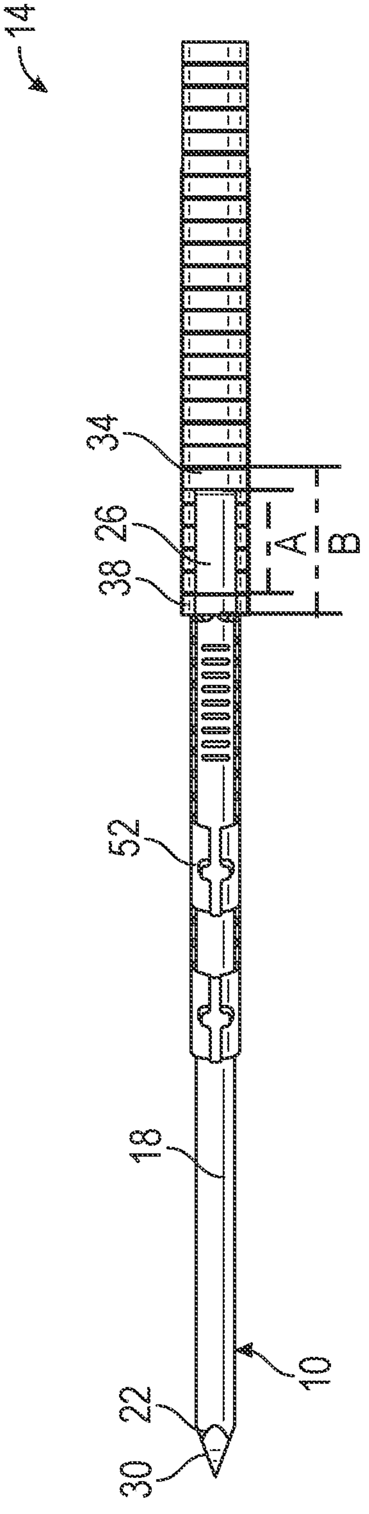
FIG. 3 is a side view of the collated strip of nails of FIG. 1.
Figure 4:
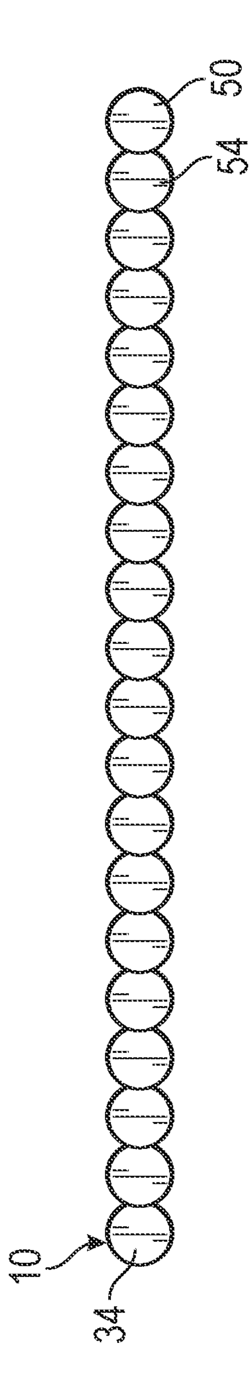
FIG. 4 is a top view of the collated strip of nails of FIG. 1.

With reference to FIGS. 1-3, the duplex nail 10 is collated into an assembly of collated nails 14 with several nails 10 held together by a binder 52 (e.g., tape, clip, etc.). When collated, the truncated portion 46 of a first nail 50 in the collated nails 14 faces the first portion 42 (the rounded portion of the second head 38) of a subsequent nail 54. As will be appreciated, and with the exception of the last nail 10 in the collation, the truncated portion 46 of each nail 10 faces the first portion 42 of the subsequent nail 54 in the collated nails 14. The nails 10 may be positioned closer together in the collation than they otherwise would be positioned due to the truncated portion 46 of each nail 10. That is, a distance between adjacent bodies 18 of the nails 54 is smaller due to the truncated portion 46. This reduces the length of the collated nails 14 and, in turn, can facilitate a shorter magazine in the nailer device without sacrificing capacity. Likewise, the smaller distance between adjacent bodies 18 may accommodate more nails 10 in a single collation (e.g., twenty-five nails 10) for a given-sized magazine of the nailer device.

Figure 12:
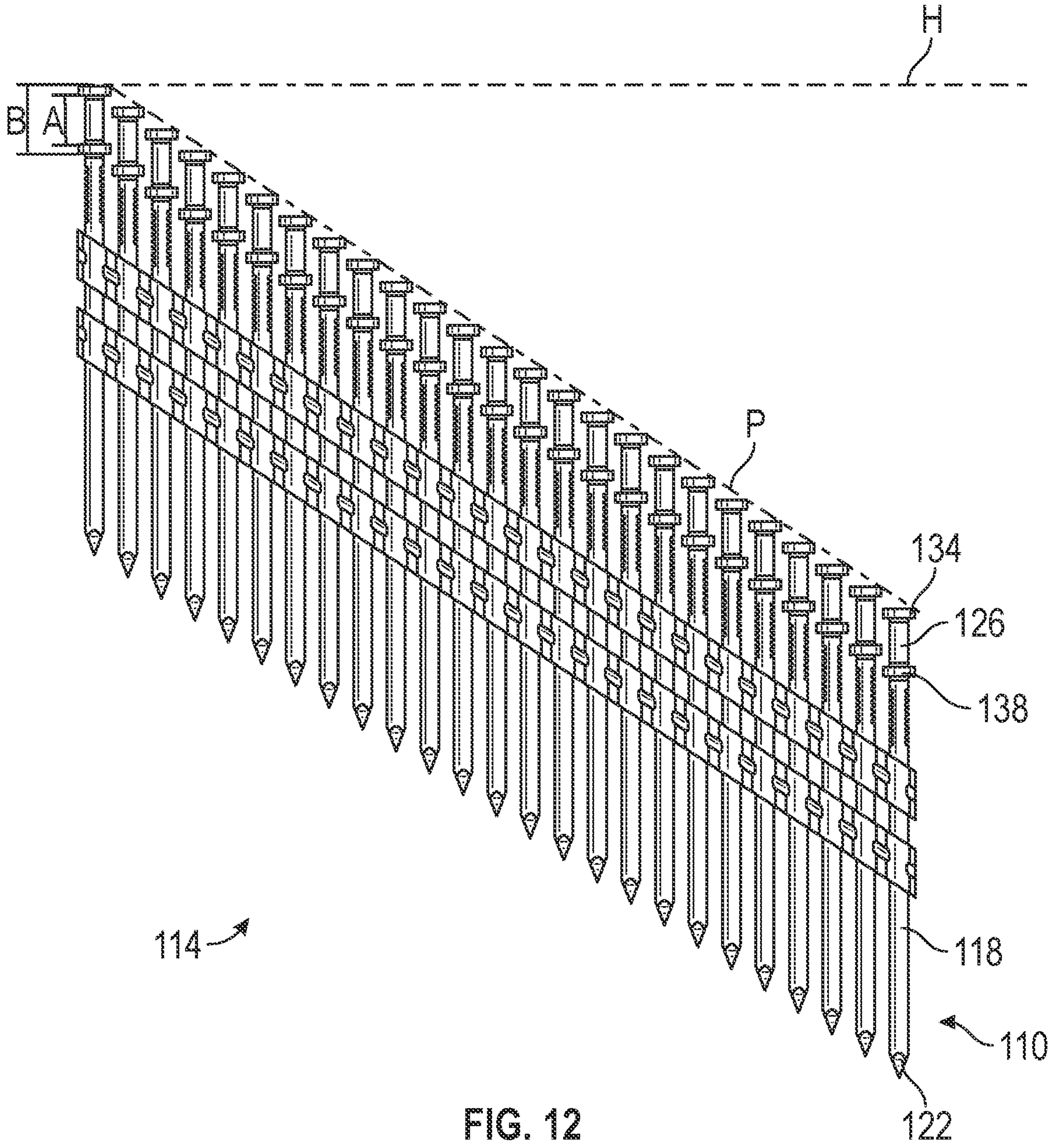
FIG. 12 is a front view of the collated strip of nails of FIG. 11.
Figure 13A:
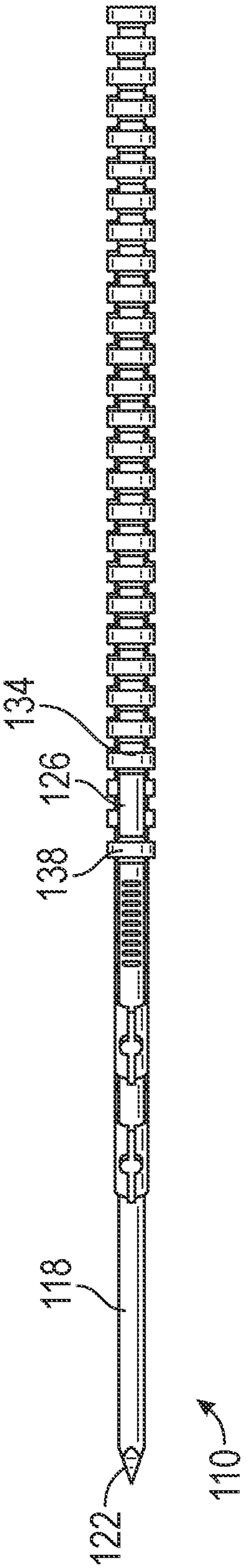
FIG. 13A is a side view of the collated strip of nails of FIG. 11.
Figure 13B:
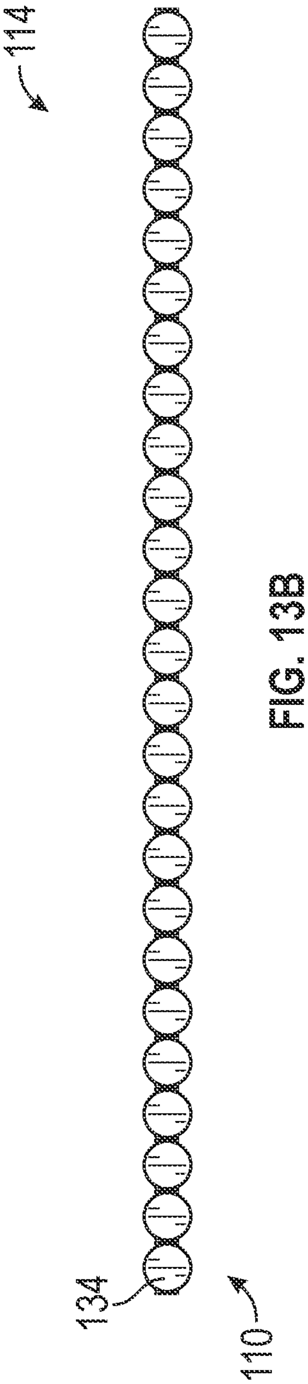
FIG. 13B is a top view of the collated strip of nails of FIG. 11.

With reference to FIG. 2, the collated nails 14 are angled such that the first head 34 of the first nail 50 is spaced axially parallel from the first head 34 of the subsequent nail 54. The first head 34 of each subsequent nail 54 is spaced from the previous nail 50 such that the collated nails 14, as an assembly, are angled approximately 21 degrees relative to a horizontal plane P extending through the end of the first head 34 of the first nail 50. As shown in FIGS. 11-14, the collated nails 114 may be angled at approximately 30 degrees or more than 30 degrees relative to the horizontal plane H. Many nail collations include twenty nails. As best shown in FIG. 12, a steeper-angled collation of nails 114 improves balance by shifting the magazine/nail weight more to the back of the nailer device. FIGS. 7-13B illustrate nails 110 in a collation 114. The nails 110 are similar to the nail 10 shown and described in FIGS. 1-6, but do not include a truncated portion. Therefore, like structures will be referred to by like reference numerals plus "100" and only the difference noted herein. As noted above, in other embodiments, such that of FIGS. 7-13B (as shown in FIG. 8B) the diameter E of the second head 138 is less than the diameter C of the first head 134. In the embodiments of FIGS. 7-13B, the diameter E of the second head 138 is 5.9 mm, but the diameter E of the second head 138 may range from 5.6 mm to 6.2 mm. The maximum diameter E of the second head 138 is at least 98% of the diameter C of the first head 134 in the illustrated embodiment. In other embodiments, maximum diameter E of the second head 138 is at least 90% of the diameter C of the first head 134.

Figure 15:
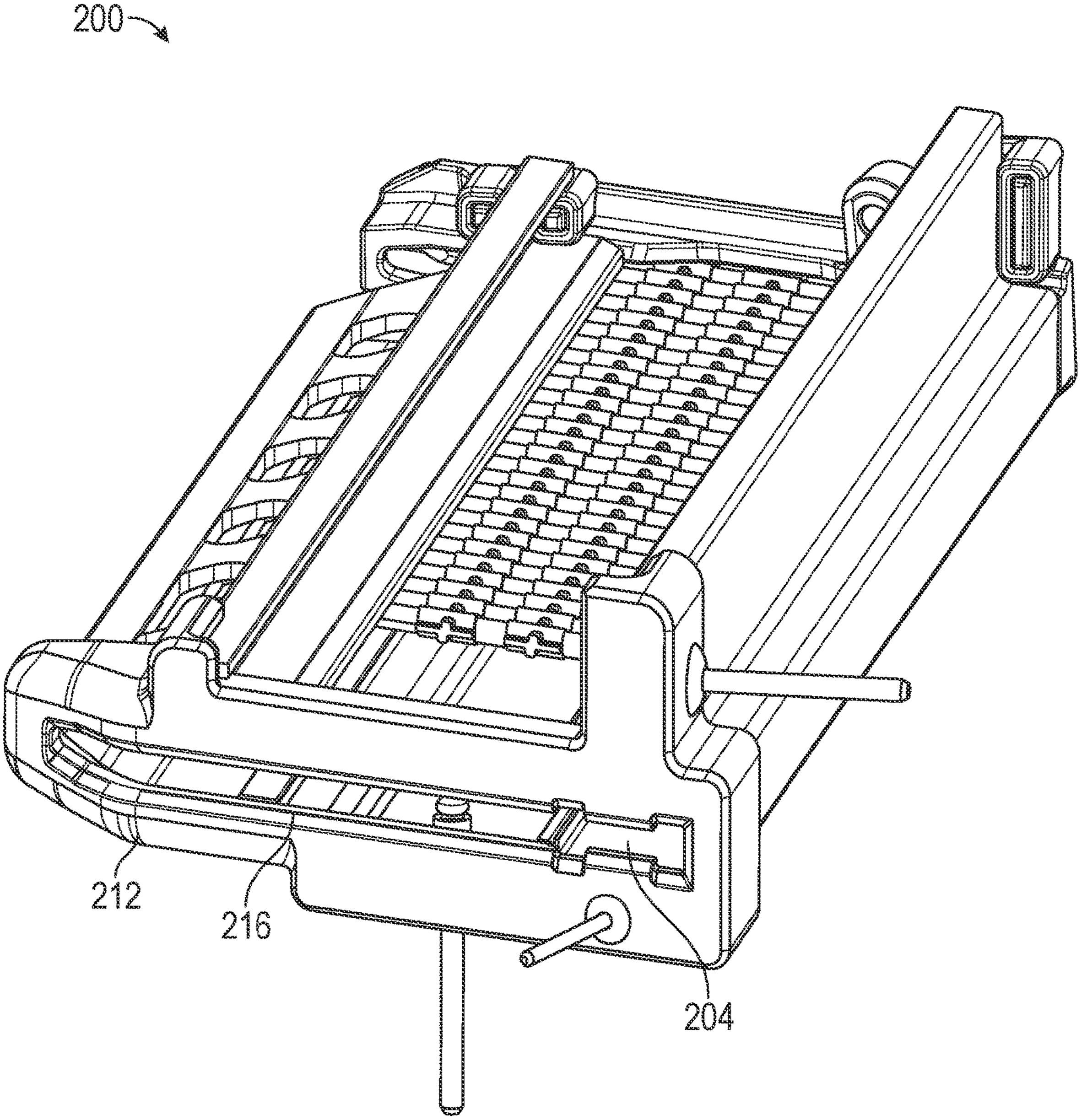
FIG. 15 is a perspective view of a magazine for the collated strip of nails of FIG. 1.
Figure 16:
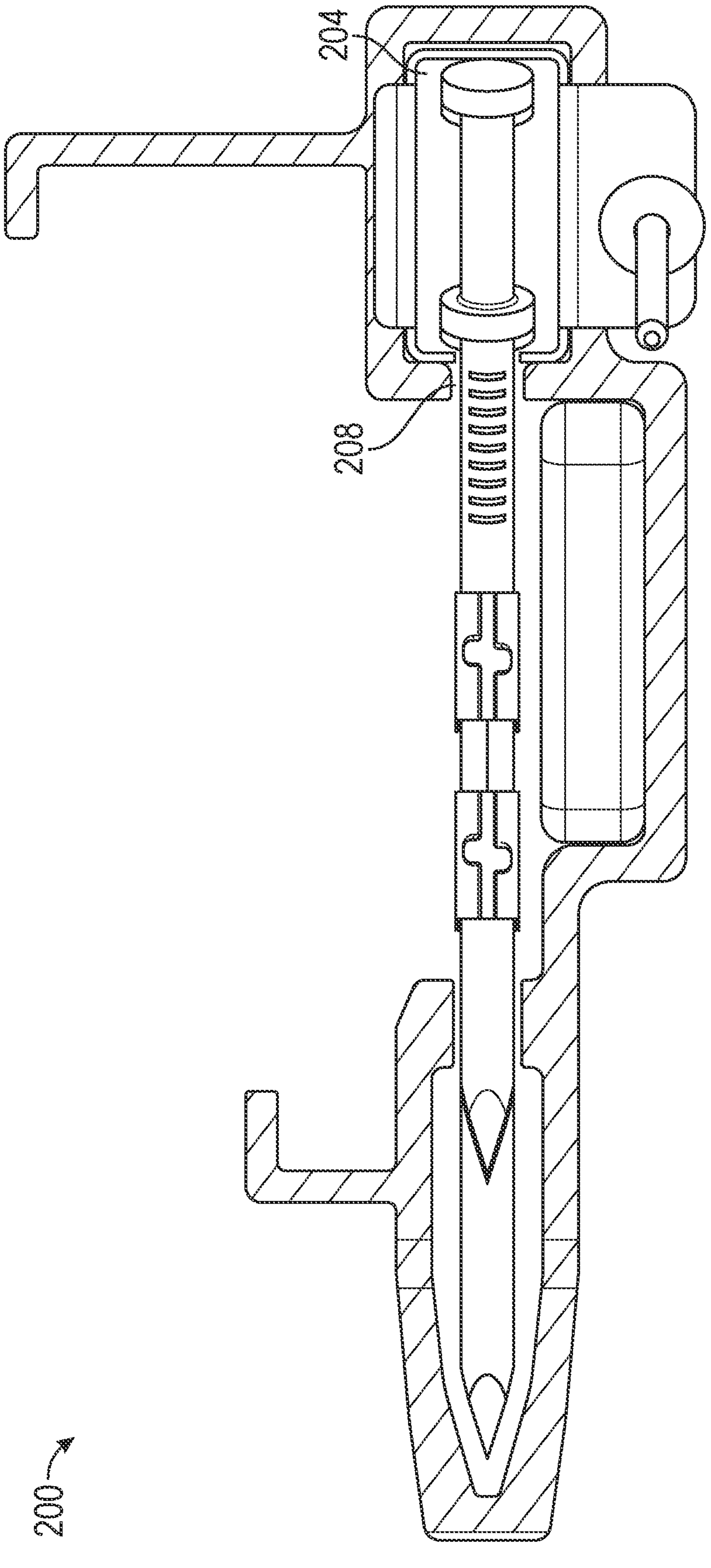
FIG. 16 is a side view of the magazine of FIG. 15 with portions removed.

FIGS. 15 and 16 illustrate a magazine 200 of the nailer device that receives the collated nails 14. The magazine 200 includes a magazine channel 204 that has a rectangular cross-sectional shape that receives the first head 34 and the second head 38. The magazine channel 204 has a height that is greater than a height of a typical magazine channel, and the greater height is due to the second head 38. In the illustrated embodiment, the height measures 20 mm, but in other embodiments, the height may measure 13 mm to 24 mm. The magazine 200 also has a slot 208 that is interconnected with the magazine channel 204 and that receives the body 18 of the nail 10. As shown, only the heads 34, 38 are positioned within the magazine channel 204. That is, the body 18 and the first end 22 of the nail 10 are positioned outside the magazine channel 204, and the entirety of the nail 10 is positioned within the magazine 200. In some embodiments, portions of the nail 10 may extend outward from the magazine 200.

In some embodiments, illustrated in the magazine 200 of FIGS. 24-28, the magazine channel (e.g., slot) 204 may include a rectangular cross-sectional shape that receives only the first head 34, while the second head 38, the body 18, and first end 22 of the nail 24 are positioned outside the channel 204. In the illustrated embodiment, the height of the channel 204 is 7.6 mm, although the height may be greater than 1.75 mm in other embodiments. In either of these embodiments, a wall 204*a* that defines the rectangular cross-sectional shape has a first surface 204*b* that defines one side of the slot 208 and a second surface 204*c* that defines and opposite side of the slot 208. In some embodiments, such as that of FIGS. 16 and 27, each of the first and the second surfaces 204*b*, 204*c* is positioned in a respective plane P1, P2 that is parallel to the nail axis 40. In some embodiments, such as that of FIG. 28, one of the first and second surfaces 204*a*, 204*b* may be positioned in a plane P1 that is parallel to the axis 40, while one of the second surfaces 204*a*, 204*b* is positioned in a plane P2 that is positioned at a non-parallel and non-perpendicular angle relative to the axis 40. Distal edges of the first and second surfaces 204*b*, 204*c* of the slot 208 defines a first distance D1 (shown best in FIG. 28 but applicable to FIG. 27 as well). In other words, a dimension of the slot 208 has the first distance D1.

In the embodiments of FIGS. 24-28, a guide member 210 (e.g., a guide) is positioned within the magazine channel 204 and extends substantially along a length of the channel 204. In the illustrated embodiment, the guide member 210 has a rectangular cross-sectional shape, like the magazine channel 204, and also defines a slot 210*a* that is aligned with the slot 208. Moreover, a wall 210*b* of the guide member 210 has substantially the same shape as the wall 204*a*. In the illustrated embodiment, the opposite surfaces of the wall 210*b* that define the slot 210*a* are each positioned planes that are parallel to the axis 40. In the illustrated embodiment, the opposite surfaces of the slot 210*a* define a second distance D2 (shown best in FIG. 28 but applicable to FIG. 27 as well) that is smaller than the first distance D1. In other words, a dimension of the slot 210*a* has the first distance D1, which is smaller than the first distance D1.

Figure 17:
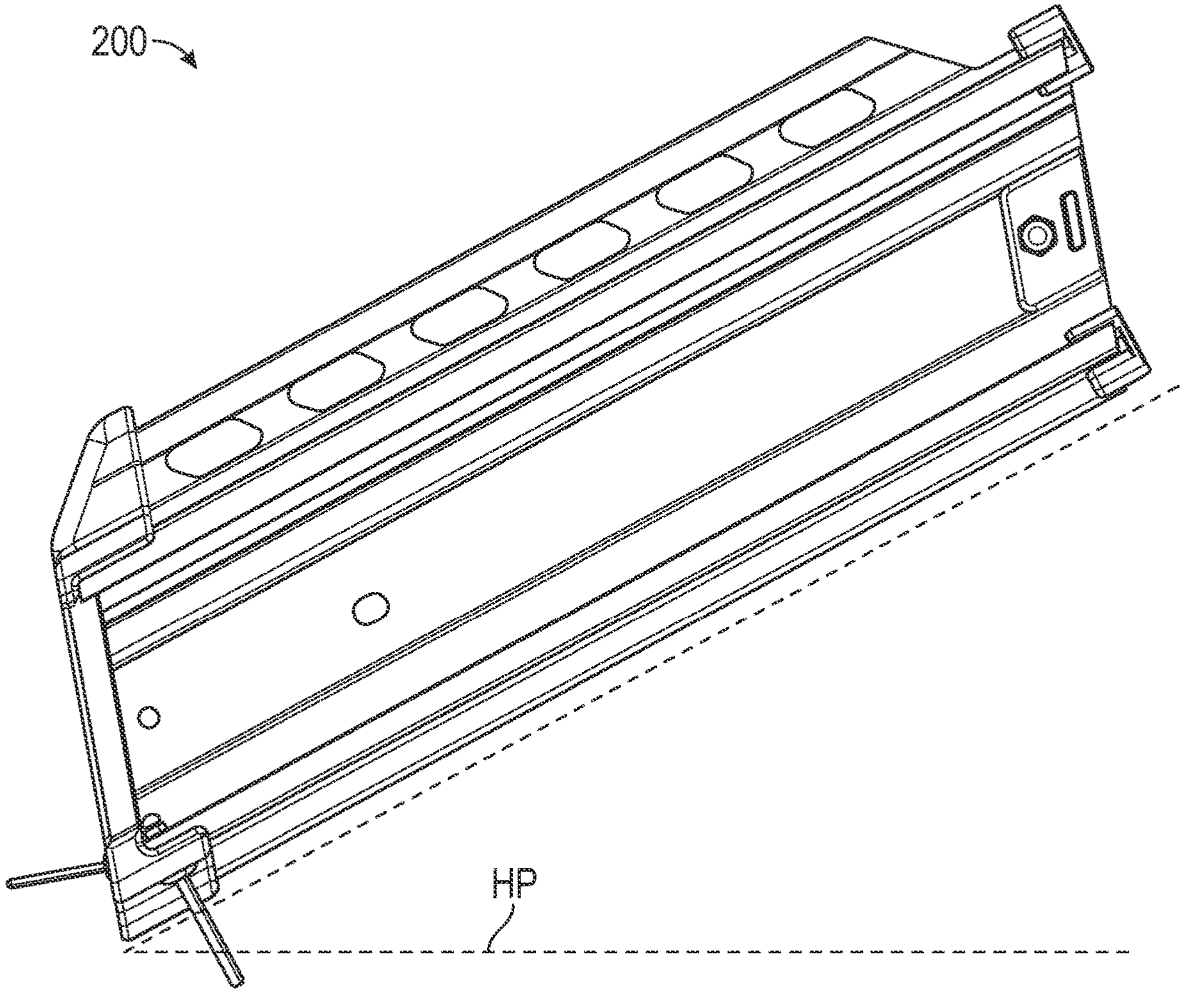
FIG. 17 is a back view of the magazine of FIG. 15.
Figure 18:
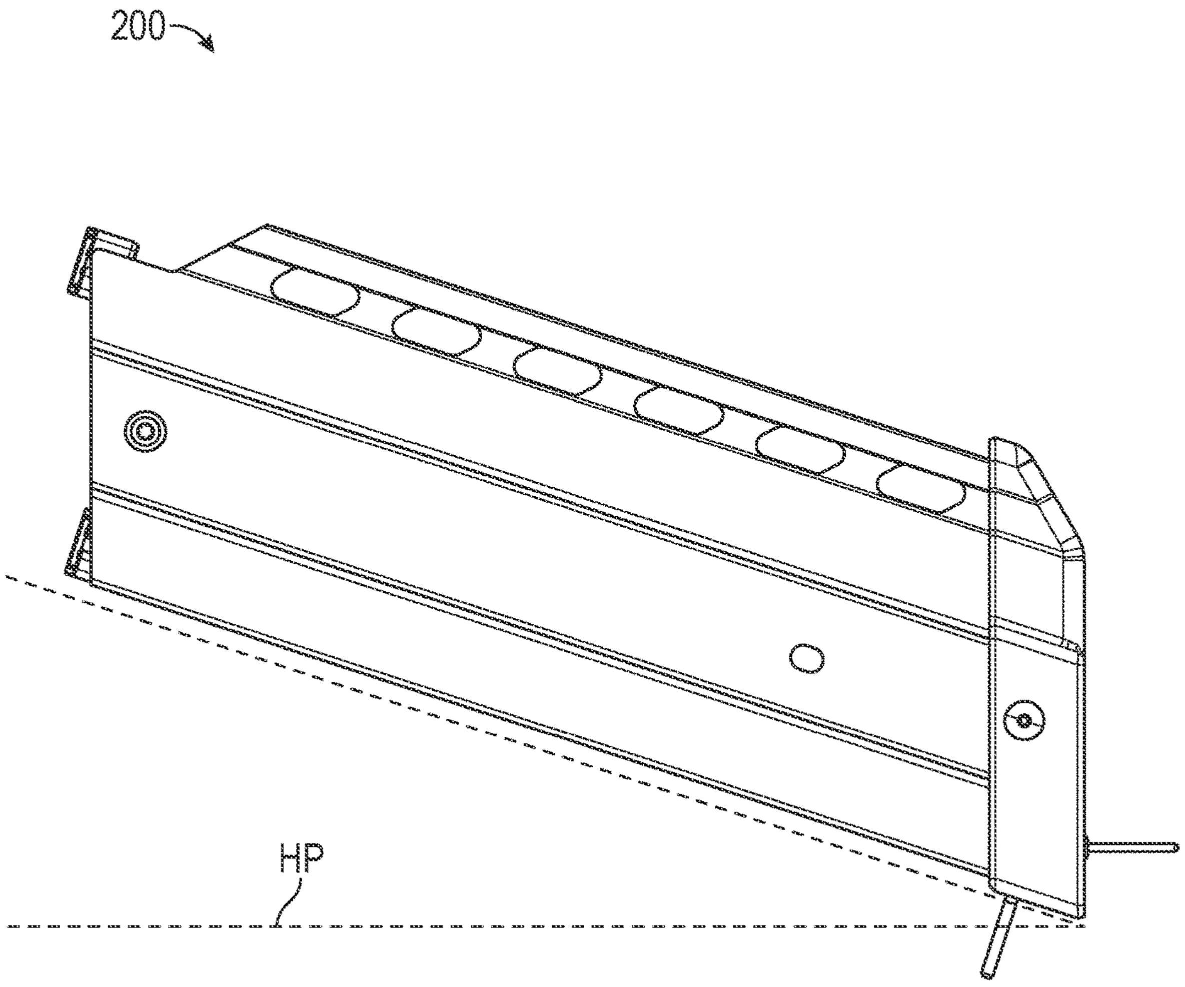
FIG. 18 is a front view of the magazine of FIG. 15

The magazine 200 is formed at an angle that corresponds to the angle of the collated nails 14. For example, when the collated nails 14 are angled at 30 degrees, as described relative to FIGS. 11-13B, the magazine 200 has the same 30 degree angle. As shown in FIGS. 17 and 18, the magazine 200 may be angled at approximately 30 degrees relative to a horizontal plane HP. In other embodiments, the magazine 200 may be angled at greater than or less than 30 degrees.

Figure 19:
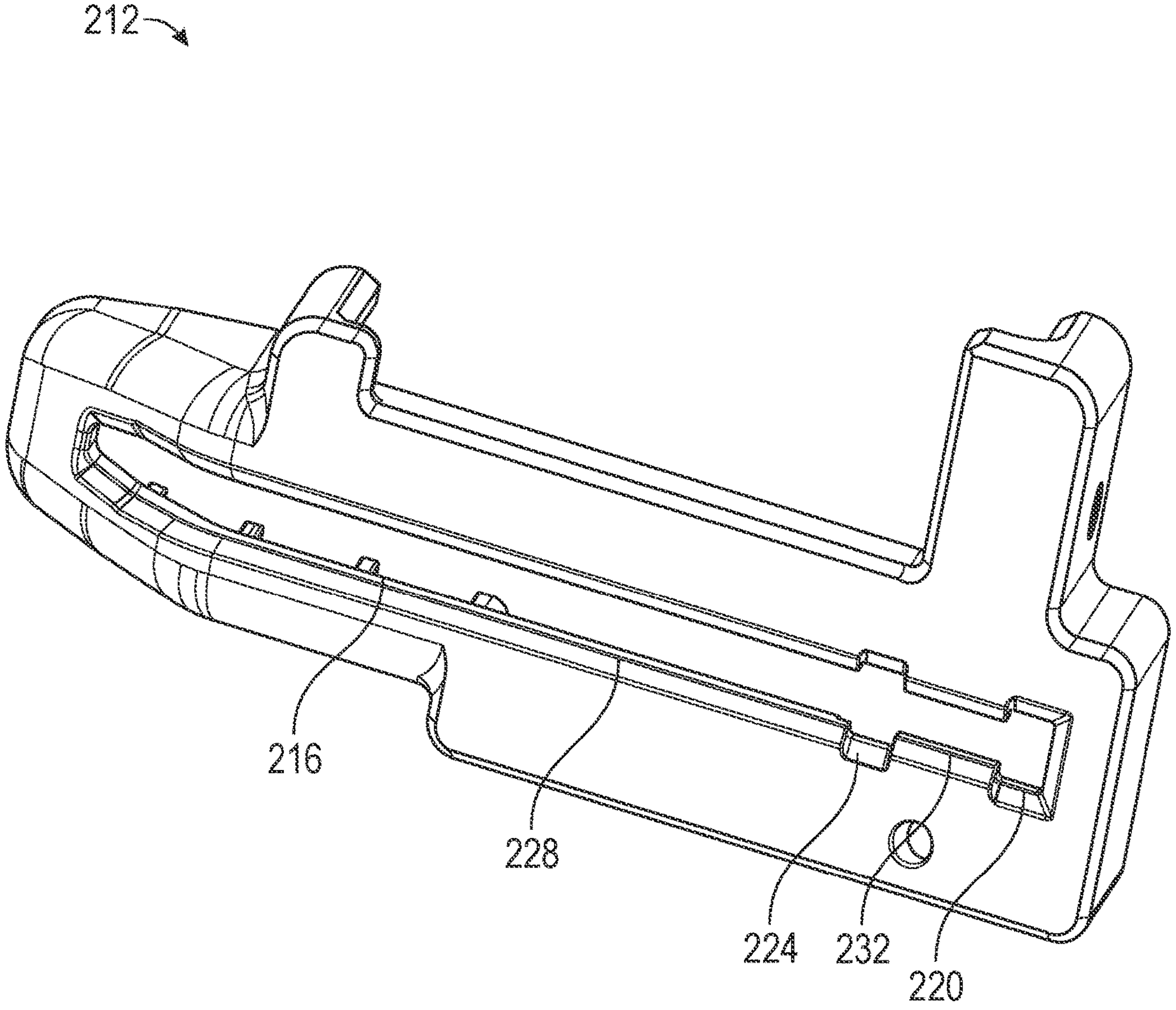
FIG. 19 is a perspective view of a perspective view of an end cap of the magazine of FIG. 15.
Figure 20:
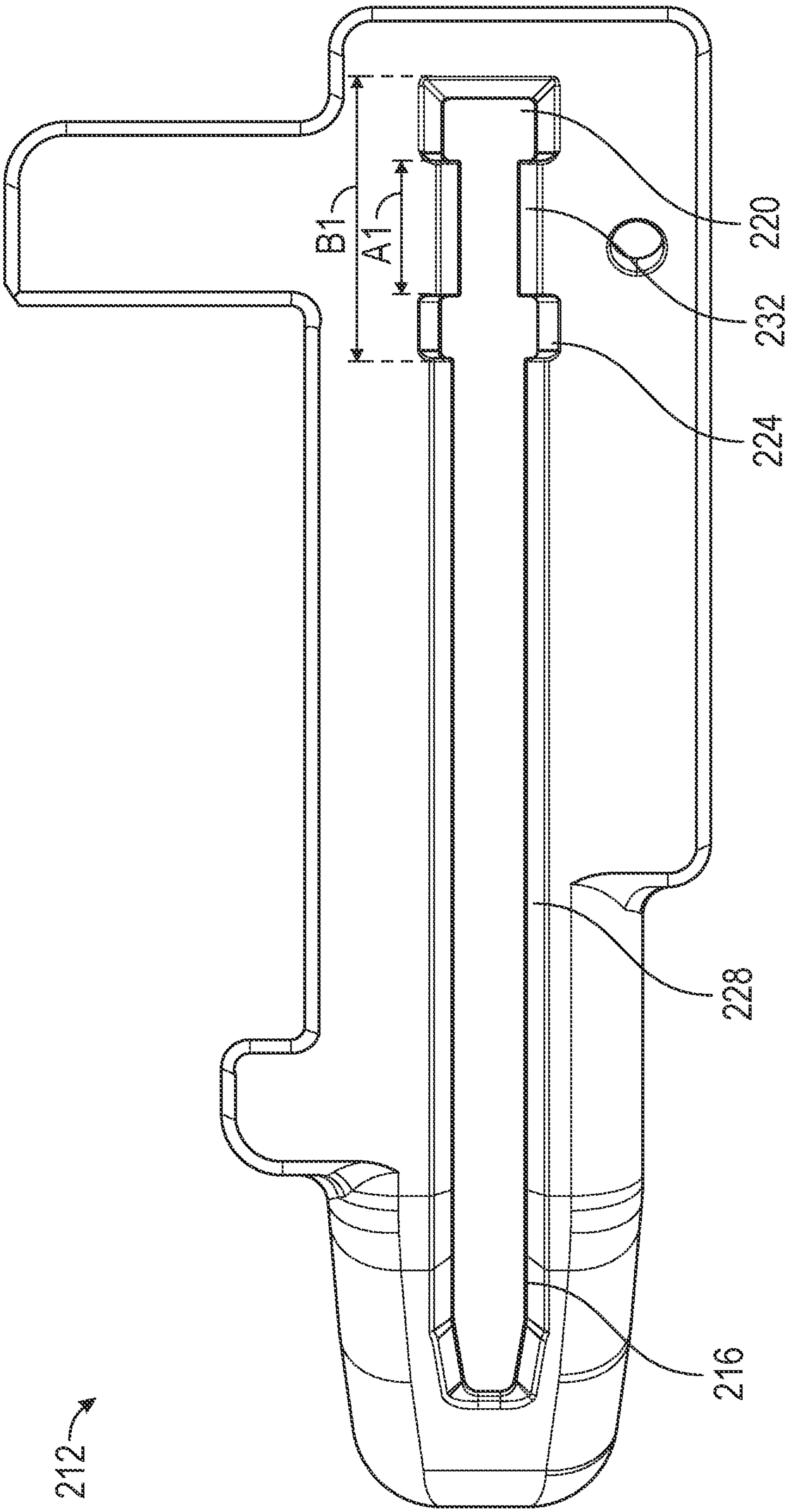
FIG. 20 is a front view of the end cap of FIG. 19.
Figure 21:
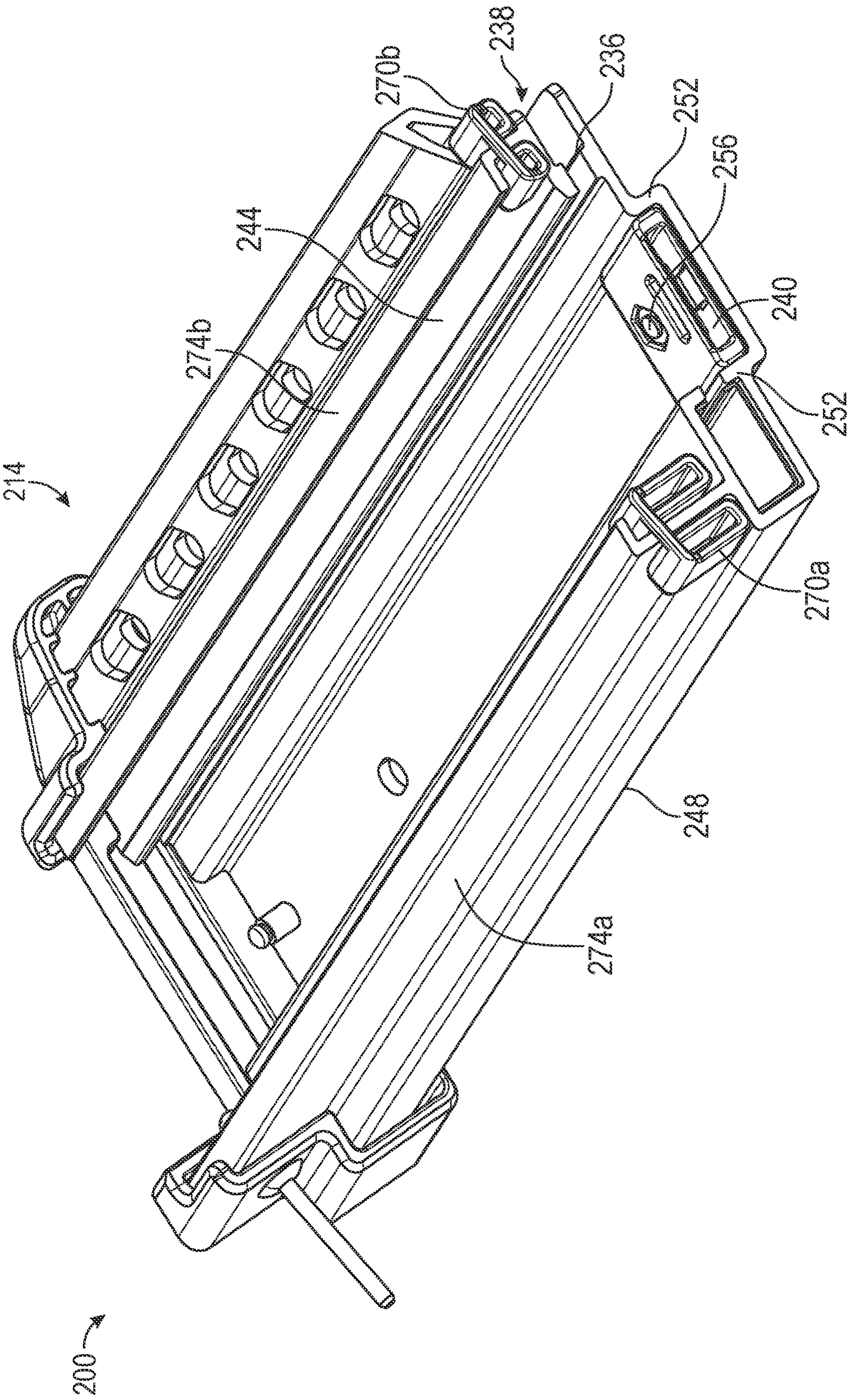
FIG. 21 is a perspective view of the magazine of FIG. 15 with portions removed.

With reference to FIGS. 19 and 20, the magazine 200 also includes an end cap 212 positioned at a first end 214 (FIG. 21). The end cap 212 has an end cap channel 216. The end cap channel 216 has a cross-sectional shape that is generally in the form of an outline of the nail 10. That is, the end cap channel 216 has a first compartment 220 that accommodates the first head 34, a second compartment 224 that accommodates the second head 38 and that is interconnected with the first compartment 220 via a connector compartment 232 (to accommodate the body of the nail 10 between the first head 34 and the second head 38), and a body compartment 228 that accommodates the body 18 (and in some embodiments, the tip 30). The connector compartment 232 and the body compartment 228 have widths that are the same, and the first compartment 220 and the second compartment 224 have widths that are the same. The widths of the first and second compartments 220, 224 are larger than the width of the body and connector compartments 228, 232. Moreover, in the illustrated embodiment, the first compartment 220 and the second compartment 224 have the same height, although in other embodiments, they may have different heights. For example, in other embodiments, the height of the second compartment 224 might be greater than the height of the first compartment 220. In the illustrated embodiment, the height of the first and second compartments 220, 224 is 5 mm, although in other embodiments. Accordingly, the height of each of the compartments 220, 224 is about 25% that of the height of the slot 204 in the magazine. In another embodiment, the height of the first compartment may be 3.8 mm, while the height of the second compartment is 4.6 mm. In other embodiments, the height of each of the first compartment 220 and the second compartment 224 is greater than 1.75 mm. Accordingly, the height of each of the compartments 220, 224 range from about 18% to 23% that of the height of the slot 204 in the magazine. Accordingly, the height of each of the compartments 220, 224 may be greater than about 9% that of the height of the slot 204 in the magazine. With respect to FIG. 20, a distance between the first compartment 220 and the second compartment 224 corresponds with a distance between the first head 34 and the second head 38. For example, an inner distance A1 is between 7 mm and 23 mm, to provide a tolerance for the inner distance A between the nail heads, 34, 38. An outer distance B1 is between 10.7 mm and 26.7 mm, to provide a tolerance for the outer distance B between the nail heads, 34, 38. For example, in one exemplary embodiment, the inner distance A1 is greater than 10.9 mm and the outer distance B1 is at least 18.8 mm. The first and second compartments 220, 224 limit which nails can be inserted into the magazine 200. For example, nails that have two heads may fit into the magazine 200 only if the distance between the nail heads 34, 38 correspond (match) to the distance between the first compartment 220 and the second compartment 224. In some embodiments, the end cap channel 216 may have a different cross-sectional shape. For example, the end cap channel 216 may have a cross-sectional shape that is similar to the cross-sectional shape of the magazine channel 204, as shown in FIGS. 24-28.

Figure 22:
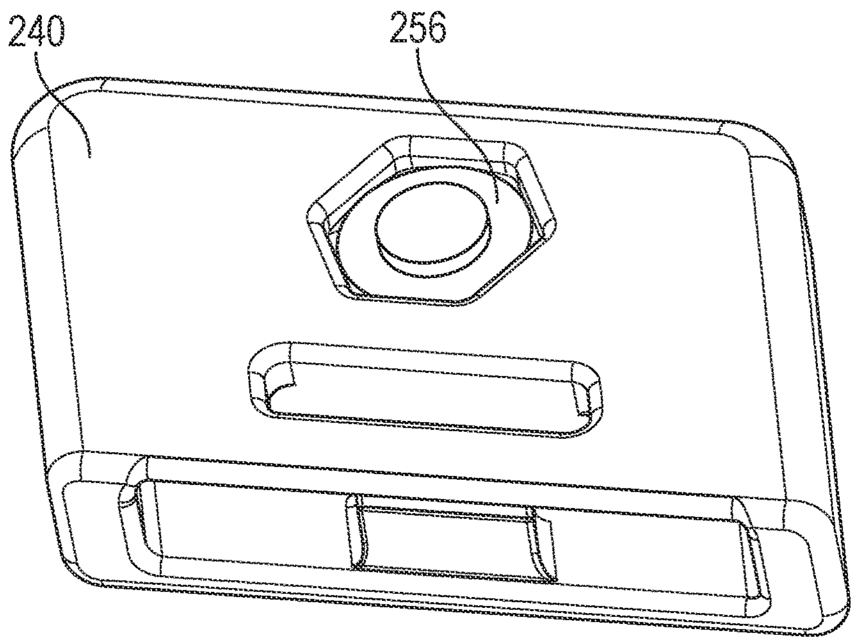
FIG. 22 is a perspective view of a middle dampener of the magazine of FIG. 21.

With reference to FIGS. 21 and 22, the magazine 200 includes an opening 236 that is positioned at a second end 238, opposite the first end 214, and therefore the end cap 212. A middle dampener 240 is positioned proximate the magazine opening 236 on a back surface 244 of the magazine 200. In some embodiments, the middle dampener 240 may be disposed on a top surface 248 of the magazine 200. In some embodiments, such as that of FIGS. 24-28, the middle dampener 240 may be disposed on both the back surface 244 and the top surface 248. Additionally, the middle dampener 240 may extend between the back surface 244 and the top surface 248. Additionally, as shown in FIGS. 24-28, the middle dampener 240 may include a first portion 240*a* that is positioned on the back surface 244, a second portion 240*b* that is positioned on the top surface 248, and a connecting portion 240*c* coupled between the first portion 240*a* and the second portion 240*b* and extending between the back surface 244 and the top surface 248. Regardless of the embodiment, the middle dampener 240 is positioned between walls 252 of the magazine 200 that define a groove. The middle dampener 240 is configured to engage a base portion of a nosepiece assembly (not shown in FIGS. 21 and 22, but discussed in greater detail below with respect to FIGS. 31-41*i*). The illustrated middle dampener 240 is generally rectangular in shape. A width of the middle dampener 240 corresponds to a width of the groove and therefore a distance between the walls 252. In other embodiments, the middle dampener 240 may be another shape (e.g., circular, octagonal, or the like). In some embodiments, as shown in FIGS. 21-22, the middle dampener 240 is coupled to the magazine 200 via an insert molded nut 256. The inserted molded nut 256 extends through the magazine 200. In other embodiments, shown in FIGS. 24-27, the insert molded nut 256 of the middle dampener 240 may be omitted, and the middle dampener 240 may be coupled between the magazine 200 and the tool via a transition fit, which will be discussed in greater detail below relative to FIGS. 31-41B. In still other embodiments, the middle dampener 240 may be coupled to the magazine 200 solely via an inserted molded nut or another connection (e.g., screw, bolt, etc.). In still other embodiments, the middle dampener may be coupled to the magazine in other suitable ways (e.g., a snap-fit engagement with the magazine and/or the nosepiece). Additionally, with continued reference to FIGS. 24-27, in some embodiments, the middle dampener 240 may include a recess 240*d*. In the illustrated embodiment, the first portion 240*a* includes a recess 240*d* and the second portion 240*b* includes a recess 240*d*. The middle dampener 240 may be composed of a hard durometer rubber or a soft plastic, or another material suitable for dampening the bending loads at a connection between the of the tool (e.g., a nosepiece assembly, not shown in FIGS. 21-22 and 24-27, but discussed below relative to FIGS. 31-41*i*) and the magazine 200.

Figure 23:
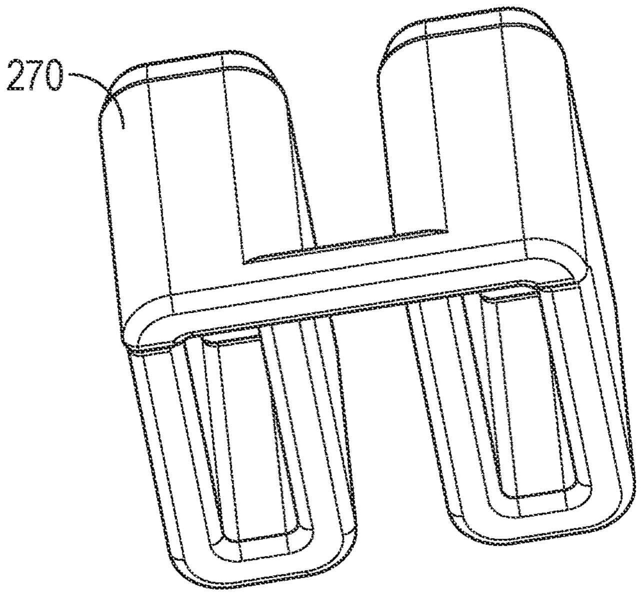
FIG. 23 is a perspective view of an outer dampener of the magazine of FIG. 21.
Figure 24:
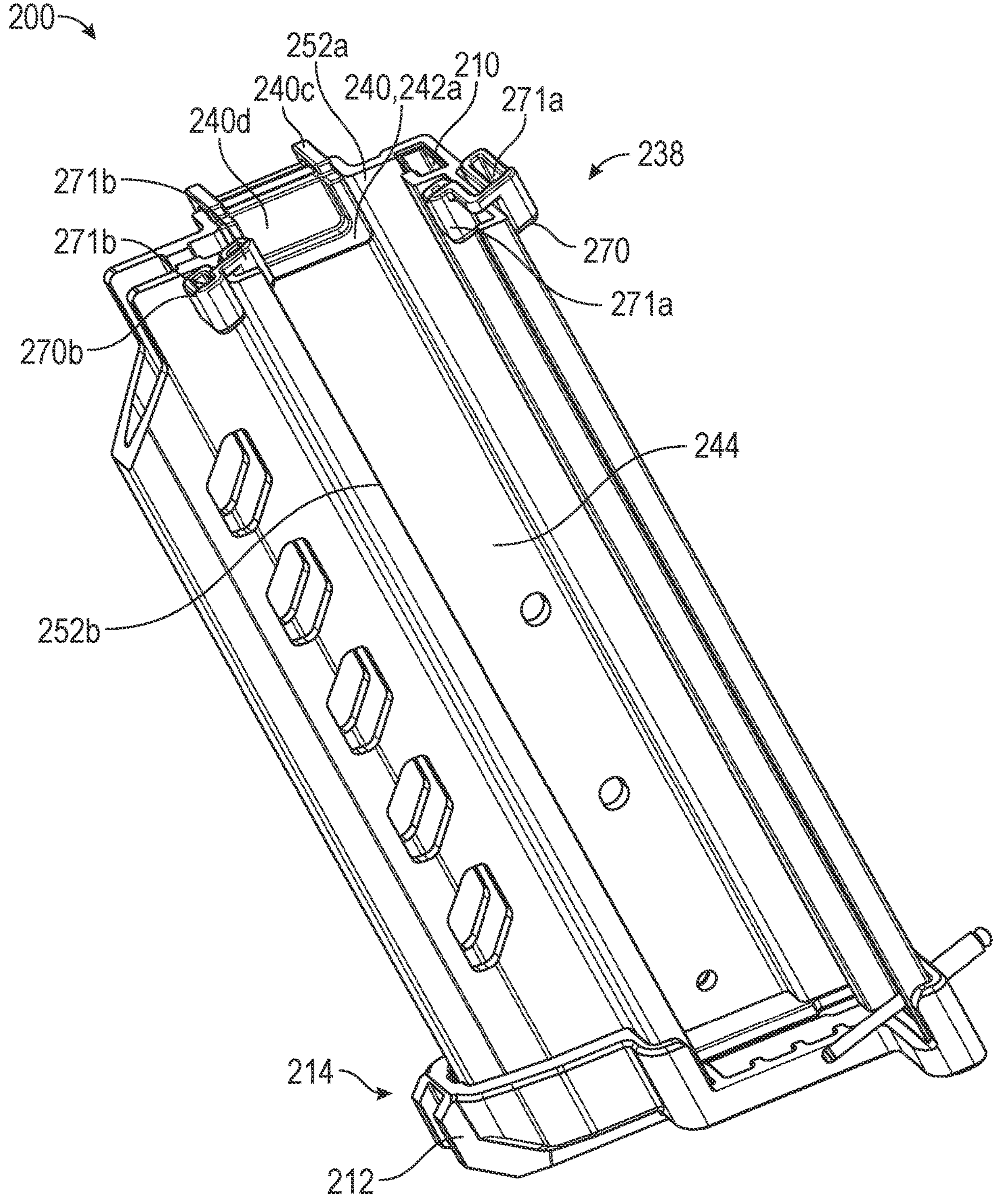
FIG. 24 is a perspective view of another magazine for the collated strip of nails of FIG. 1 having another end cap.
Figure 25:
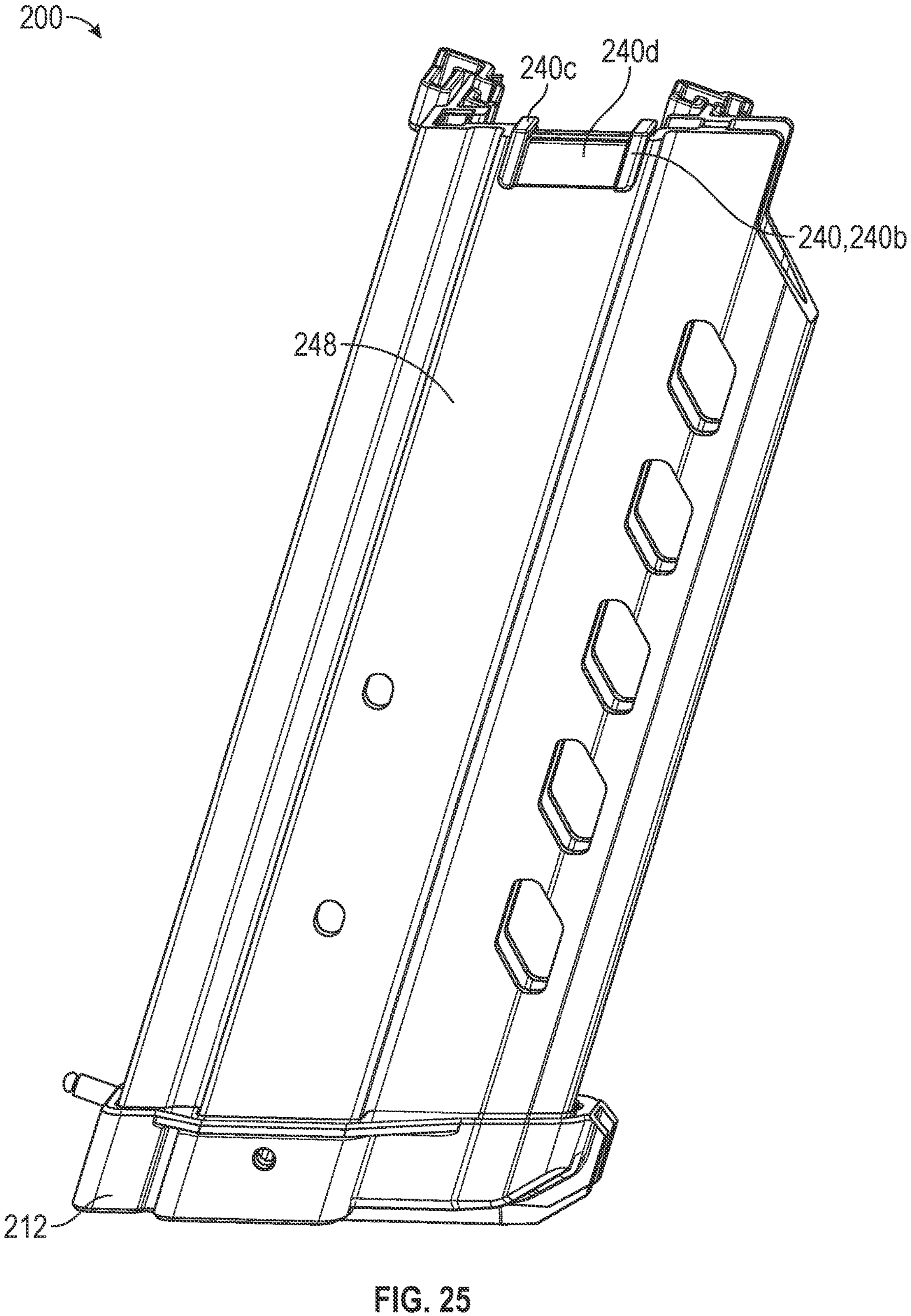
FIG. 25 is a perspective view of the magazine of FIG. 25.
Figure 26:
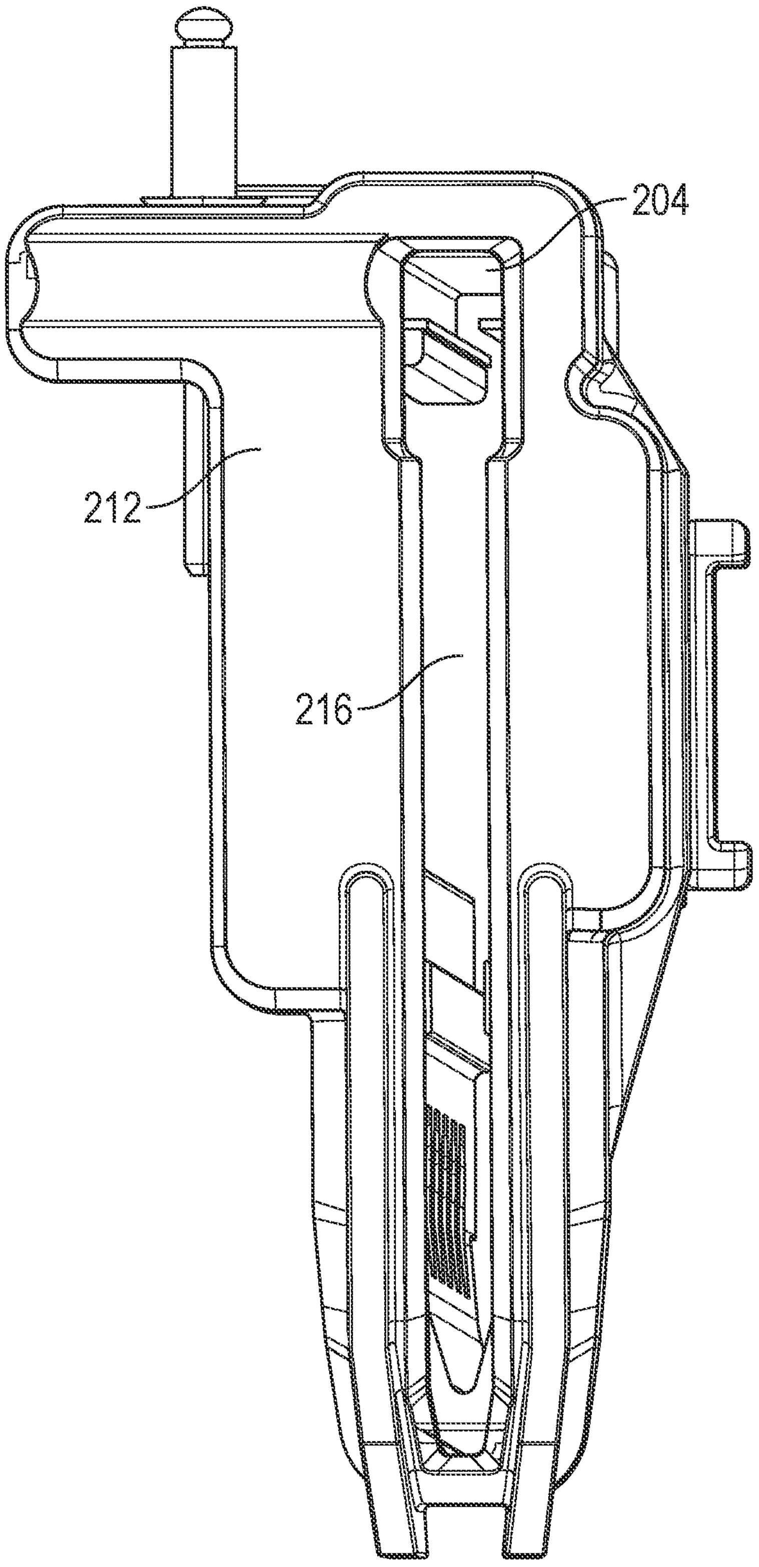
FIG. 26 is a first end view of the magazine and end cap of FIG. 25.
Figure 27A:
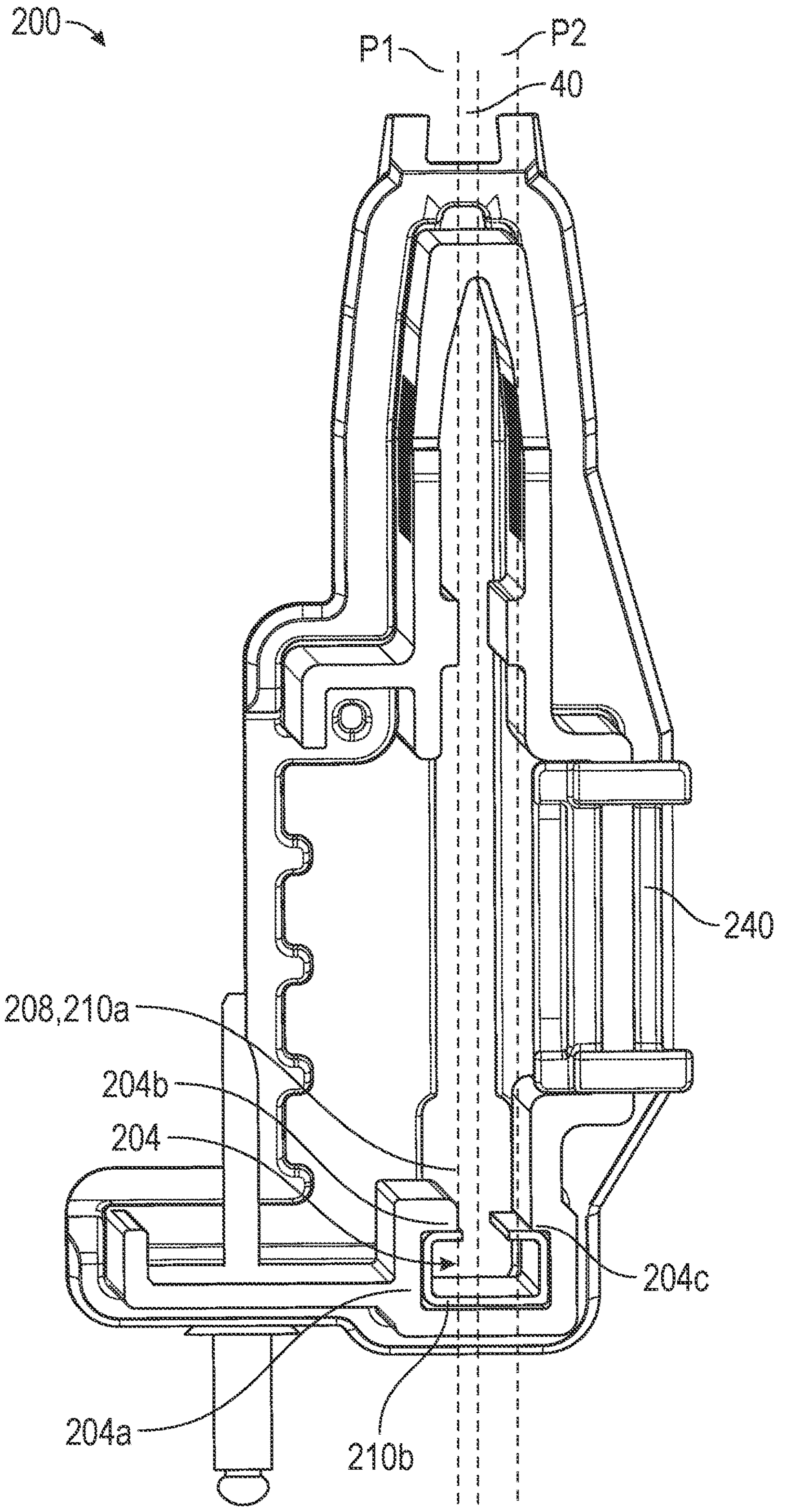
FIG. 27A is a second end view of the magazine and end cap of FIG. 25.
Figure 27B:
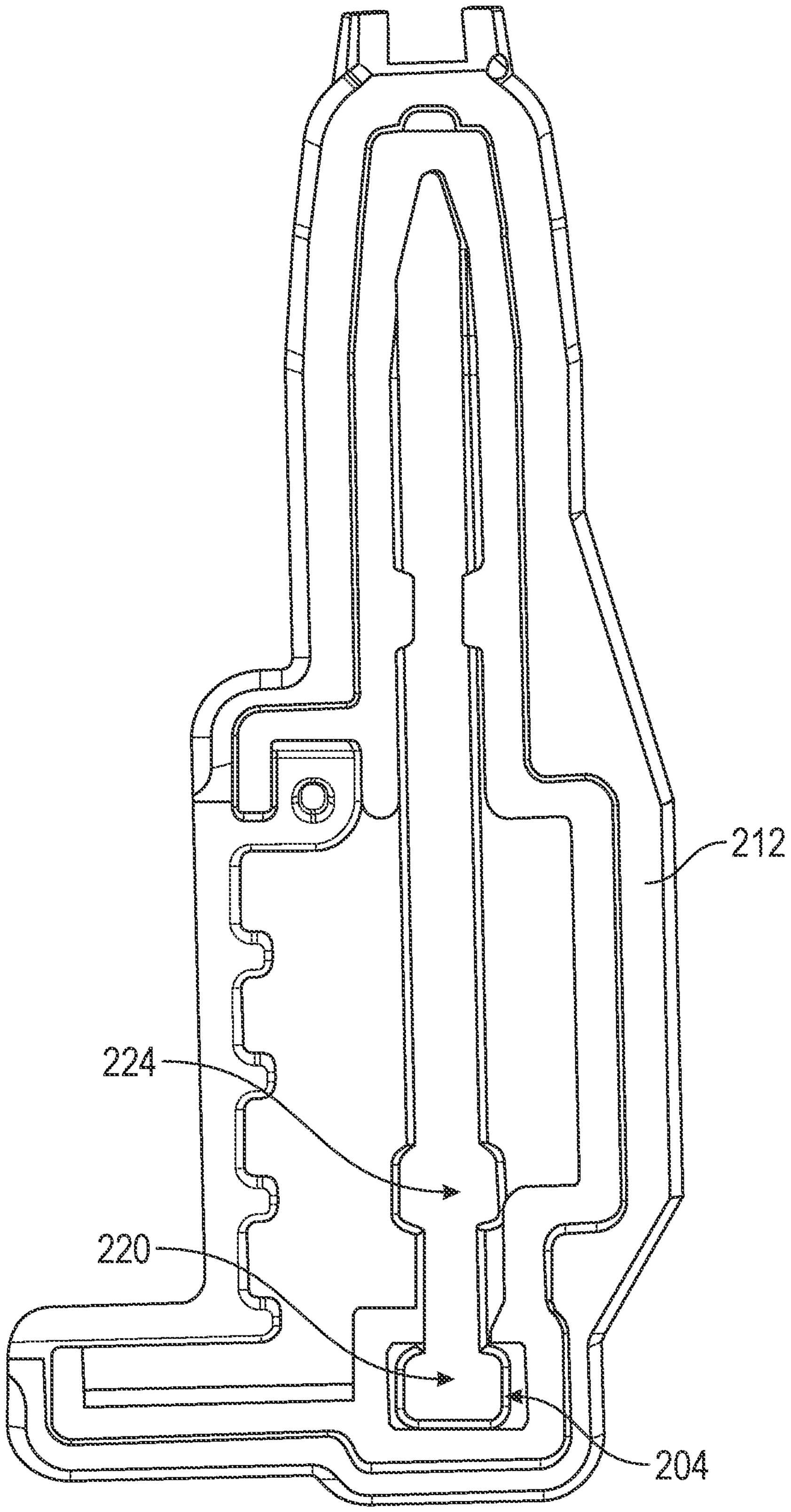
FIG. 27B is a second end view of the magazine of FIG. 25 and another end cap.
Figure 28:
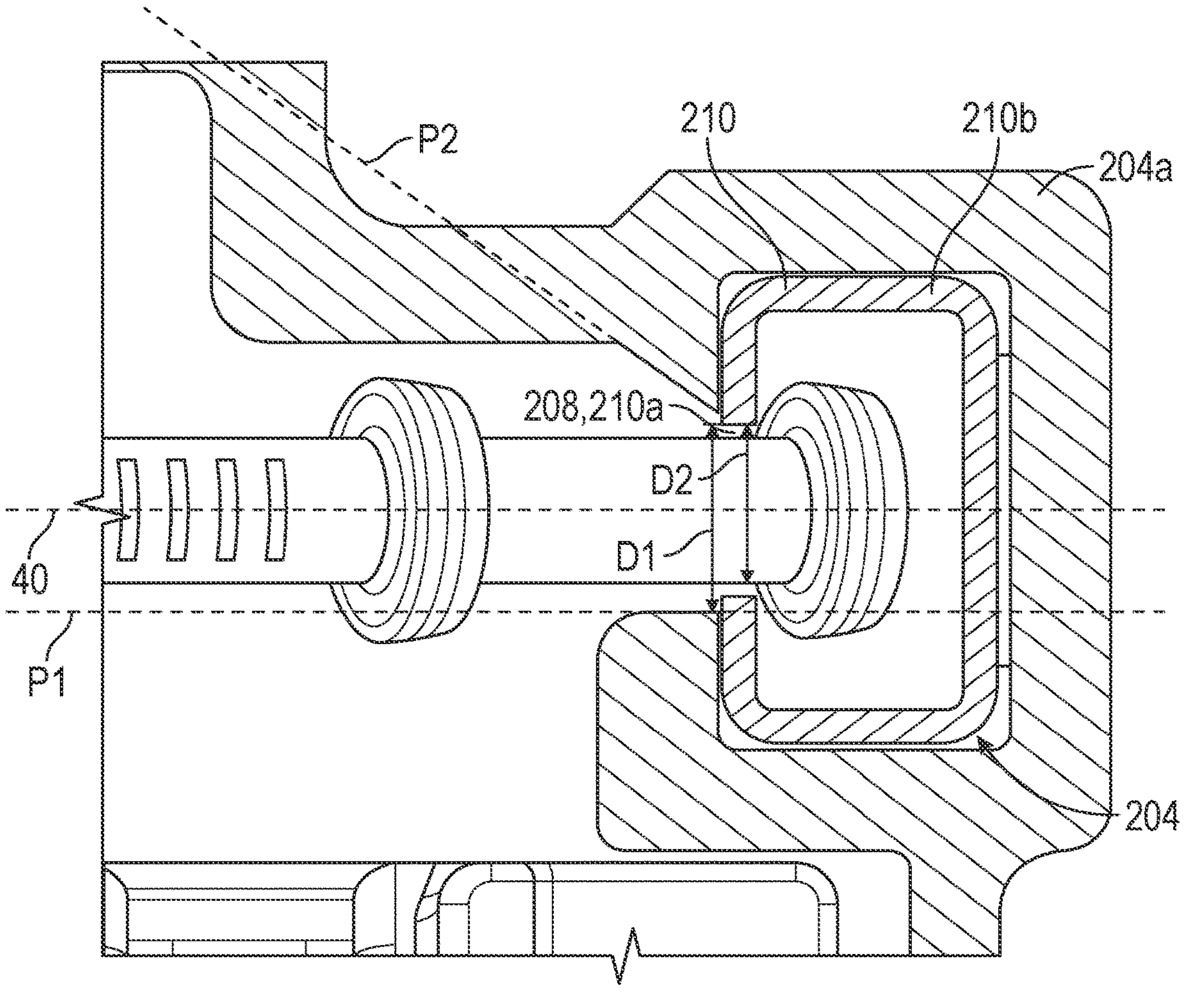
FIG. 28 is a detailed first end view of another magazine.

With reference to FIGS. 21 and 23, the magazine 200 further includes outer dampeners 270 that are mounted on rails 274. Although two outer dampeners 270 are shown, the magazine 200 may include one or more than two outer dampeners. The outer dampeners 270 are positioned proximate to the magazine opening 236 on the back surface 244 of the magazine 200. In some embodiments, the outer dampeners 270 may be positioned on the front surface 248 of the magazine 200. The rails 274 support the collated nails 14. A first outer dampener 270*a* is positioned on a first rail 274*a* (e.g., on an end of the first rail 274*a* or another location on the first rail 274*a*), and a second outer dampener 270*b* is positioned on a second rail 274*a* (e.g., on an end of the second rail 274*a* or another location on the second rail 274*a*). As shown in FIG. 23, the outer dampeners 270 are U-shaped, although other shapes for the outer dampeners 270 are possible and considered herein. In the illustrated embodiments, the outer dampeners 270*a*, 270*b* each include apertures 271*a*, 271*b* extending therethrough. In this case, each of the outer dampeners 270*a*, 270*b* each have a pair of apertures 271*a*, 271*b*, one through each side of the U-shape. The outer dampeners 270 may include a medium durometer rubber, or another material (e.g., hard durometer rubber, soft plastic, etc.) to provide support to a back of the magazine 200. The outer dampeners 270 also act as isolators or dampeners to absorb bending loads. The shape of the outer dampeners 270 provides a loose support, allowing deflection. Like the middle dampener 240 of FIGS. 24-27, the outer dampeners 270 may be coupled between the magazine 200 and the tool via a transition fit, discussed in greater detail below.

In use, the collated nails 14 are positioned in the magazine 200 of the nailer device. When the user actuates a trigger of the nailer device, a firing operation commences. During the firing operation, a force is imparted onto the first head 34 of the first nail 50 in the collation, driving the first nail 50 into the workpiece. The truncated portion 46, when present, provides clearance for the first head 34 when the first nail 50 is driven from the collation into the workpiece. The truncated portion 46 also allows the nails 10 to be stacked tighter together within the magazine 200 while still being able to fire normally, which can facilitate a shorter magazine.

With reference to FIGS. 7-13B, the second head 138 is cylindrically-shaped and does not have a truncated portion, such that the first head 134 and the second head 138 have the same shape (e.g., the same or different sizes or diameters). In some embodiments, the nails 110 may include a truncated portion. In other embodiments, the diameter of the second head 138 may be less than or the same as the diameter of the first head 134, or the second head 138 may be larger than the diameter of the first head 134.

Figure 8A:
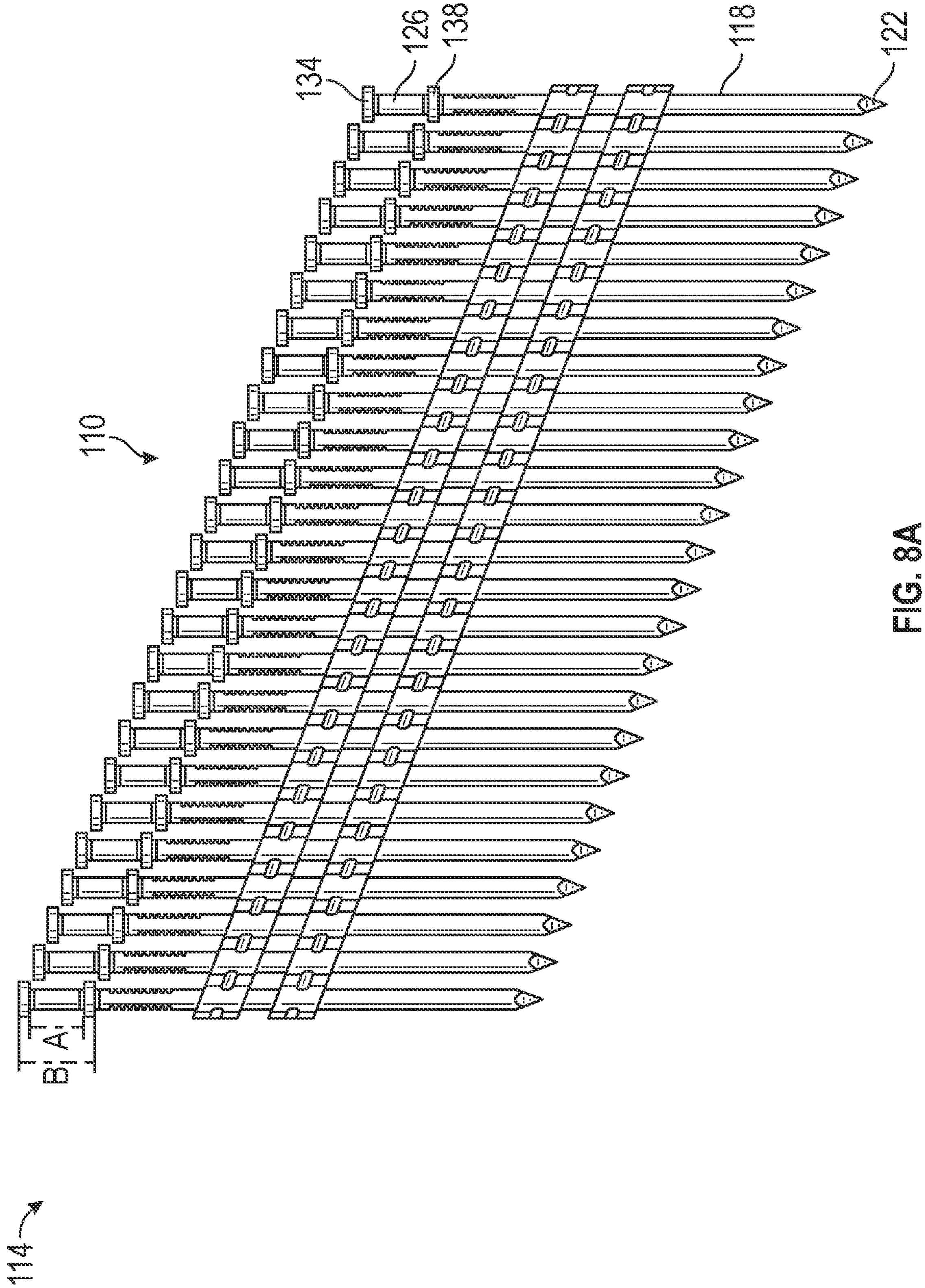
FIG. 8A is a front view of the collated strip of nails of FIG. 7.
Figure 8B:
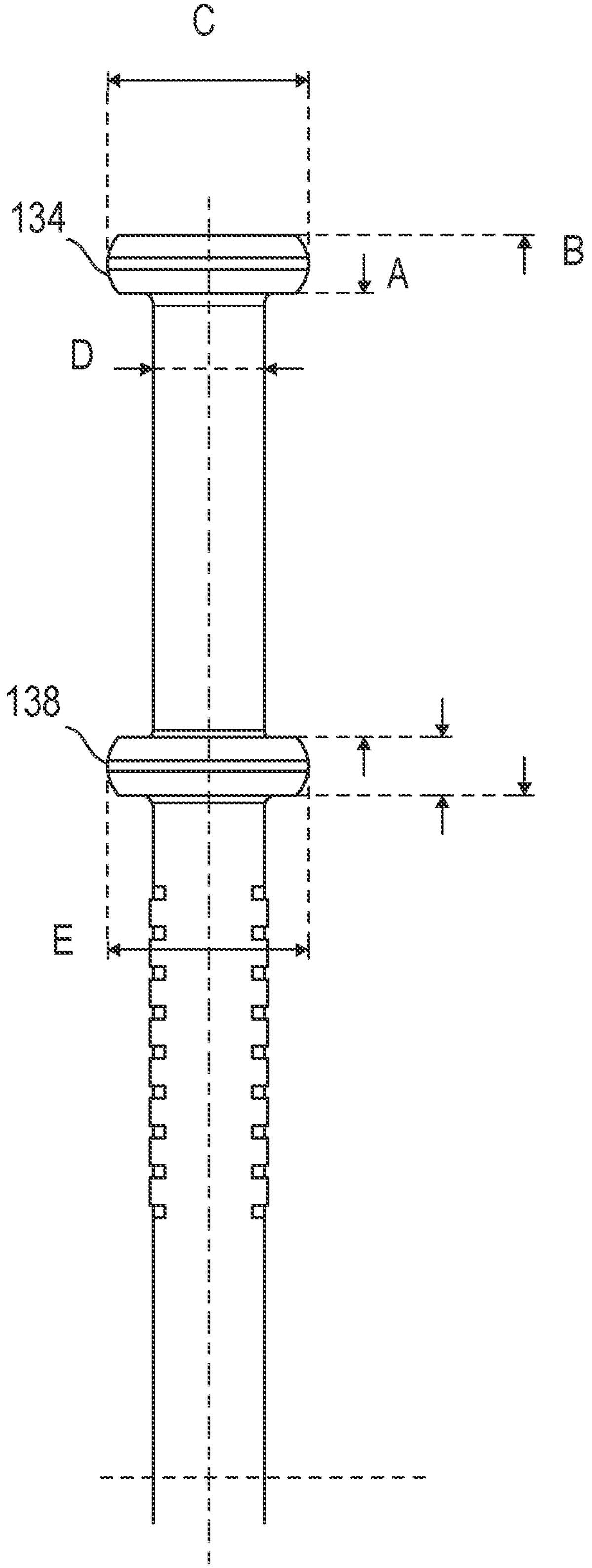
FIG. 8B is a side view of a portion one of the nails of the collate strip of nails of FIG. 7.
Figure 9:
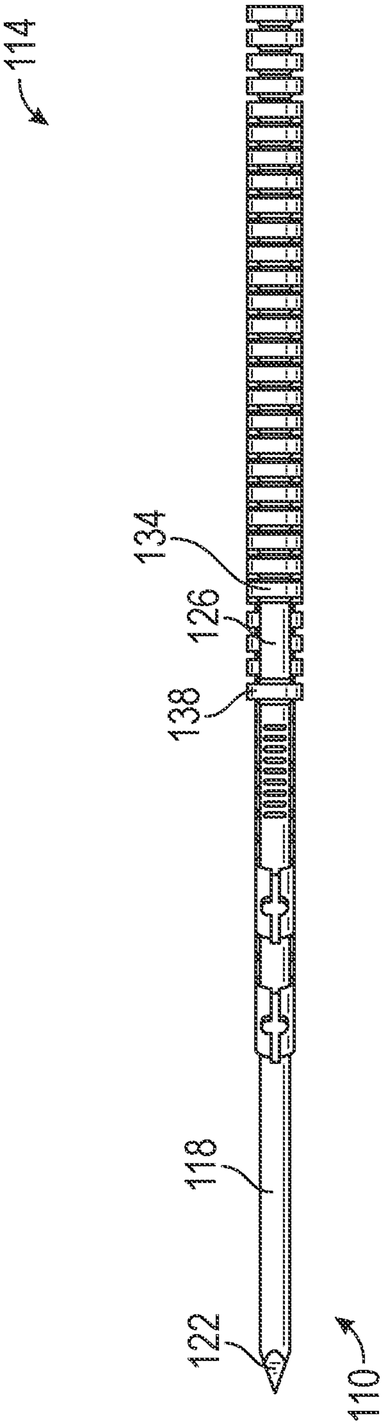
FIG. 9 is a side view of the collated strip of nails of FIG. 7.
Figure 10:
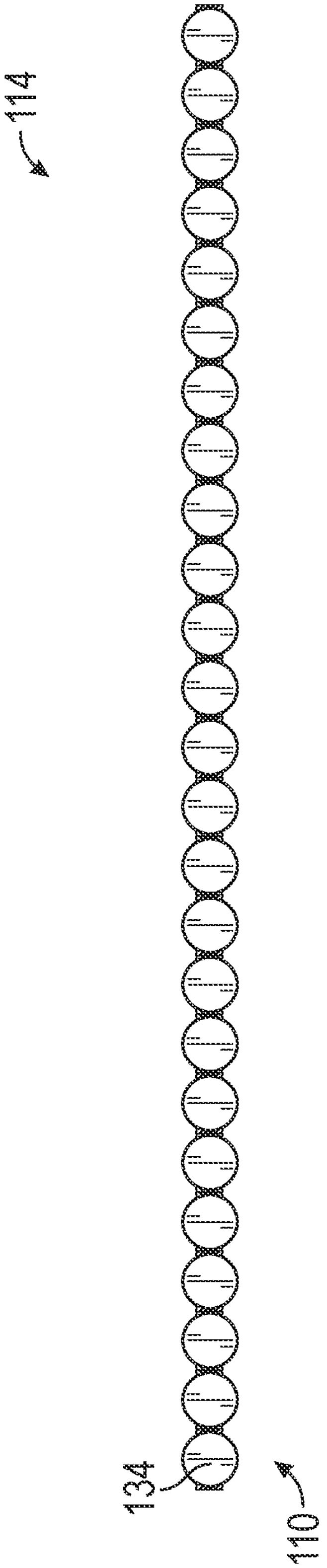
FIG. 10 is a top view of the collated strip of nails of FIG. 7.
Figure 11:
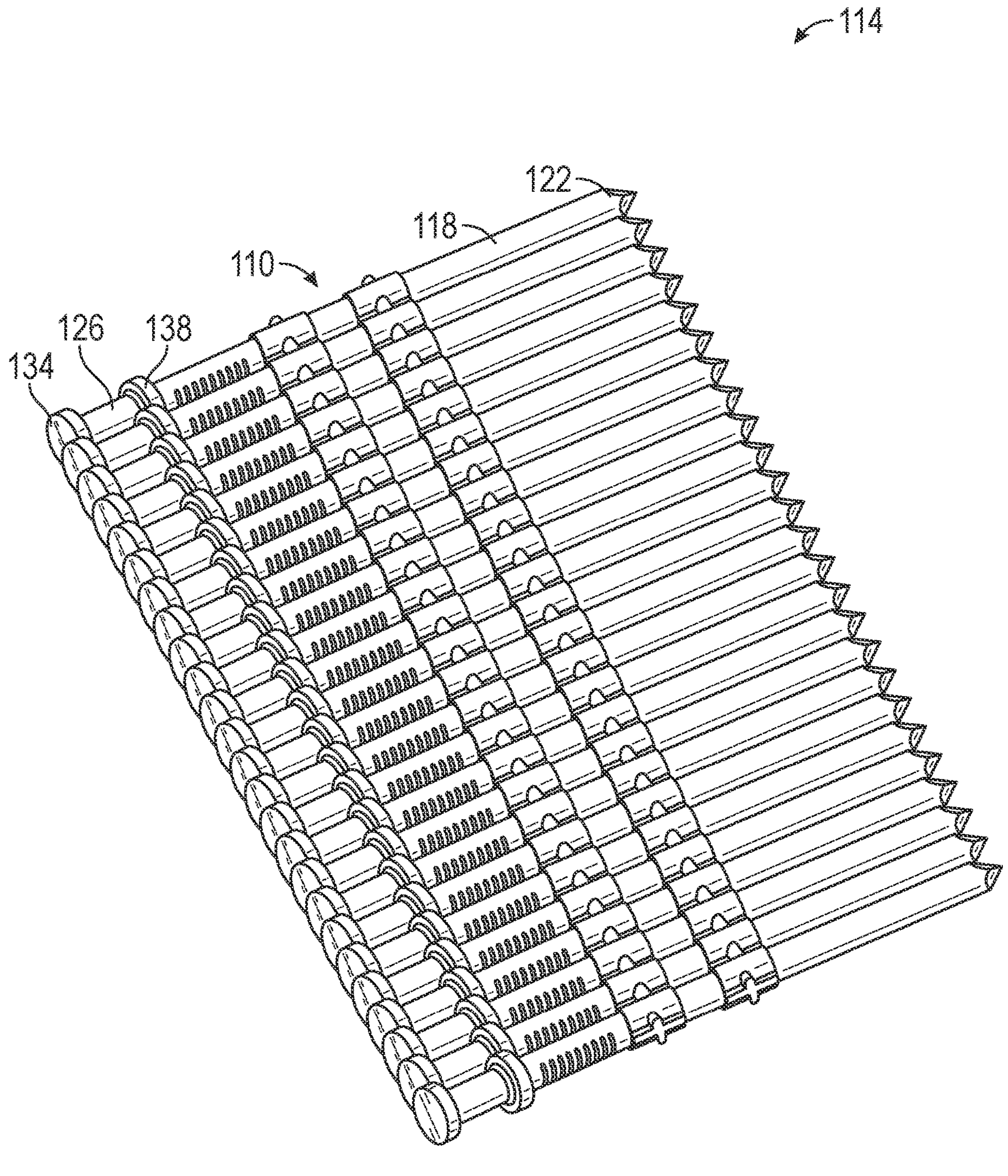
FIG. 11 is a perspective view of a collated strip of nails according to another embodiment of the invention.

With reference to FIG. 8, when the nails 110 are collated to form collated nails 114, the distance between the bodies 118 of adjacent nails 110 is greater than the distance between the bodies 18 of adjacent nails 10 (FIG. 20). This is due to the second heads 138 not having a truncated shape, and avoids interference between adjacent nails 110 during firing of the nailer device. As shown in FIG. 12, the angle of the collated nails 114 may be increased (e.g., approximately 30 degrees) to improve balance by shifting the magazine/nail weight more to the back of the nailer device.

Figure 14A:
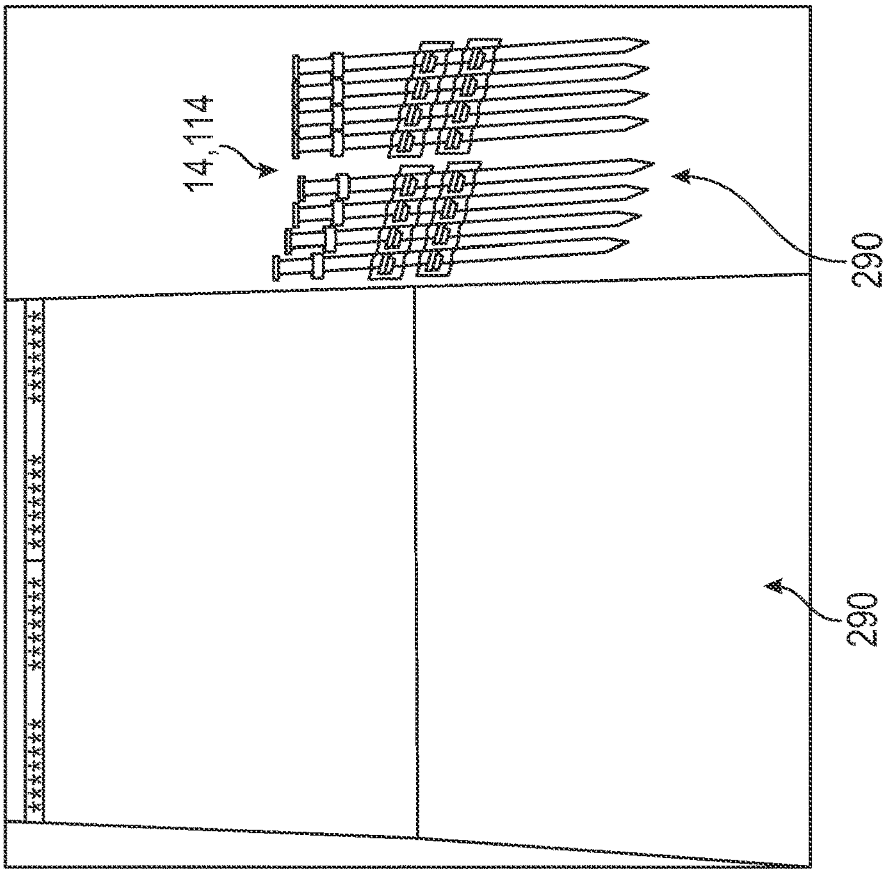
FIG. 14A illustrates the nails of the collated strips of nails of either the embodiment of FIGS. 1-7 or FIGS. 7-13B with a coating with a UV tracer.
Figure 14B:
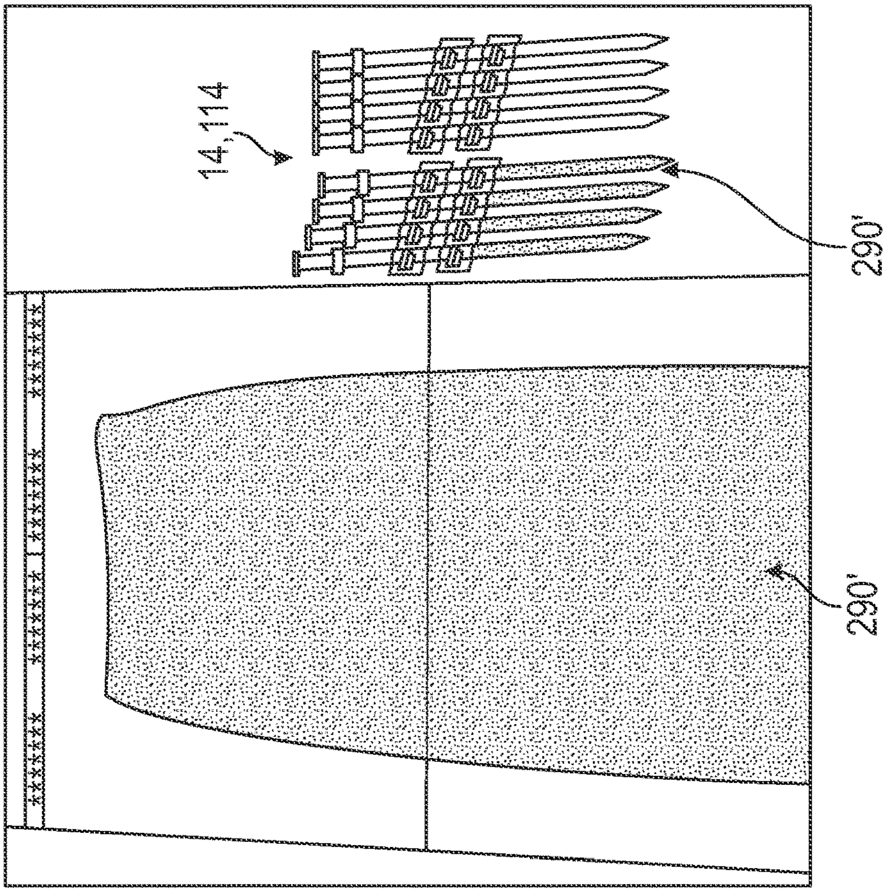
FIG. 14B illustrates the nails of the collated strips of nails of either the embodiment of FIGS. 1-7 or FIGS. 7-13B with a coating without a UV tracer.

In either of the embodiments of FIGS. 1-6 and 7-13B, the nails 10, 110 may include a clear coating 290, 290', as shown in FIGS. 14A and 14B. The nail coating 290, 290' is used to increase a holding force of the nail on the workpiece, improve seating performance within the workpiece, and yet requires minimize removal force. Because the coating 290 is clear (FIG. 14B), a UV tracer may be included in the coating 290' (FIG. 14A). The UV tracer in the coating 290' allows the coating to be inspected under a blacklight, as shown in FIG. 14A, to ensure adequate coverage on each of the nails 10, 110 in the collation.

Figure 29:
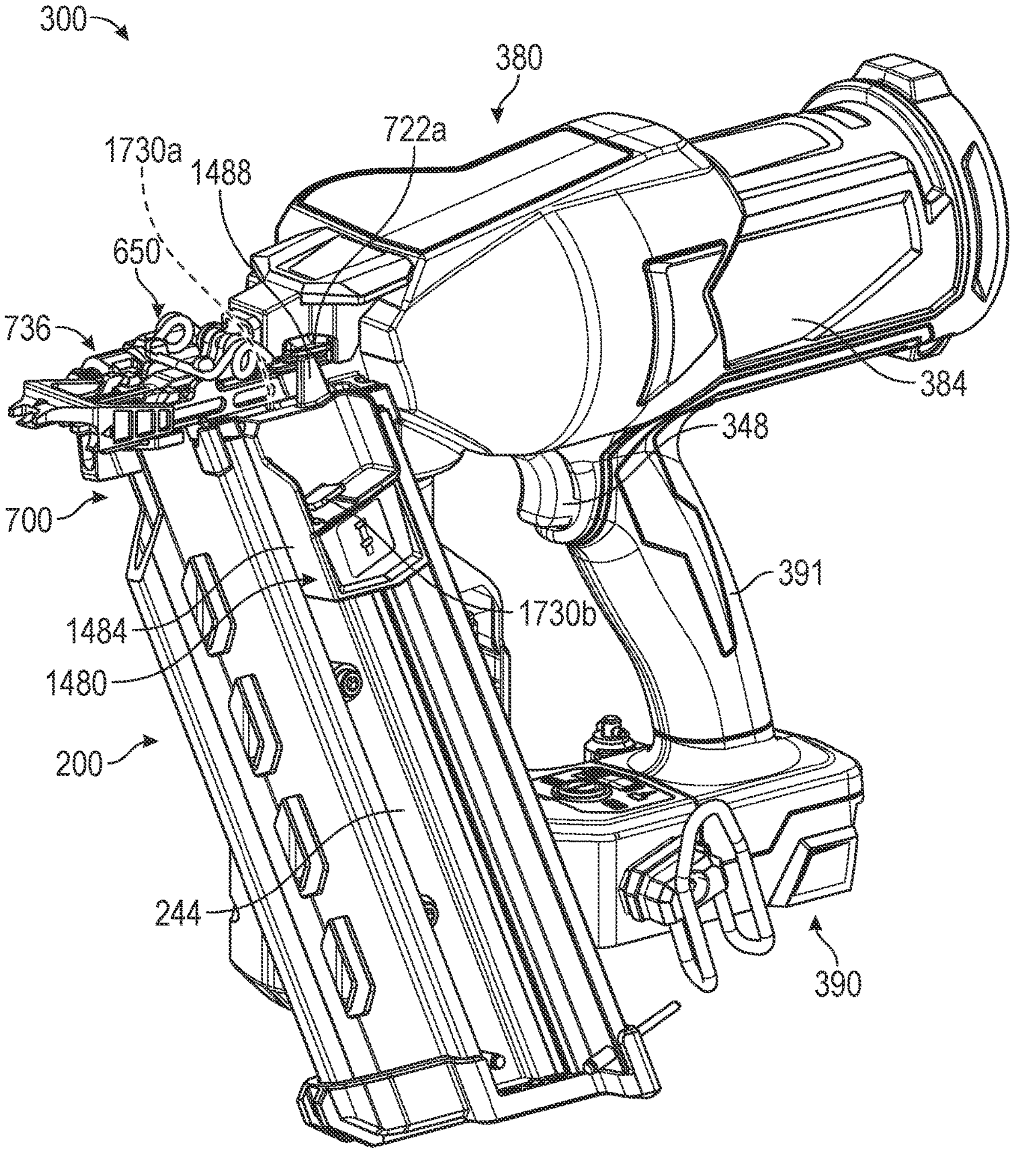
FIG. 29 is a perspective view of a powered fastener driver including a housing, a nosepiece assembly, a workpiece contact assembly, and the magazine of FIG. 25.

FIGS. 29-30 illustrate a powered impact or nailer device 300, with which the magazine 200 is usable.

Figure 31:
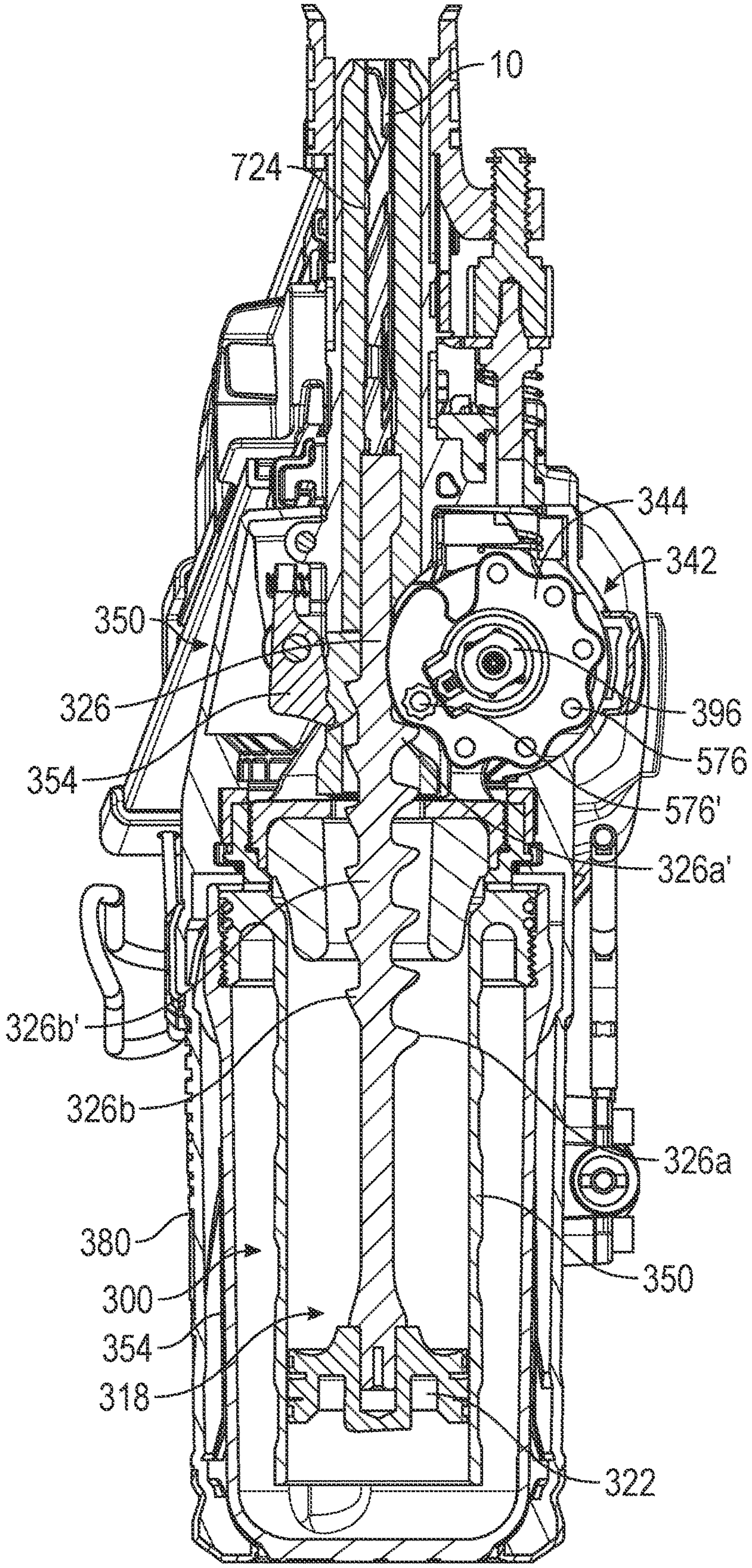
FIG. 31 is cross-sectional view of the powered fastener driver of FIG. 29 along the line 31-31 of FIG. 30A.
Figures 32A, 32B:
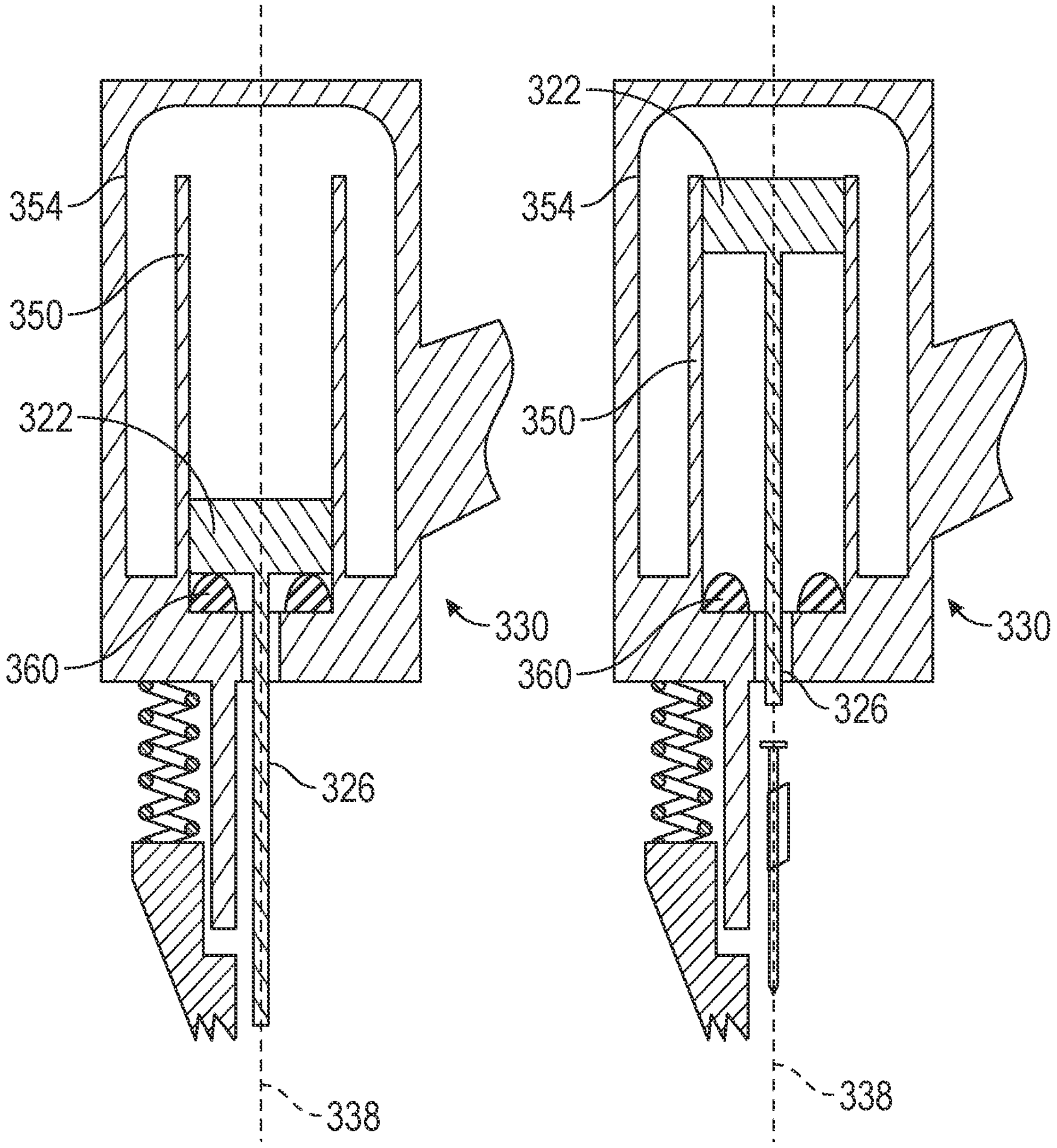
FIG. 32A is a schematic view of the powered fastener driver of FIG. 29, illustrating a driver blade in a driven or bottom-dead-center position.
FIG. 32B is a schematic view of the powered fastener driver of FIG. 29, illustrating a driver blade in a top-dead-center position prior to actuation.

In the illustrated embodiment, the nailer device 300 is a gas spring-powered fastener driver that is operable to drive the nails (or other suitable fastener, such as tacks, staples, etc.) held within the magazine 200 into a workpiece. The fastener driver 300 includes an inner cylinder 318 and a moveable piston 322 positioned within the cylinder 318 (FIGS. 31-32B). With reference to FIG. 31-32B, the fastener driver 300 further includes a driver blade 326 that is attached to the piston 322 and moveable therewith. As shown, and discussed later, the driver blade 326 has lifting teeth **326*a* extending from one side and latching teeth 326*b* extending from an opposite side. The fastener driver 300 does not require an external source of air pressure, but rather includes an outer storage chamber cylinder 330 of pressurized gas in fluid communication with the cylinder 318. In the illustrated embodiment, the cylinder 318 and moveable piston 322 are positioned within the storage chamber cylinder 330. The driver 300 further includes a fill valve (not shown) coupled to the storage chamber cylinder 330. When connected with a source of compressed gas, the fill valve permits the storage chamber cylinder 330** to be refilled with compressed gas if any prior leakage has occurred. The fill valve may be configured as a Schrader valve, for example.

With reference to FIGS. 30B-32B, the cylinder 318 and the driver blade 326 define a driving axis 338. During a driving cycle, the driver blade 326 and piston 322 are moveable between a top-dead-center (TDC) position (FIG. 32B) and a driven or bottom-dead-center (BDC) position (FIG. 32A). The fastener driver 300 further includes a lifting assembly 342 (FIG. 31), which has a lifter 344 (FIGS. 30B and 31) that is powered by a motor 346 (FIG. 30B) and that moves the driver blade 326 from the driven position to the TDC position.

In operation, the lifting assembly 342 drives the piston 322 and the driver blade 326 toward the TDC position by energizing the motor 346. As the piston 322 and the driver blade 326 are driven toward the TDC position, the gas above the piston 322 and the gas within the storage chamber cylinder 330 is compressed. Prior to reaching the TDC position, the motor 346 is deactivated and the piston 322 and the driver blade 326 are held in a ready position, which is located between the TDC and the BDC or driven positions, until being released by user activation of a trigger 348 (FIG. 29). When released, the compressed gas above the piston 322 and within the storage chamber cylinder 330 drives the piston 322 and the driver blade 326 to the driven position, thereby driving a fastener into the workpiece. The illustrated fastener driver 300 therefore operates on a gas spring principle utilizing the lifting assembly 342 and the piston 322 to further compress the gas within the cylinder 318 and the storage chamber cylinder 330. Further detail regarding the structure and operation of the fastener driver 300 is provided below.

With reference to FIGS. 30B-32B, the storage chamber cylinder 330 surrounds the cylinder 318. The cylinder 318 has an annular inner wall 350 configured to guide the piston 322 and driver blade 326 along the driving axis 338 to compress the gas in the storage chamber cylinder 330. The storage chamber cylinder 330 has an annular outer wall 354 circumferentially surrounding the inner wall 350. As such, the cylinder 318 is configured to be axially secured to the storage chamber cylinder 330.

With reference to FIG. 30B-32B, the driver 300 includes a bumper 360 positioned beneath the piston 322 for stopping the piston 322 at the driven position (FIG. 32A) and absorbing the impact energy from the piston 322. The bumper 360 is configured to distribute the impact force of the piston 322 uniformly throughout the bumper 360 as the piston 322 is rapidly decelerated upon reaching the driven position (i.e., the bottom dead center position). In the illustrated embodiment, the bumper 360 is positioned between the inner wall 338 of the cylinder and an inner frame 362, which closes the cylinder 318 and has a slot 363 through which the driver blade 326 is movably received.

Figure 30A:
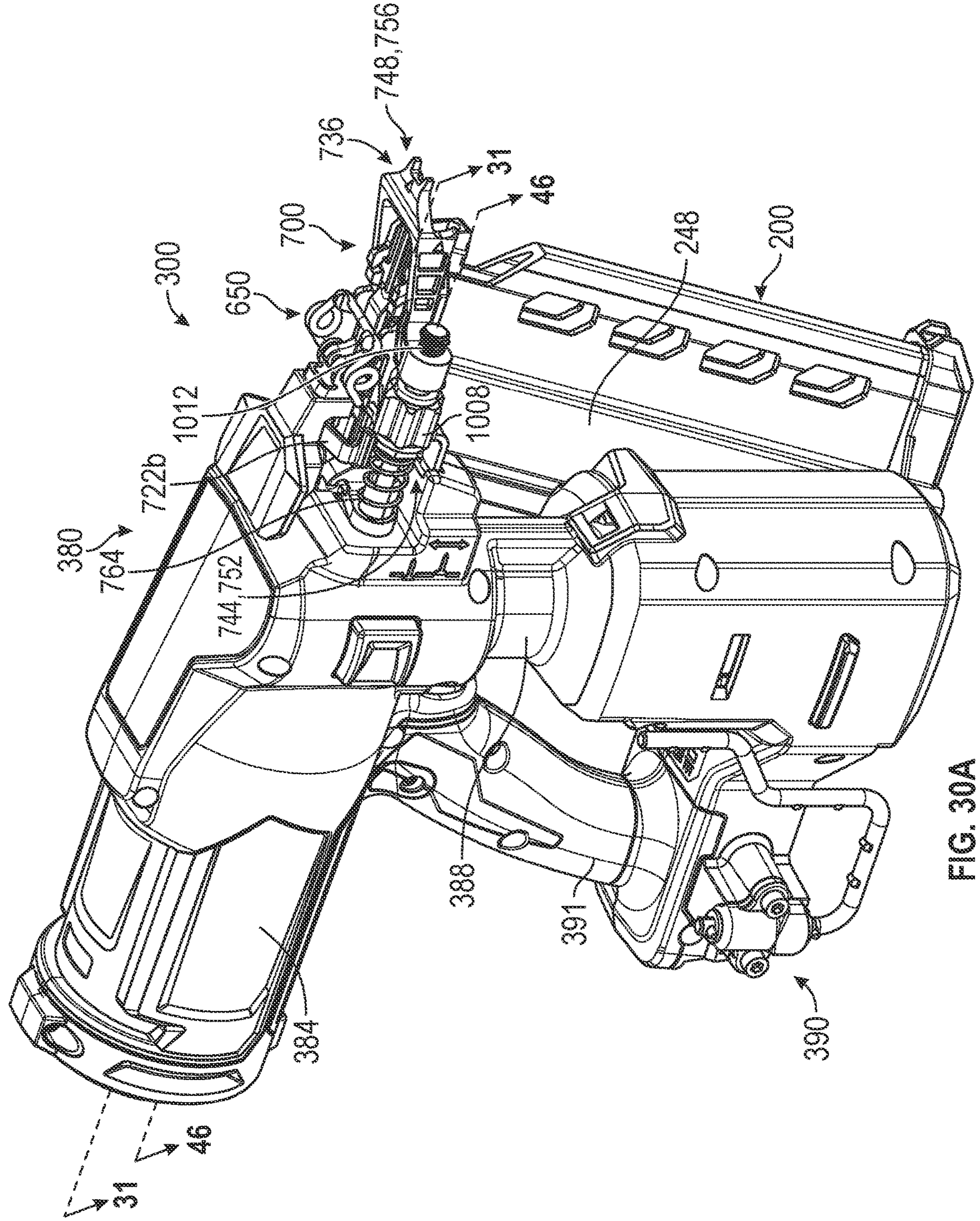
FIG. 30A is a perspective view of the powered fastener driver of FIG. 29.
Figure 30B:
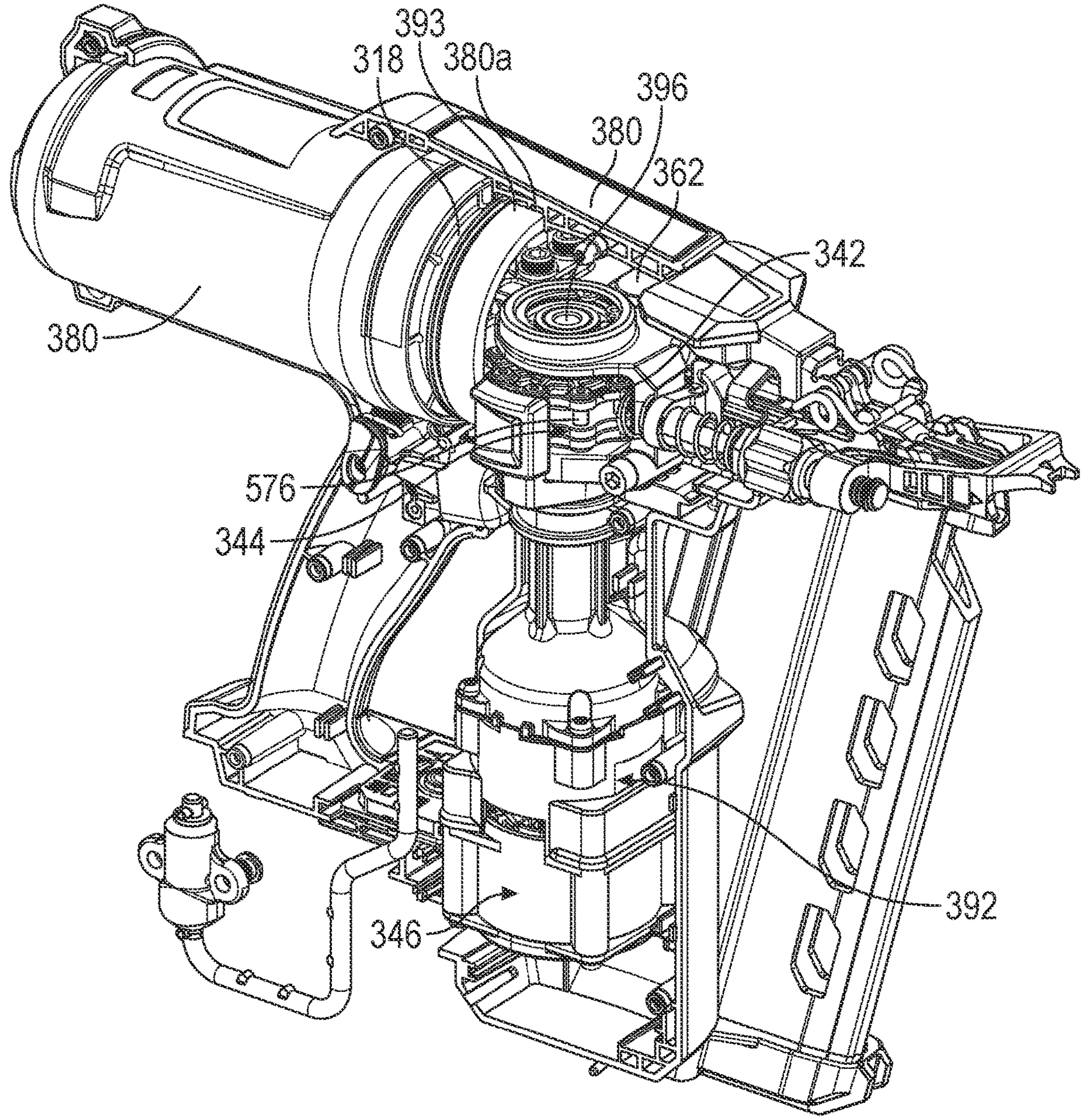
FIG. 30B is a perspective view of the powered fastener driver of FIG. 29 with a portion of the housing removed.

With reference to FIGS. 29 and 30, the driver 300 includes a housing 380 having a cylinder support portion 384 in which the storage chamber cylinder 330 is at least partially positioned, a drive unit support portion 388 in which the motor 346 and a transmission 392 (FIG. 30B) are at least partially positioned, and a handle portion 391. In the illustrated embodiment, the cylinder support portion 384 extends between the drive unit support portion 388 and the handle portion 391. In the illustrated embodiment, the cylinder support portion 384, the drive unit support portion 388, and the handle portion 391 are integrally formed with one another as a single piece (e.g., using a casting or molding process, depending on the material used). As described below in further detail, the transmission 392 raises the driver blade 326 from the driven position to the ready position. The motor 346 is positioned within the drive unit support portion 388 for providing torque to the transmission 392 when activated. A battery pack (not shown) is received and supported by a battery pack attachment interface 390 of the handle portion 391. The battery pack is electrically connectable to the motor 346 for supplying electrical power to the motor 346. In alternative embodiments, the driver may be powered from an alternative power source such as an AC voltage input (i.e., from a wall outlet), or by an alternative DC voltage input (e.g., an AC/DC converter).

With respect to FIGS. 33A-33E, a dampening element or bumper 393 is disposed between the housing (e.g., cylinder chamber support portion 384) and the storage chamber cylinder 330, the cylinder 318, and/or the inner frame 362. In the embodiments shown in FIGS. 33A-33D, the dampening element 393 has a substantially cylindrical portion **393*a* and a flange 393*b* at one end of the cylindrical portion 393*a*. Accordingly, the dampening element 393 has L-shaped in cross-section. In other embodiments, the dampening element 393 may include any suitable shape. In the illustrated embodiment, the cylindrical portion 393*a* extends generally parallel to the driving axis 338 and the flange portion 393*b* extends generally perpendicular to the driving axis 338. Also, the flange 393***b* extends from the cylindrical portion 393*a* radially in a direction towards the driving axis 338.

Figure 33A:
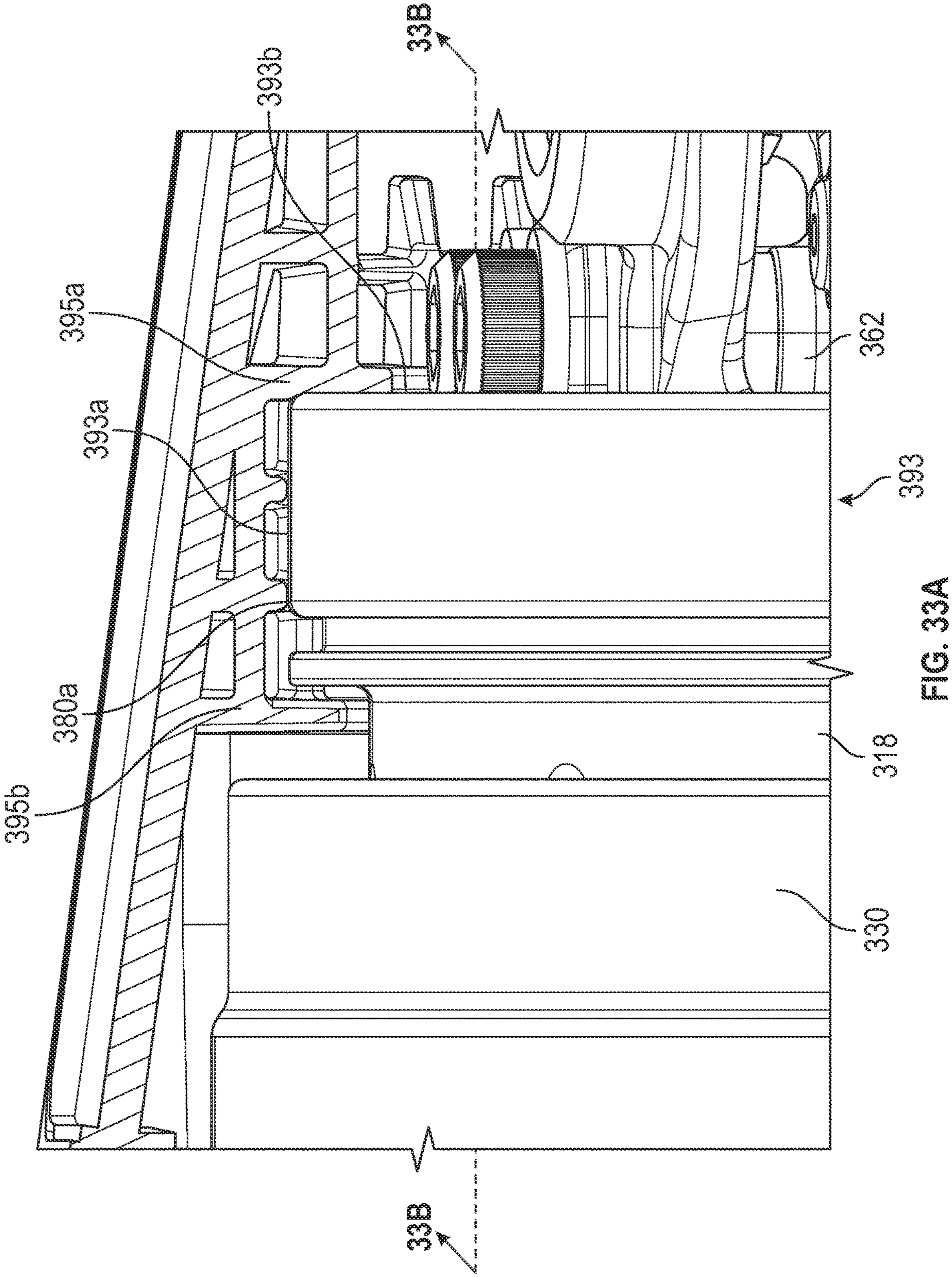
FIG. 33A is detailed view of a portion of the powered fastener driver of FIG. 29 illustrating a dampening element positioned within the housing and with a portion of the housing removed.
Figure 33B:
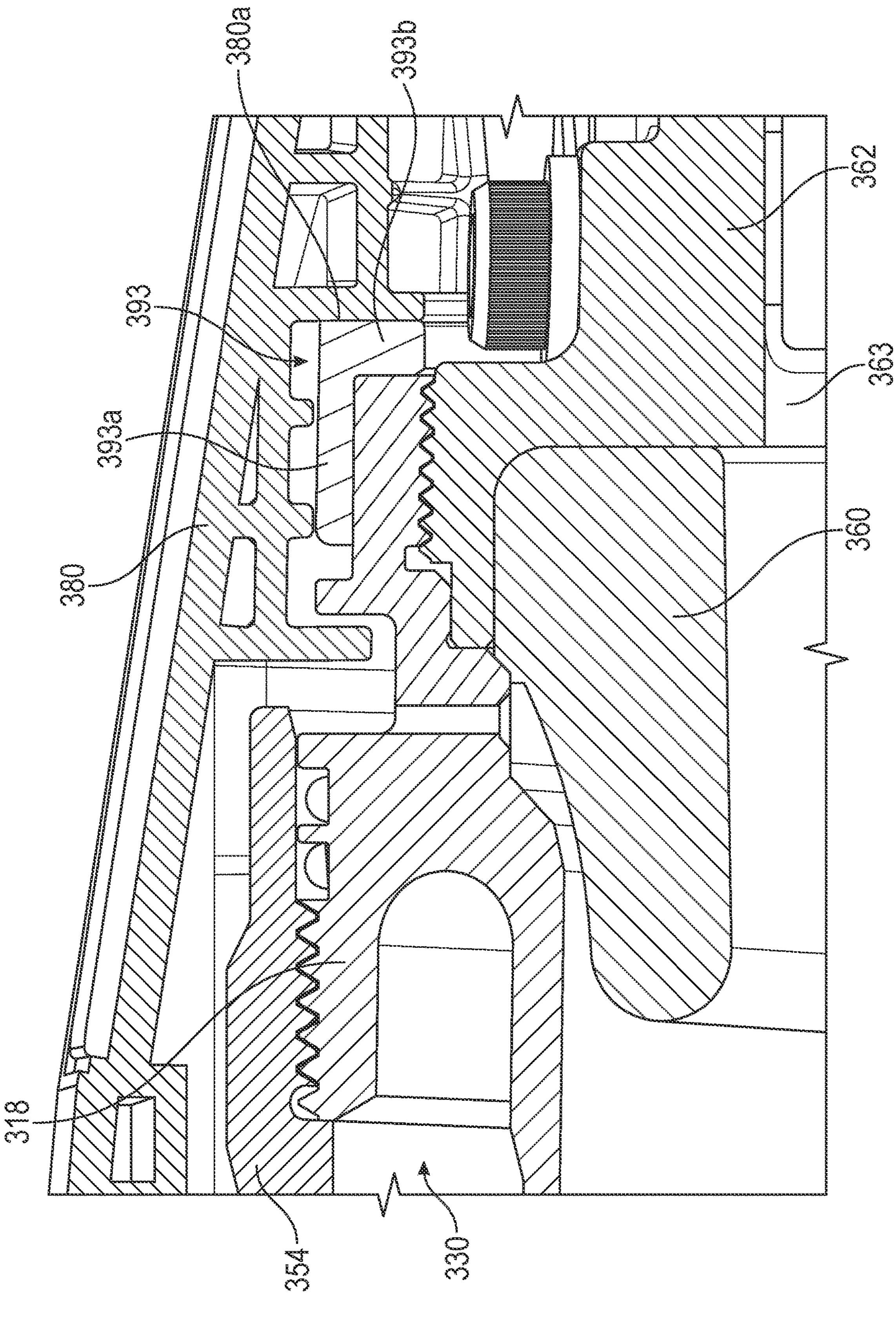
FIG. 33B is a cross-sectional view of the powered fastener driver of FIG. 29 along the line 33B-33B of FIG. 33A illustrating the dampening element of FIG. 33A.

In one embodiment, shown in FIGS. 33A and 33B, the cylindrical portion 393*a* surrounds a surface of the cylinder 318 and is positioned adjacent an interior surface 380*a* of the housing 380. The flange 393*b* abuts another surface of the cylinder 318. Accordingly, the dampening element 393 acts on the cylinder 318. In another embodiment, not shown, the cylindrical portion 393*a* surrounds a surface of the cylinder 318 and is positioned adjacent the interior surface 380*a* of the housing 380. The flange 393*b* abuts a surface of the inner frame 362. Accordingly, the dampening element 393 acts on both the cylinder 18 and the inner frame 362. In either case, the housing may include a first rib 395*a* extending radially inwardly from the interior surface 380*a* and a second rib 395*b* extending radially inwardly from the interior surface 380*a*. As shown, the first rib 395*a* is spaced apart from the second rib 395*b*. In the illustrated embodiment, the dampening element 393 is positioned between the first rib 395*a* and the second rib 395*b*. The flange 393*b* abuts the first rib 393*a* and the cylindrical portion 393*a* extends from the flange 393*b* in a direction towards the second rib 395*b*.

Figure 33C:
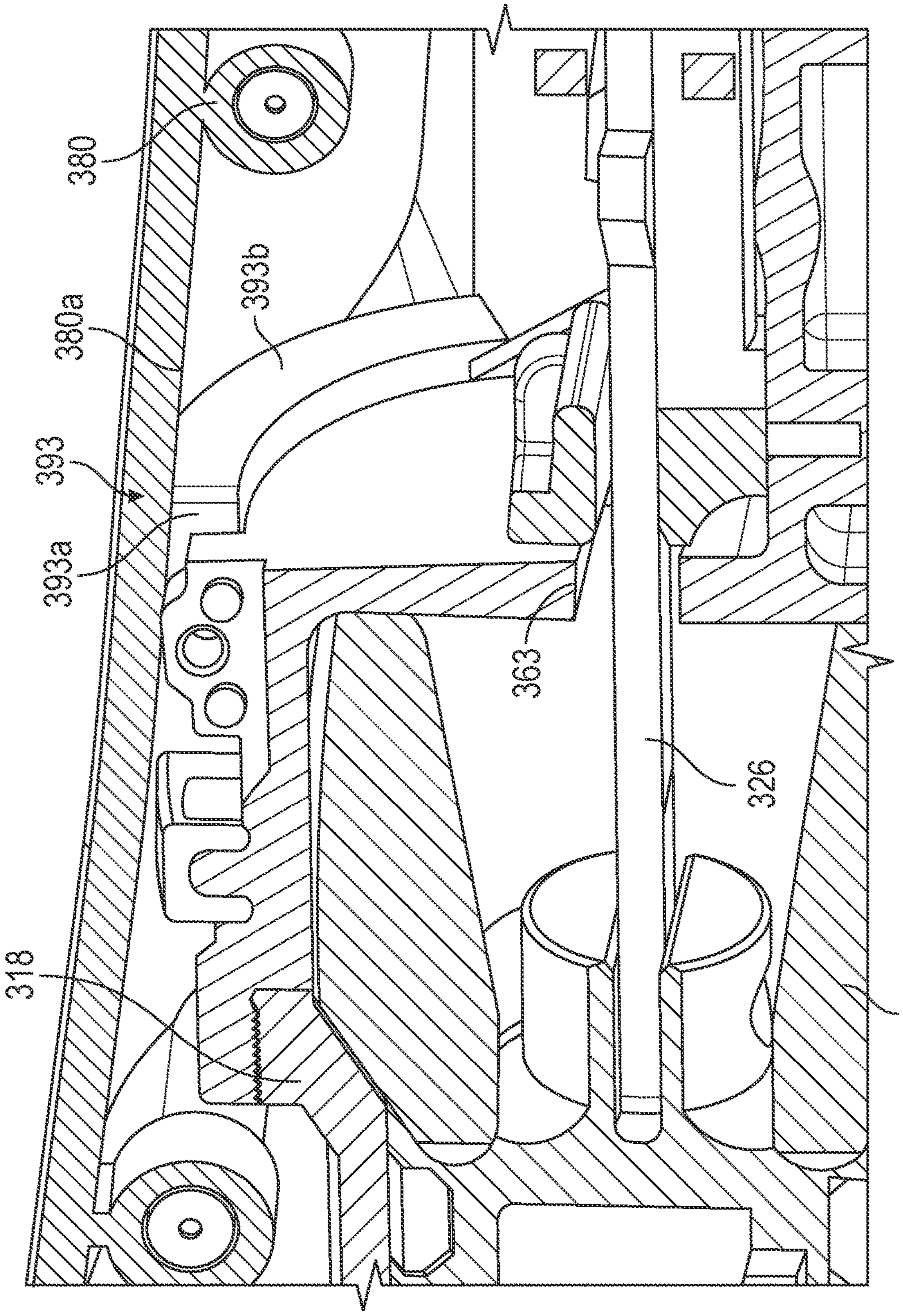
FIG. 33C is a schematic view of another dampening element positioned within the housing of the powered fastener driver of FIG. 29.

In another embodiment, shown in FIG. 33C, the cylindrical portion 393*a* surrounds a surface of the inner frame 362 and is positioned adjacent the interior surface 380*a* of the housing 380. The flange 393*b* abuts another surface of the inner frame 362. Accordingly, the dampening element 393 acts on inner frame 362.

Figure 33D:
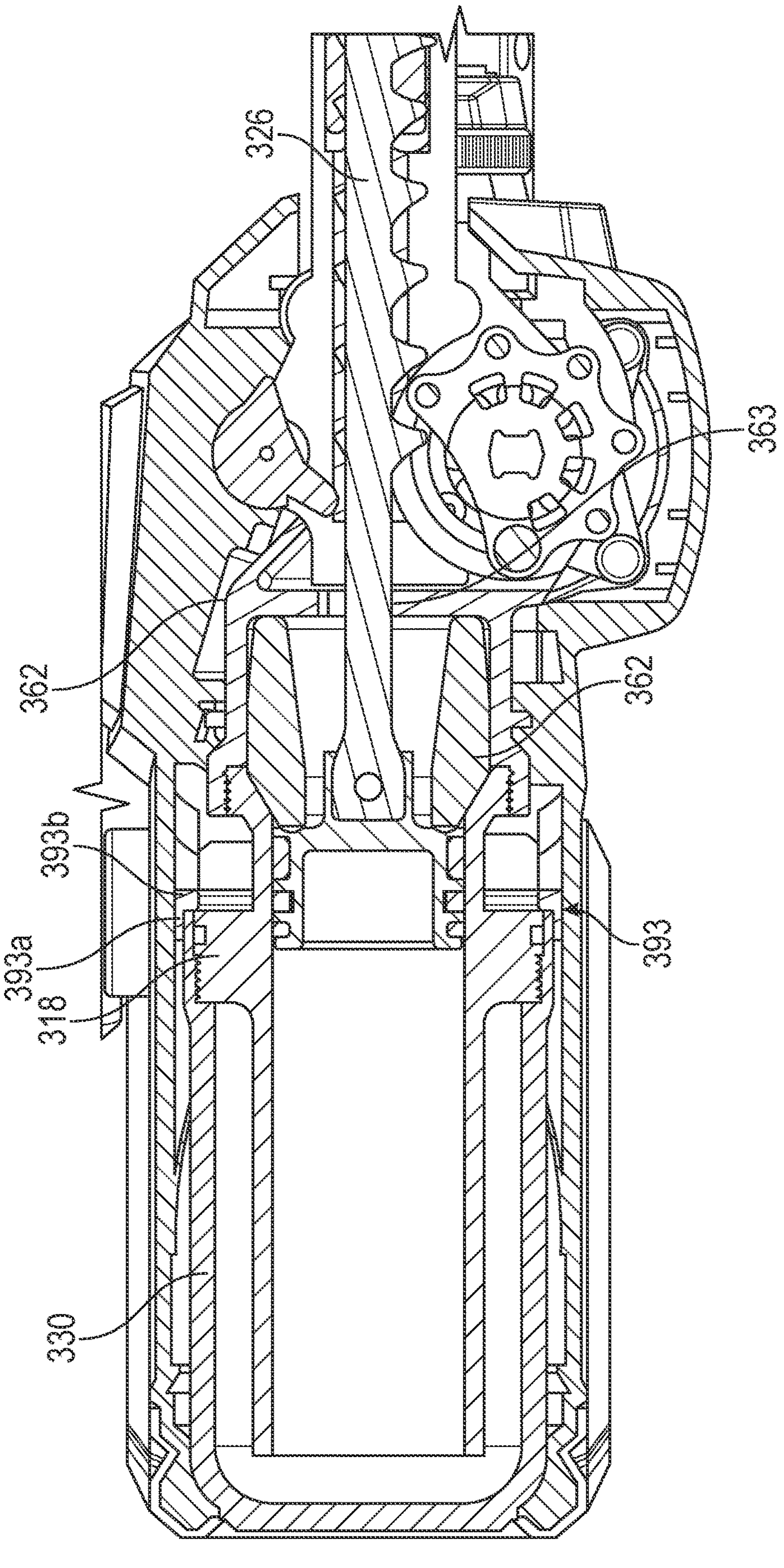
FIG. 33D is a schematic view of another dampening element positioned within the housing of the powered fastener driver of FIG. 29.

In another embodiment, shown in FIG. 33D, the cylindrical portion 393*a* surrounds a surface of the storage cylinder chamber 330 and is positioned adjacent the interior surface 380*a* of the housing 380. The flange 393*b* abuts another surface of the storage cylinder chamber 330 and/or a surface of the cylinder 318. Accordingly, the dampening element 393 acts on either or both of the cylinder 318 and/or storage chamber cylinder 330.

Figure 33E:
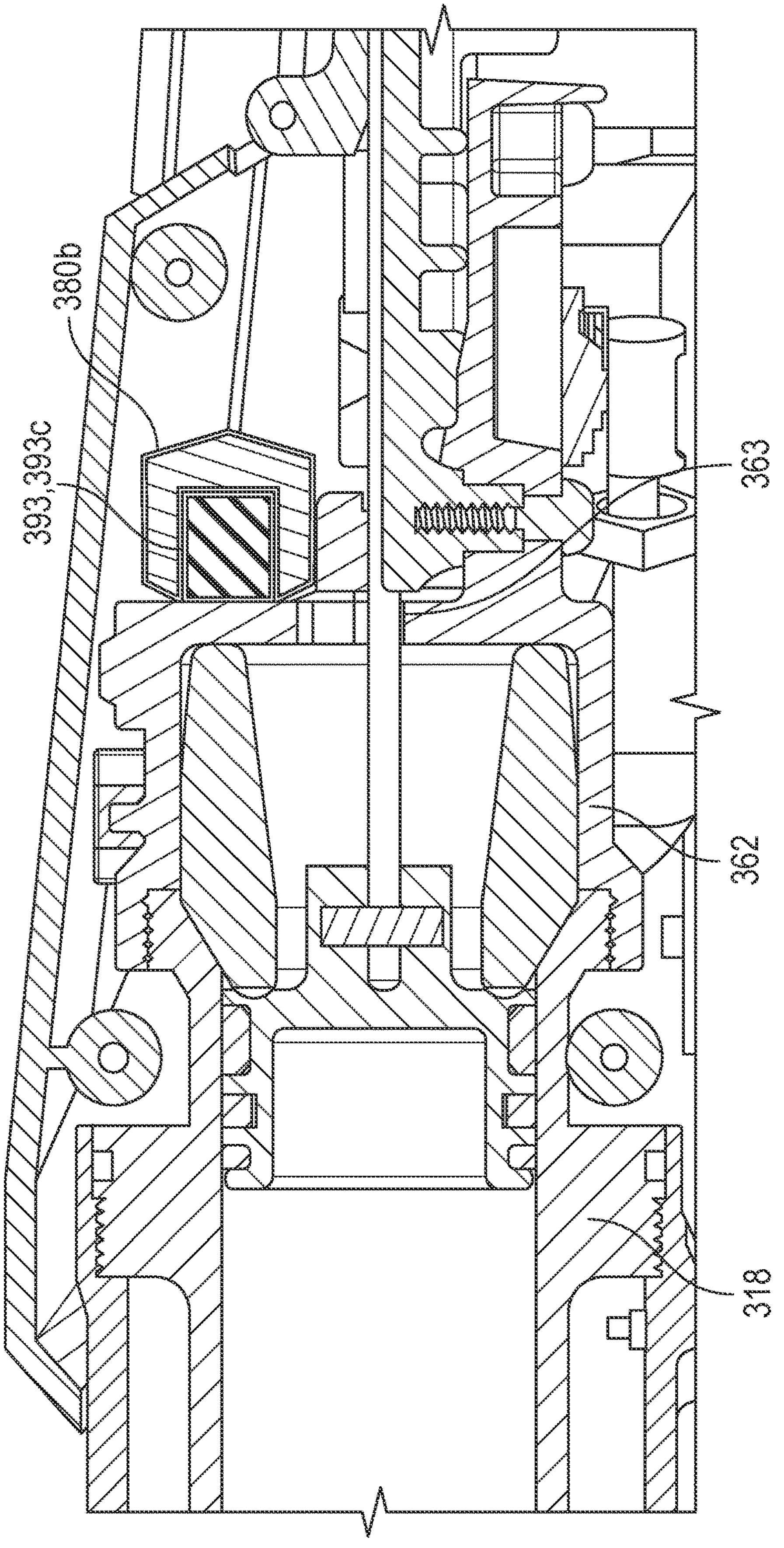
FIG. 33E is a schematic view of another dampening element positioned within the housing of the powered fastener driver of FIG. 29.

In another embodiment, shown in FIG. 33E, the dampening element 393 may be sized and shaped to be matingly received in a recess having a complementary size and shape. In the illustrated example, the dampening element 393 may be configured as a rectangular member or slug 393*c* that is positioned between a surface of the inner frame 362 and a rectangular recess 380*b* in the housing 380 (e.g., an interior surface 380*a* of the housing 380). In other words, the slug 393*c* has an interface that is complementary to the recess 380*b*. The slug and the recess may have other suitable shapes. In some embodiments, the material that forms the recess 380*b* may be the same material as the rest of the housing or it may be different material than the rest of the housing.

The transmission 392 provides torque to the lifter 344 from the motor 346. The transmission 392 includes an input shaft (e.g., not shown, a motor output shaft) and an output shaft 396 extending to the lifter 344, which is operable to move the driver blade 326 from the driven position to the ready position, as explained in greater detail below. In other words, the transmission 392 provides torque to the lifter 100 from the motor 346. The transmission 392 is configured as a planetary transmission having first, second, and third planetary stages (not shown). In alternative embodiments, the transmission may be a single-stage planetary transmission, or a multi-stage planetary transmission including any number of planetary stages.

With reference to FIGS. 30B and 31, the lifter 344, which is a component of the lifting assembly 342, is coupled for co-rotation with the output shaft 396 which, in turn, is driven by engagement with a portion of the transmission 392. The illustrated lifter 344 includes drive pins 576 that are sequentially engageable with the driver blade 326 to raise the driver blade 326 from the driven position to the ready position.

With continued reference to FIG. 31, and as noted above, the driver blade 326 includes lifting teeth 326*a* along the length thereof, and the respective drive pins 576 are engageable with the lifting teeth 326*a* when returning the driver blade 326 from the driven position to the ready position. The illustrated driver blade 326 includes eight lifting teeth 326*a* such that two revolutions of the lifter 344 moves the driver blade 326 from the driven position to the ready position.

As discussed above, the driver blade 326 further includes axially spaced latching teeth or projections 326*b* formed on an extending from the driver blade 326 opposite the lifting teeth 326*a*.

The driver 300 further includes a latch assembly 650 having a pawl or latch 654 for selectively holding the driver blade 326 in the ready position, and a solenoid (not shown) for releasing the latch 654 from the driver blade 326. In other words, the latch assembly 650 is moveable between a latched state in which the driver blade 326 is held in the ready position against a biasing force (i.e., the pressurized gas in the storage chamber cylinder 330), and a released state in which the driver blade 326 is permitted to be driven by the biasing force from the ready position to the driven position.

The operation of a firing cycle for the driver 300 is illustrated and detailed below. With reference to FIGS. 32B, prior to initiation a firing cycle, the driver blade 326 is held in the ready position with the piston 322 near top dead center within the cylinder 318. More specifically, the first drive pin 576' (FIG. 31) on the lifter 344 is engaged with a lower-most tooth 326*a*' (FIG. 31) of the axially spaced teeth lifting 26*a* on the driver blade 326, and the rotational position of the lifter 344 is maintained by a portion of the transmission 392. Also, in the ready position of the driver blade 326, the latch 354 is engageable with a lower-most tooth 326*b*' (FIG. 31) on the driver blade 326, though not necessarily in contact with and functioning to maintain the driver blade 326 in the ready position. Rather, the latch 354 at this instant provides a safety function to prevent the driver blade 326 from inadvertently firing should other safety measures fail.

Upon the trigger 348 being pulled to initiate a firing cycle, the solenoid is energized to pivot the latch 354 from the latched position to the release position, thereby repositioning the latch 354 so that it is no longer engageable with the latching teeth 326*b* (defining the released state of the latch assembly 650). At about the same time, the motor 346 is activated to rotate the output shaft and the lifter 344 in a counter-clockwise direction from the frame of reference of FIG. 31, thereby displacing the driver blade 326 upward past the ready position a slight amount before the lower-most tooth 326*a*' on the driver blade 326 slips off the drive pin 576' (at the TDC position of the driver blade 326). Thereafter, the piston 322 and the driver blade 326 are thrust downward toward the driven position (FIG. 32A) by the expanding gas in the cylinder 318 and storage chamber cylinder 330. As the driver blade 326 is displaced toward the driven position, the motor 346 remains activated to continue counter-clockwise rotation of the lifter 344.

With reference to FIG. 31, upon a fastener being driven into a workpiece, the piston 322 impacts the bumper 360 to quickly decelerate the piston 322 and the driver blade 326, eventually stopping the piston 322 in the driven or bottom dead center position. Additionally, the dampening element 393, shown in FIGS. 33A-33E, dampens the vibration of the cylinder 318 relative to the storage cylinder chamber 330 and the housing 380 that results from the piston impacting the bumper 360.

Shortly after the driver blade 326 reaches the driven position, a first of the drive pins 576 on the lifter 344 engages one of the lifting teeth 326*a* on the driver blade 326 and continued counter-clockwise rotation of the lifter 344 raises the driver blade 326 and the piston 322 toward the ready position. Shortly thereafter and prior to the lifter 344 making one complete rotation, the solenoid is de-energized, permitting the latch 354 to re-engage the driver blade 326 and ratchet around the latching teeth 326*b* as upward displacement of the driver blade 326 continues (defining the latched state of the latch assembly 650).

After one complete rotation of the lifter 344 occurs, the latch 354 maintains the driver blade 326 in an intermediate position between the driven position and the ready position while the lifter 344 continues counter-clockwise rotation (from the frame of reference of FIG. 30B) until the first drive pin 576' re-engages another of the lifting teeth 26*a* on the driver blade 326. Continued rotation of the lifter 344 raises the driver blade 326 to the ready position, which is detected by the sensor as described above.

With reference to FIGS. 29-30B and 34-42, the driver 300 further includes a nosepiece assembly 700 positioned at an end of the magazine 200. As shown, the magazine 200 is positioned and coupled between the nosepiece assembly 700 and the housing 380. The magazine 200 is coupled to the nosepiece assembly 700 as discussed below and is also coupled to at least the drive unit support portion 388 of the housing 380 (e.g., via fasteners or the like). In some embodiments, the magazine 200 may be coupled to both the drive unit support portion 388 and an outer wall of the battery pack attachment interface 390. In still other embodiments, the magazine 200 may be coupled to the housing 380 at an outer wall of the battery pack attachment interface 390, at the handle portion 391, etc. Regardless, the magazine 200 is not removable from the driver 300.

Figure 36A:
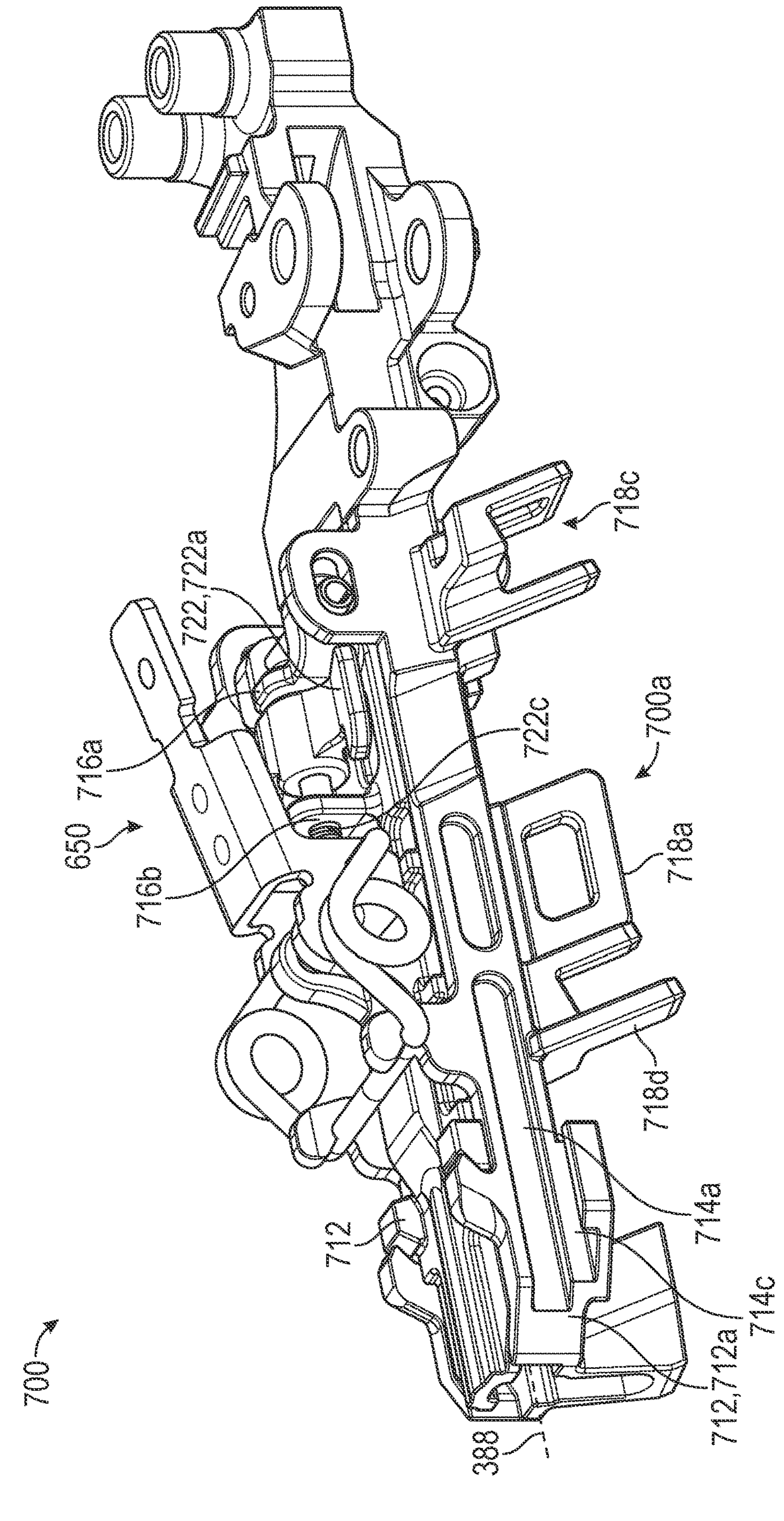
FIG. 36A is another perspective view of the nosepiece assembly of the powered fastener driver FIG. 29.
Figure 36B:
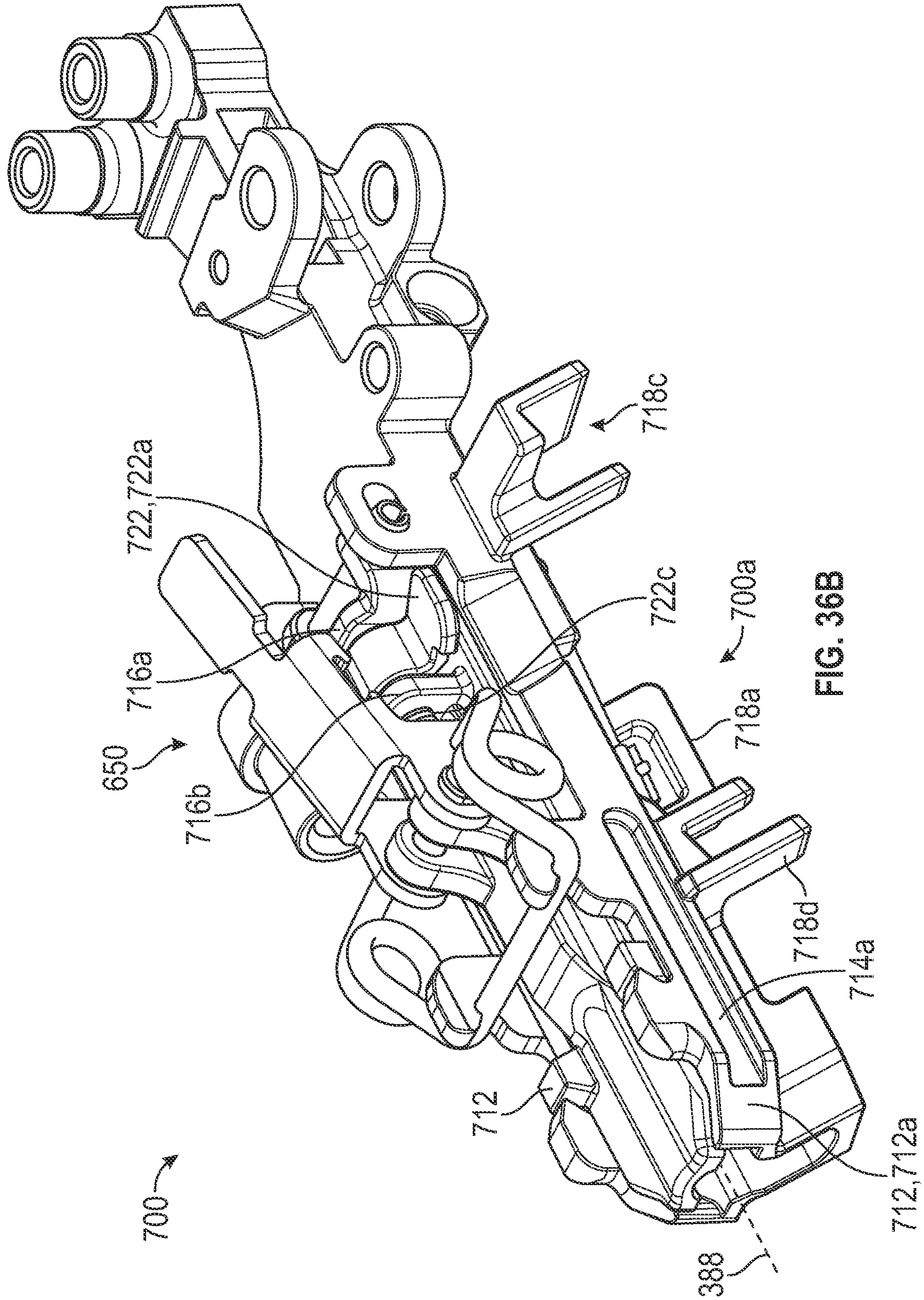
FIG. 36B is another perspective view of the nosepiece assembly of FIG. 35B for use with the powered fastener driver FIG. 29.
Figure 37:
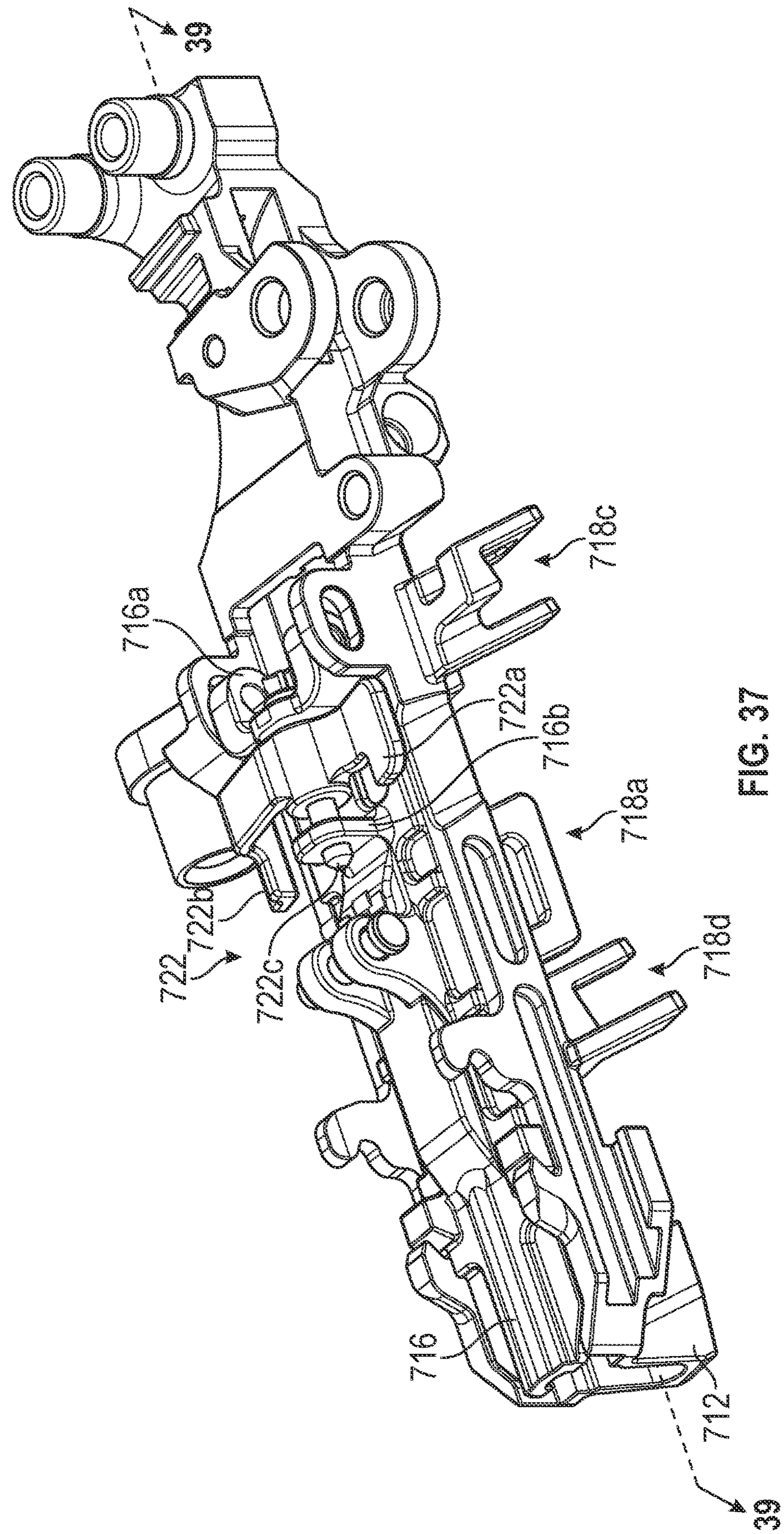
FIG. 37 is another perspective view of the nosepiece assembly of the powered fastener driver FIG. 29.

The nosepiece assembly 700 is positioned at the second end 238 of the magazine 200. The nosepiece assembly 700 includes a first end that is adjacent the housing and second end opposite the first end. The nosepiece assembly 700 generally includes a first, base portion 712 coupled to the second end 238 of the magazine 200 and a second, cover portion 716 coupled to the base portion 712. The nosepiece assembly 700 includes a first side 700*a* and a second side 700*b* opposite the first side 700*a*. In the illustrated embodiment, the base portion 712 has a first slot 714*a* extending along a first side 712*a* and a second slot 714*b* extending along a second side 712*b*. The slots 714*a*, 714*b* are parallel to one another and extend parallel to the driving axis 338. As shown, the slots 714*a*, 714*b* open outwardly and in a direction away from the driving axis 338. The cover portion 716 of the nosepiece assembly 700 substantially covers the base portion 712. Also, in the illustrated embodiment of FIG. 36A, the base portion 712 further includes a track or channel 714*c* extending along the first side 712*a* parallel to the slots 714*a*, 714*b* and a track or channel 714*d* extending along the second side 712*b* parallel to the slots 714*a*, 714*b*. The tracks 714*c*, 714*d* open in a direction towards the cover portion 716. In other embodiments (FIG. 36B), either side 712*a*, 712*b* may include a track 714*c*. In the embodiment of FIG. 36B, the second side has the track 714*a*.

In the illustrated embodiment, the base portion 712 is connected to but vibrationally isolated from the magazine 200 via the dampeners 240, 270*a*, 270*b*, which are positioned between the base portion 712 and the magazine 200. The base portion 712 includes a plurality of projections 718*a*, 718*b*, 718*c* extending generally from a surface opposite the cover portion 716. In the illustrated embodiment, one projection 718*a* extends from the first side 712*a* of the base portion 712 and one projection 718*b* extends from the second side 712*b* of the base portion 712. One of the projections 718*a* is configured to be received in the recess 240*d* in the first portion 240*a* of the middle dampener 240 and the projection 718*b* is configured to be received in the recess 240*d* in the second portion 240*b* of the middle dampener 240. Additionally, a pair of projections 718*c* on one side of the projection 718*a* extend from the first side 712*a* and a pair of projections 718*d* on an opposite side of the projection 718*a* extend from the first side 712*a*. The pairs of projections 718*c*, 718*d* are configured to be received in respective apertures 271*a*, 271*b* of the outer dampeners 270*a*, 270*b*. The dampeners 240, 270*a*, 270*b*, therefore, prevent direct contact between the base portion 712 and the magazine 200, thus vibrationally isolating the nosepiece base 34 from the magazine 26. In particular, as noted above, the dampeners 240, 270*a*, 270*b* may be positioned and coupled between the driver 300 (e.g., the base portion 712 of the nosepiece 700) and the magazine 200 via a transition fit. In other words, while there is some interference between the magazine 200 and the dampeners 240, 270*a*, 270*b*, the dampeners 240, 270*a*, 270*b* are capable of movement relative to the magazine 200. This transition fit between the nosepiece assembly 700 and the magazine 200 in combination with the deformable nature of the dampeners 240, 270*a*, 270*b* make the connection between the base portion 712 and the magazine 200 movable. That is, during a firing event, the nosepiece assembly 700 will move forward and backwards while the dampeners 240, 270*a*, 270*b* "isolate" that movement.

In the illustrated embodiment, the cover portion 716 is pivotally coupled to the base portion 712 by a latch mechanism 720. Additionally, a dry-fire lockout link 722, which is part of a dry-fire lockout mechanism, discussed in greater detail below, is forward of the nosepiece assembly 700. Specifically, in the illustrated embodiment, the dry-fire lockout link 722 is pivotably coupled to the cover portion 716. The dry-fire lockout link 722 includes a first end 722*a* that is positioned on the first side 700*a* of the nosepiece assembly 700 and a second end 722*b* that is positioned on the second side 700*b* of the nosepiece assembly 700. The dry-fire lockout link 722 is supported by the cover portion 716 and is positioned above the latch mechanism 720 such that the dry-fire lockout link 722 moves with the cover portion 716 when the latch mechanism 720 is unlocked and the cover portion 716 is pivoted. In the illustrated embodiment, the dry-fire lockout link 722 is positioned between support members 716*a*, 716*b* of the cover portion 716. Moreover, the dry-fire lockout link 722 is pivotally coupled to the cover portion 716 via a pin 722*c*. As shown, the pin 722*c* extends through the dry-fire lockout link 722 and the support members 716*a*, 716*b* on either side thereof. The pin 722*c* is pivotable about an axis 722*d* (FIG. 38A) that is oriented parallel to the driving axis 338.

Figure 38A:
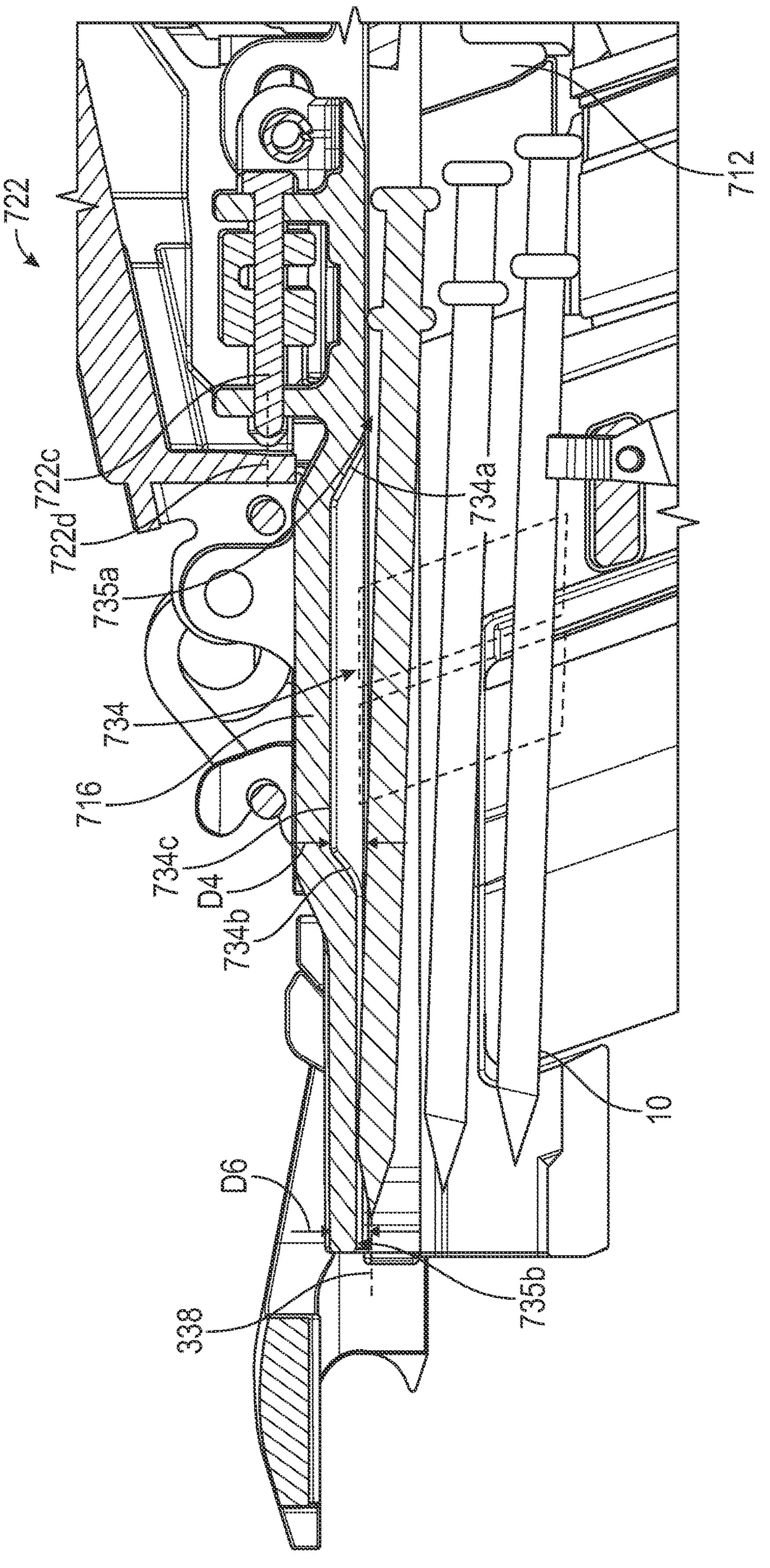
FIG. 38A is a schematic view of the nosepiece assembly of the powered fastener driver of FIG. 29.
Figure 38B:
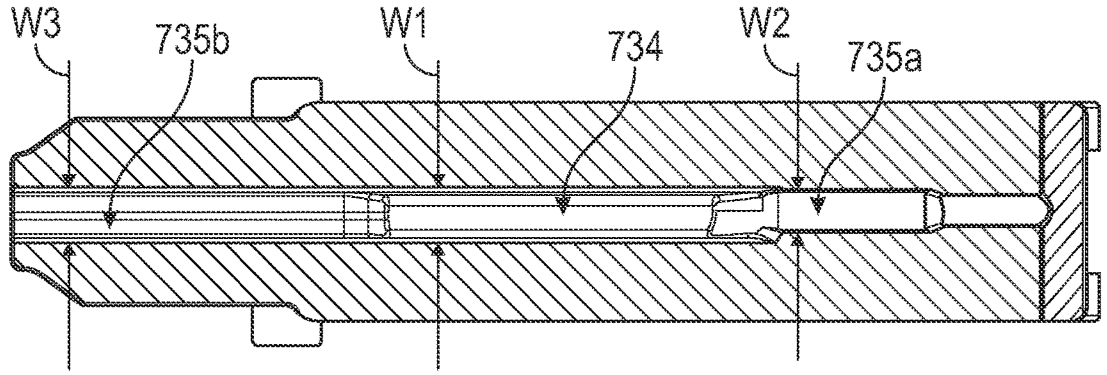
FIG. 38B is a bottom view of a cover portion of the nosepiece assembly of the powered fastener driver of FIG. 29.
Figure 38C:
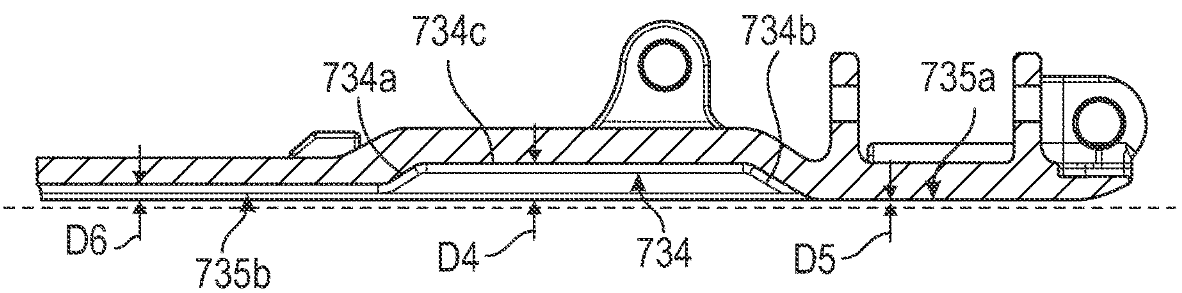
FIG. 38C is a cross-sectional view of the cover portion of FIG. 38B of the nosepiece assembly along the axis 39-39 of FIG. 37.
Figure 39:
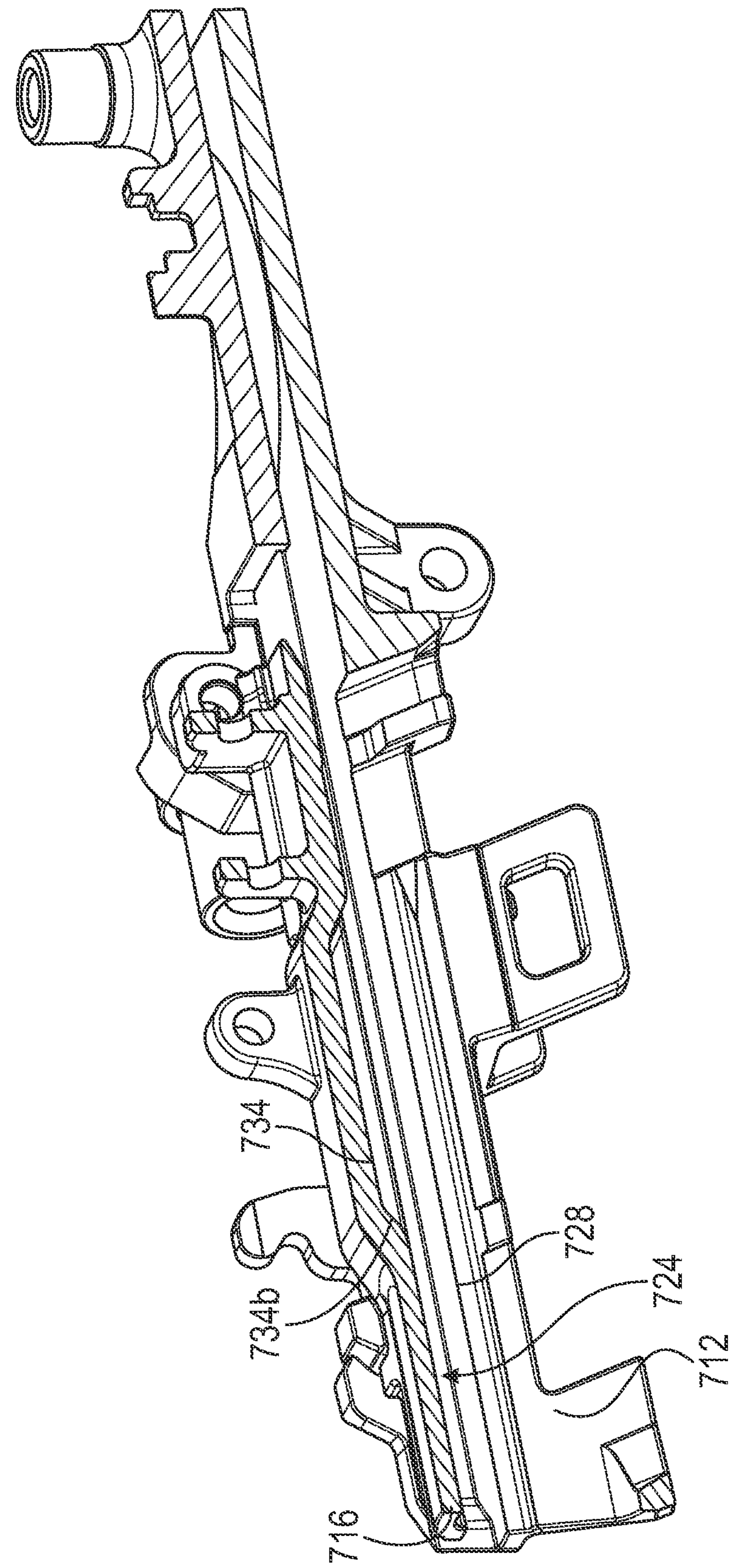
FIG. 39 is a cross-sectional view of the nosepiece assembly of the powered fastener driver of FIG. 29 along the line 39-39 of FIG. 37.
Figure 40:
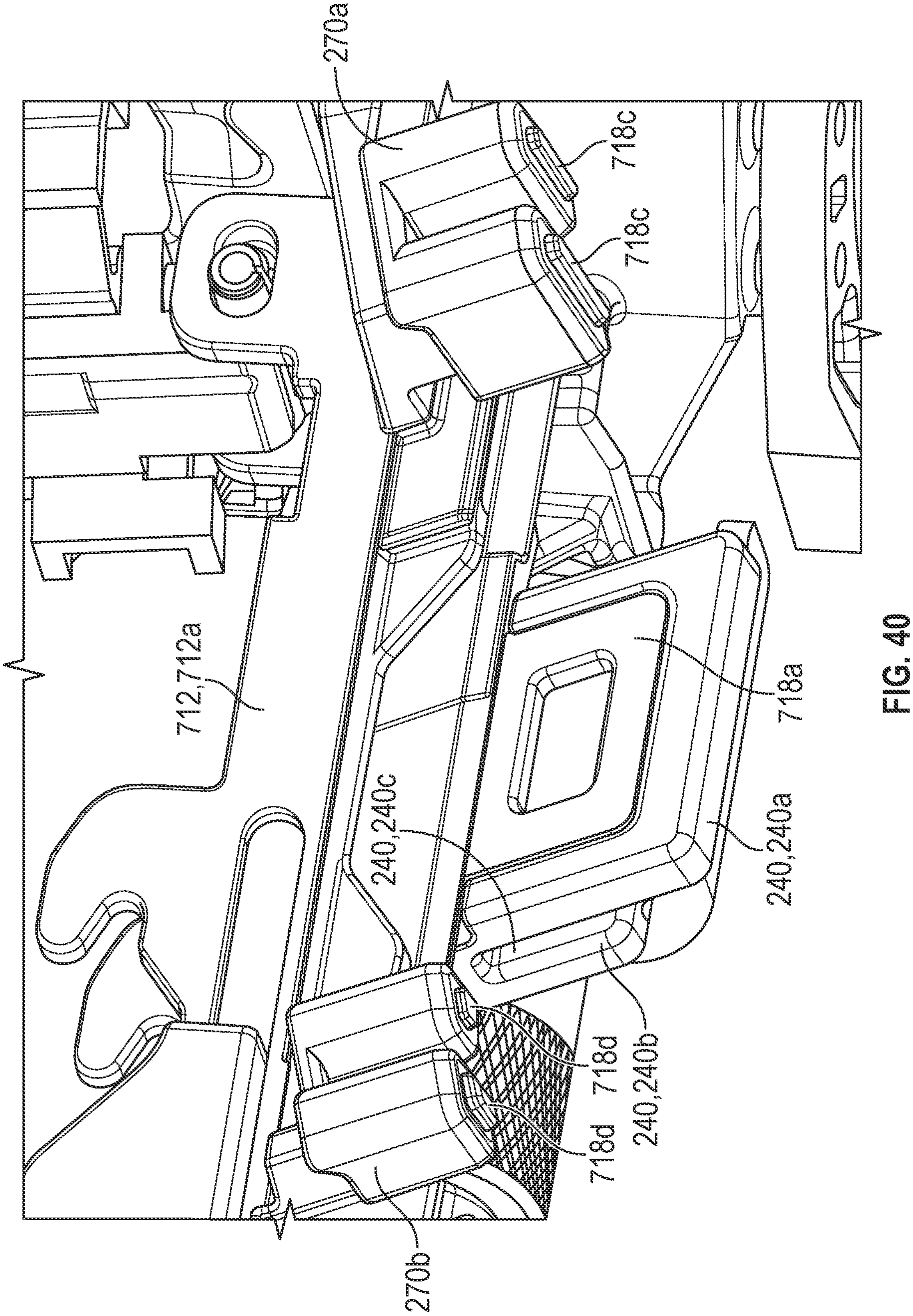
FIG. 40 is a detailed perspective view of a portion of the nosepiece assembly of the powered fastener driver of FIG. 29.
Figure 41A:
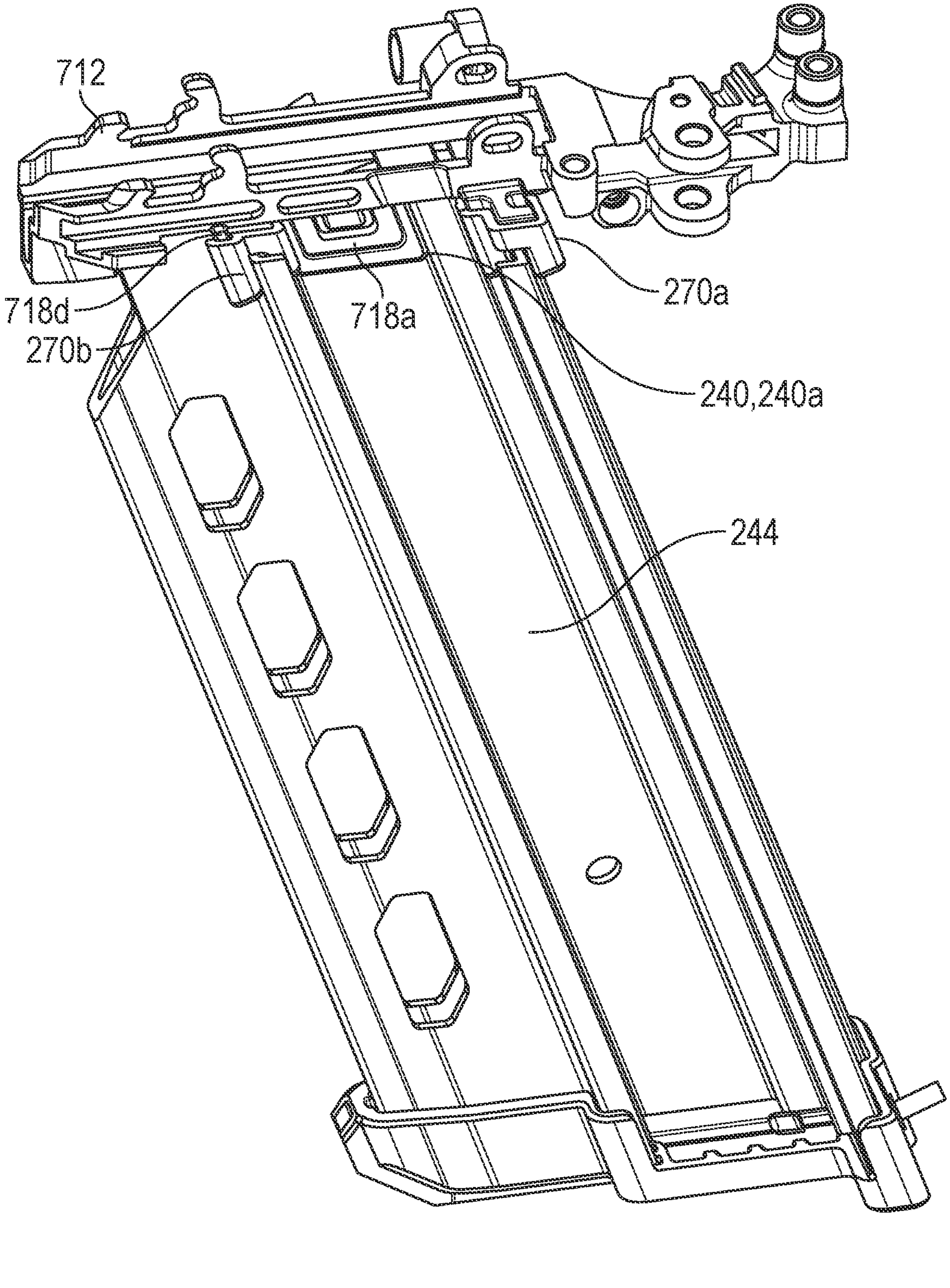
FIG. 41A is a perspective view of a portion of the nosepiece assembly and the magazine of the powered fastener driver of FIG. 29.
Figure 41B:
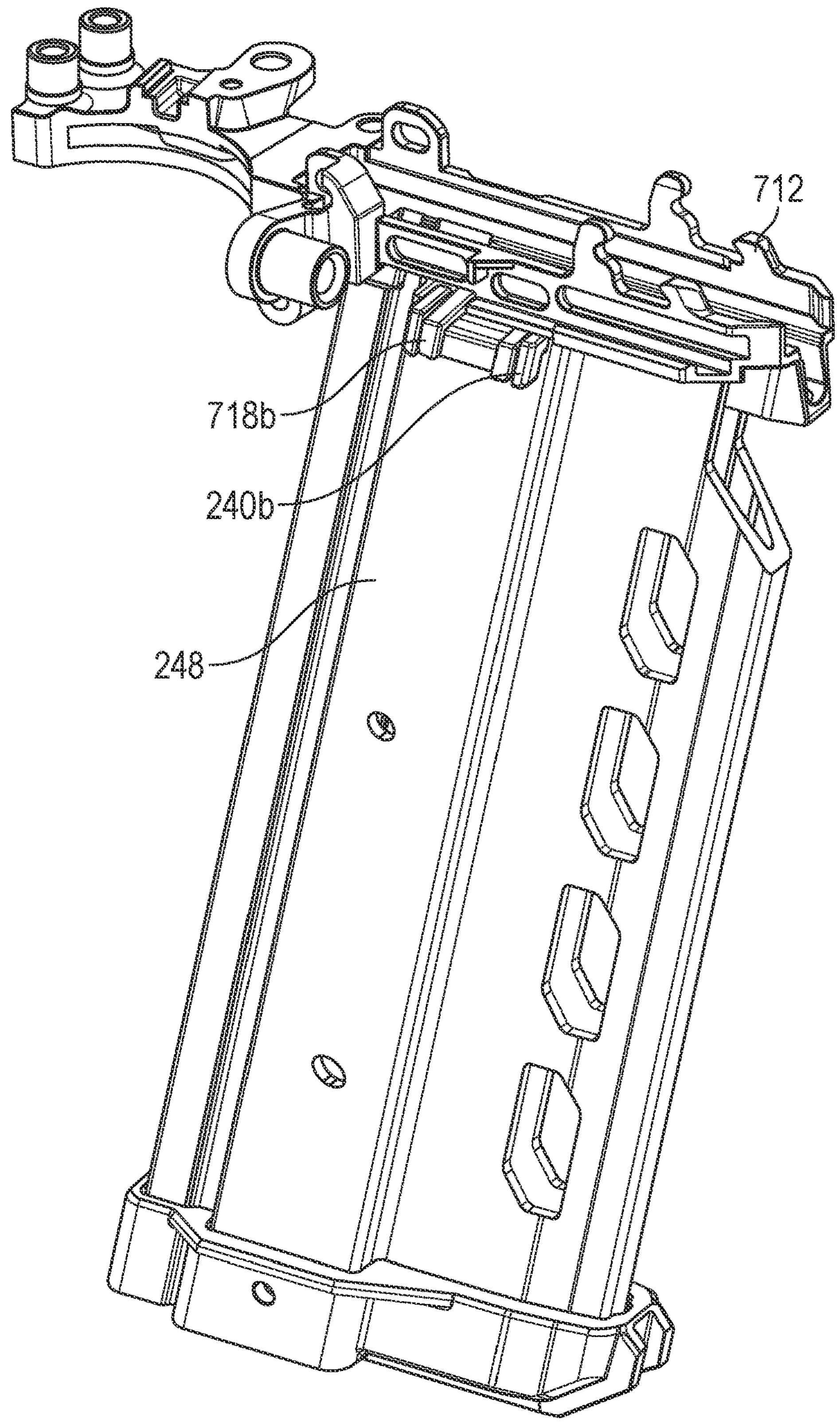
FIG. 41B is another perspective view of a portion of the nosepiece assembly and the magazine of the powered fastener driver of FIG. 29.
Figure 42A:
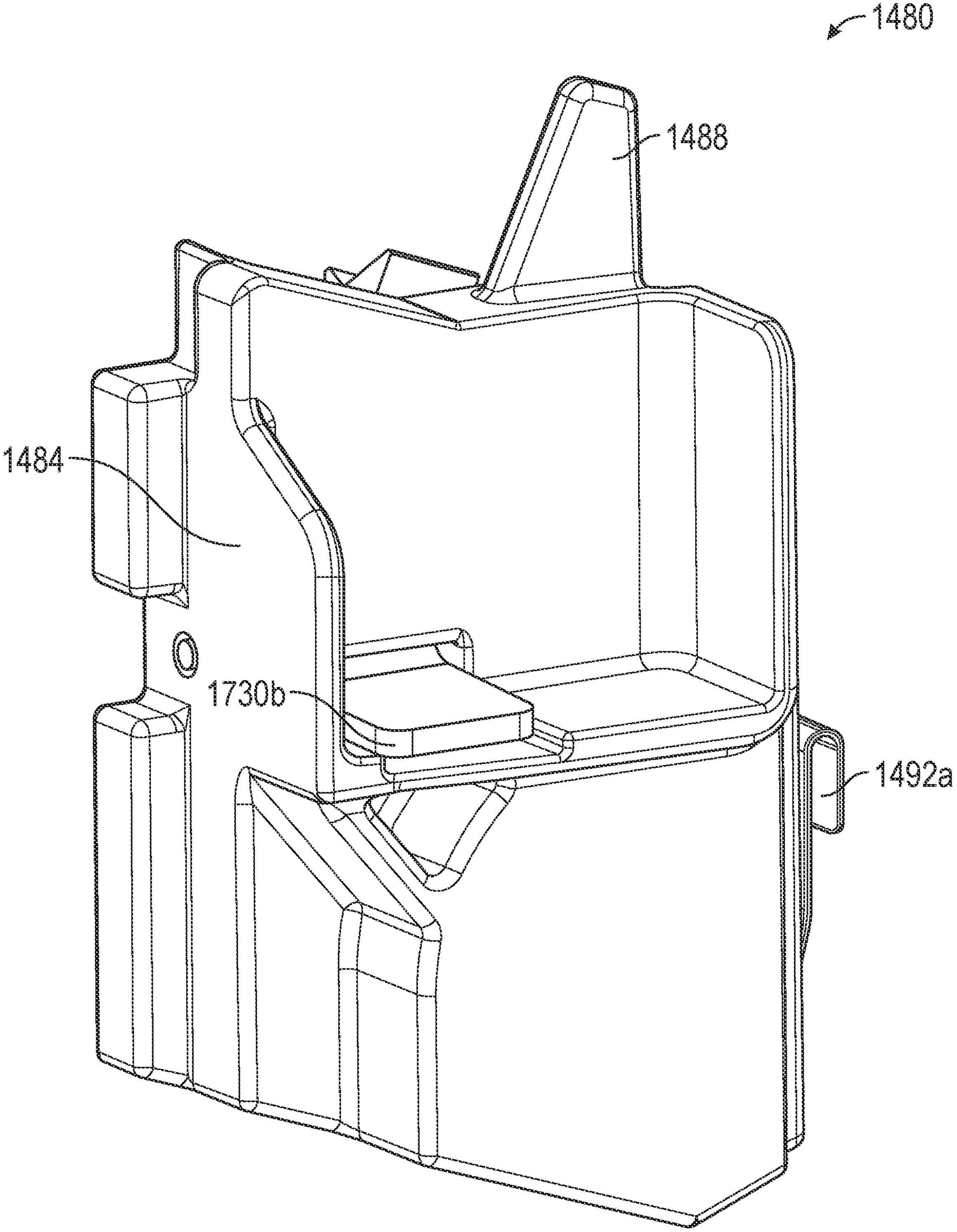
FIG. 42A is a perspective view of a pusher assembly for use with the magazine of the powered fastener driver of FIG. 29.
Figure 42B:
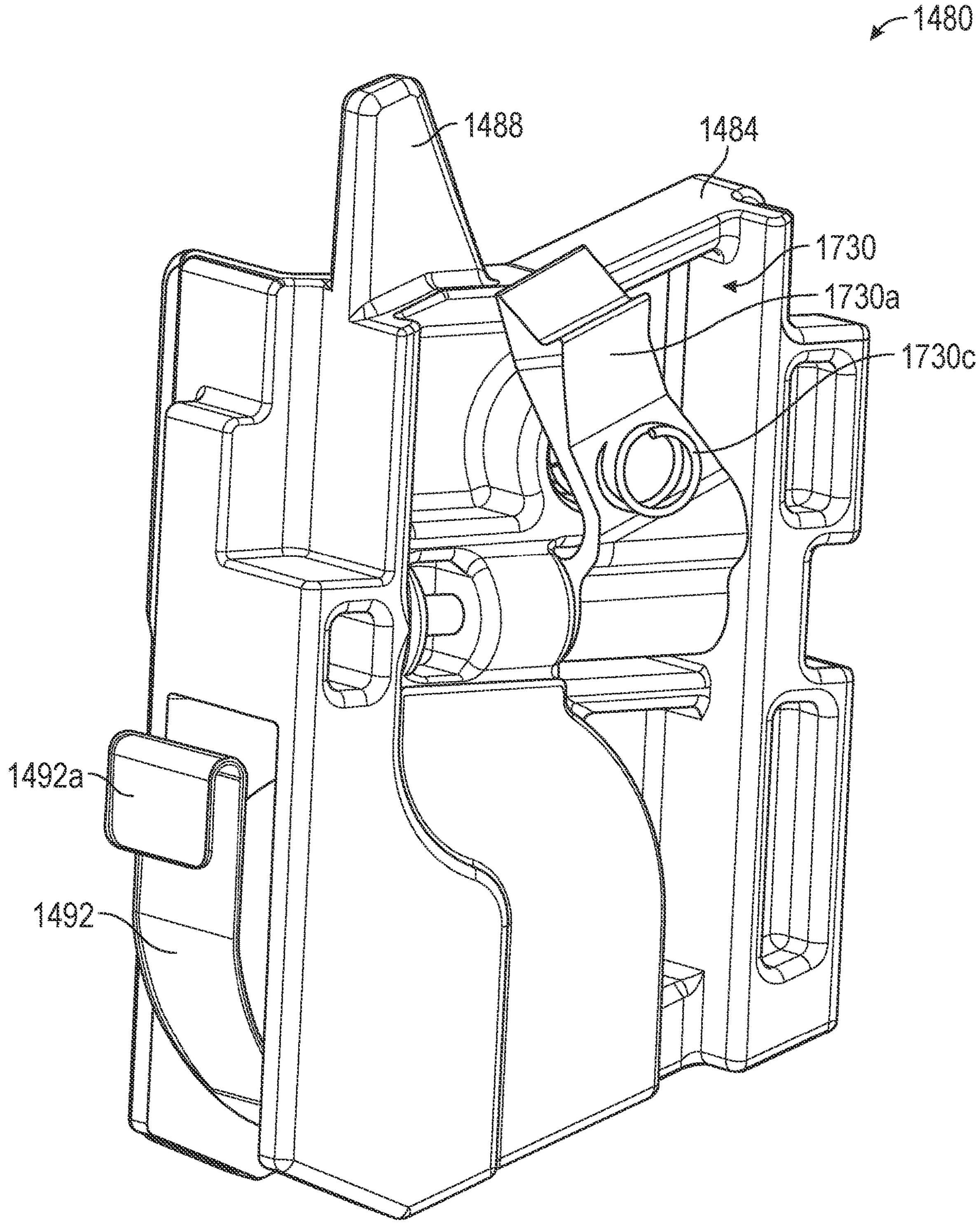
FIG. 42B is another perspective view of a pusher assembly for use with the magazine of the powered fastener driver of FIG. 29.

The nosepiece assembly 700 (e.g., the base portion 712 and the cover portion 716) cooperatively defines a firing channel 724 extending along the driving axis 338. The firing channel 724 is in communication with the opening 236 and the magazine channel 204 of the magazine 200 (e.g., by an opening 728, FIGS. 35A, 35B, and 39, in the base portion 712) for receiving a fastener from the magazine 200. The nosepiece assembly 700 further has a distal end 732 at one end of the firing channel 724. The driver blade 326 is received in the firing channel 724 for driving the fastener from the firing channel 724, out the distal end 732 of the nosepiece assembly 700, and into a workpiece, as discussed above. The cover portion 716 is selectively pivotable relative to the base portion 712 to clear a nail jamb that may prevent a nail from being fired. The cover portion 716 further includes a pocket or recess 734 that receives a portion (e.g., the binder 52) of the collation. The recess 734 extends generally parallel to the driving axis 338 and has a first tapered surface 734*a* adjacent a first end that tapers away from the driving axis 338 and a second tapered surface 734*b* that tapers away from the driving axis 338. The first tapered surface 734*a* defines an angle of about 60 degrees relative to the driving axis 338, although the angle may range from 30 degrees to about 75 degrees in other embodiments. The second tapered surface 734*b* defines an angle of about 55 degrees relative to the driving axis 338, although the angle may range from 30 degrees to 75 degrees in other embodiments. In the embodiments of FIG. 38A, the recess 734 has a top surface 734*c* that is also tapered relative to the driving axis 338 and therefore defines an angle relative to the driving axis 338. Accordingly, a depth D4 of the recess 734 is variable, and generally decreases from the first end to the second end. In this embodiment, the depth D4 ranges from 0.0 mm to 7.0 mm. In the illustrated embodiment, the maximum depth D4 is 3.6 mm. The width WI of the recess 734 is also important. That is, the width W1 of the recess 734 is sized to be wide enough to receive the body 18 of the nails between the tip 30 and the second head 38, 138, but narrow enough that the heads 34, 134, 38, 138 cannot be received therein. In the illustrated embodiment, the width of the recess 734 is 4.25 mm but may range from 3 mm to 5.5 mm.

In the embodiment shown, a second recess 735*a* is positioned on and in communication with the first side of the recess 734 and a third recess 735*b* is positioned on and in communication with the second side of the recess 734. Each of the second and third recesses 735*a*, 735*b* are elongate recesses that extend generally parallel to the driving axis 338. The second recess 735*a* has a generally variable depth D5 that is less than the depth of the recess 734 and the third recess 736*b* and the third recess 735*b* has a generally variable depth D6 that is less than the depth of both the first recess 734. The depth D5, D6 of the each of the second and third recesses 735*a*, 735*b* generally increases in a direction from the first end to the second end. Accordingly, the depth D5 of the second recess 735*a* is less than a depth of the recess 734, and the depth D5 generally increases from the first end of the nosepiece 700 to the recess 734. Similarly, the depth D6 of the third recess 735*b* is less than a depth of the recess 734, and the depth D6 generally increases from the recess 734 to the second end of the nosepiece 700. The maximum depth D5, D6 of each of the second and the third recesses 735*a*, 735*b* is 4 mm. The width W2, W3 of the recesses second and third recesses 735*a*, 735*b* is also important. That is, like the recess 734, the width W2, W3 of each of the second and third recesses 735*a*, 735 is sized to be wide enough to receive the body 18 of the nails between the tip 30 and the second head 38, 138, but narrow enough that the heads 34, 134, 38, 138 cannot be received therein. The width of the second and third recesses 735*a*, 735*b* may range from 3 mm to 5.5 mm.

The recesses 734, 735*a*, 735*b*, and particularly the recess 734, allows for more consistent nail feeding when excess plastic or other material exists on the nails in the collation, while the second recess 735*a* supports the heads 34, 134, 38, 138 of nails 10 and the third recess 735*b* supports the tips 30 such that the heads 34, 38, 134, 138 do not enter the recess 734. Moreover, the recesses 735*a*, 735*b* ensure that the nails 10 leave the nosepiece without interference. The structure of the cover portion 716 therefore ensures that the nails 10 are normally supported in the chamber between at least one of the heads 34, 38, 134, 138 and the tip 30.

With reference to FIGS. 30A, the driver 300 includes a workpiece contact assembly 736 extending along both sides 700*a*, 700*b* of the nosepiece assembly 700. The workpiece contact assembly 736 is shown in greater detail in FIGS. 34 and 46-48 and includes a first end 744 and a second, opposite end 748 that is engageable with a workpiece during a firing operation. The workpiece contact assembly 736 includes a plurality of sections 752, 756 in which each section 752, 756 is formed by a plurality of interconnected segments. A spring 764 is configured to bias the workpiece contact assembly 736 toward an extended position. The workpiece contact assembly 736 is configured to be moved from the extended position toward a retracted position when the workpiece contact assembly 736 is pressed against a workpiece.

Figure 34:
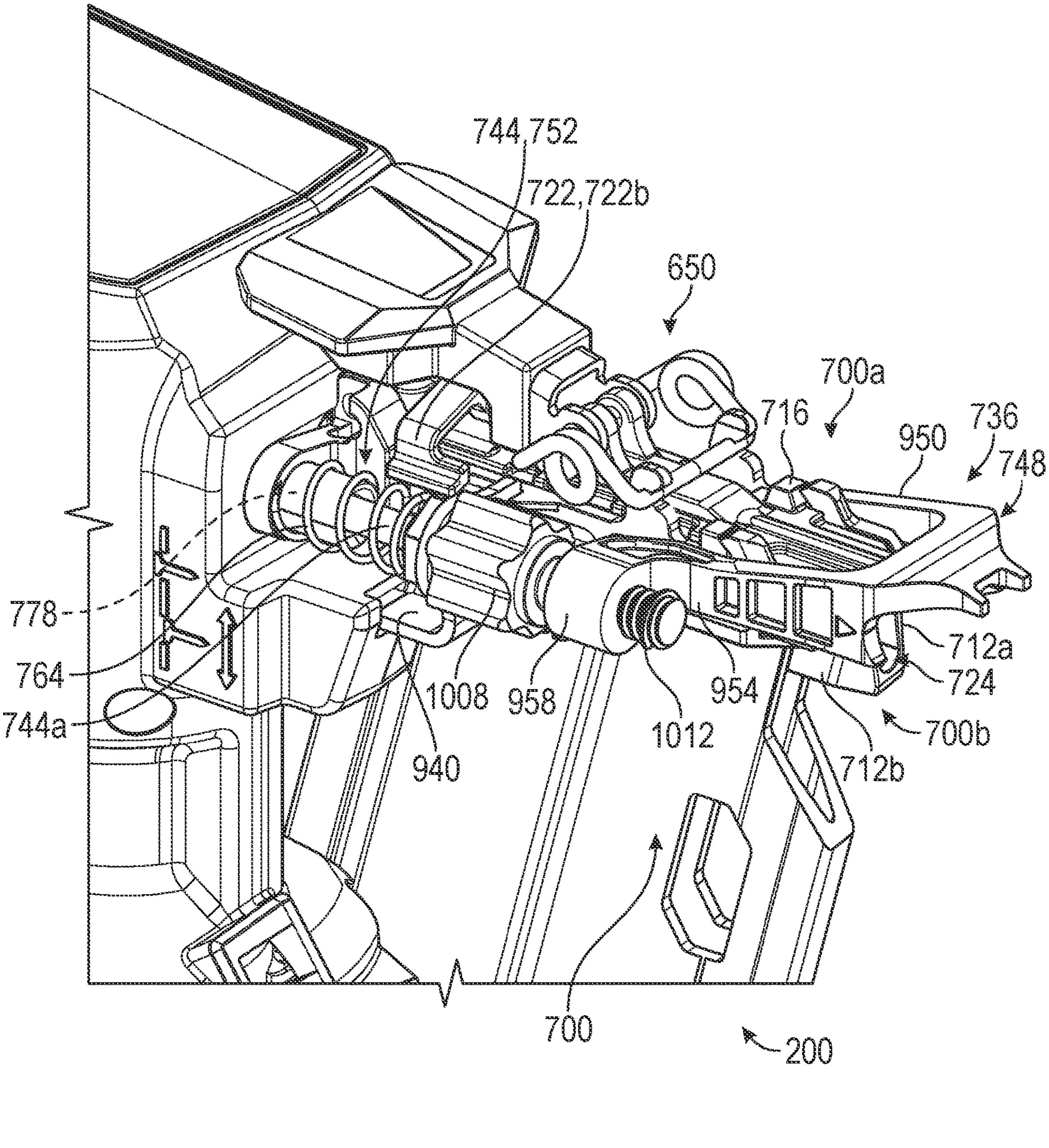
FIG. 34 is a detailed perspective view of the powered fastener driver FIG. 29.
Figure 35A:
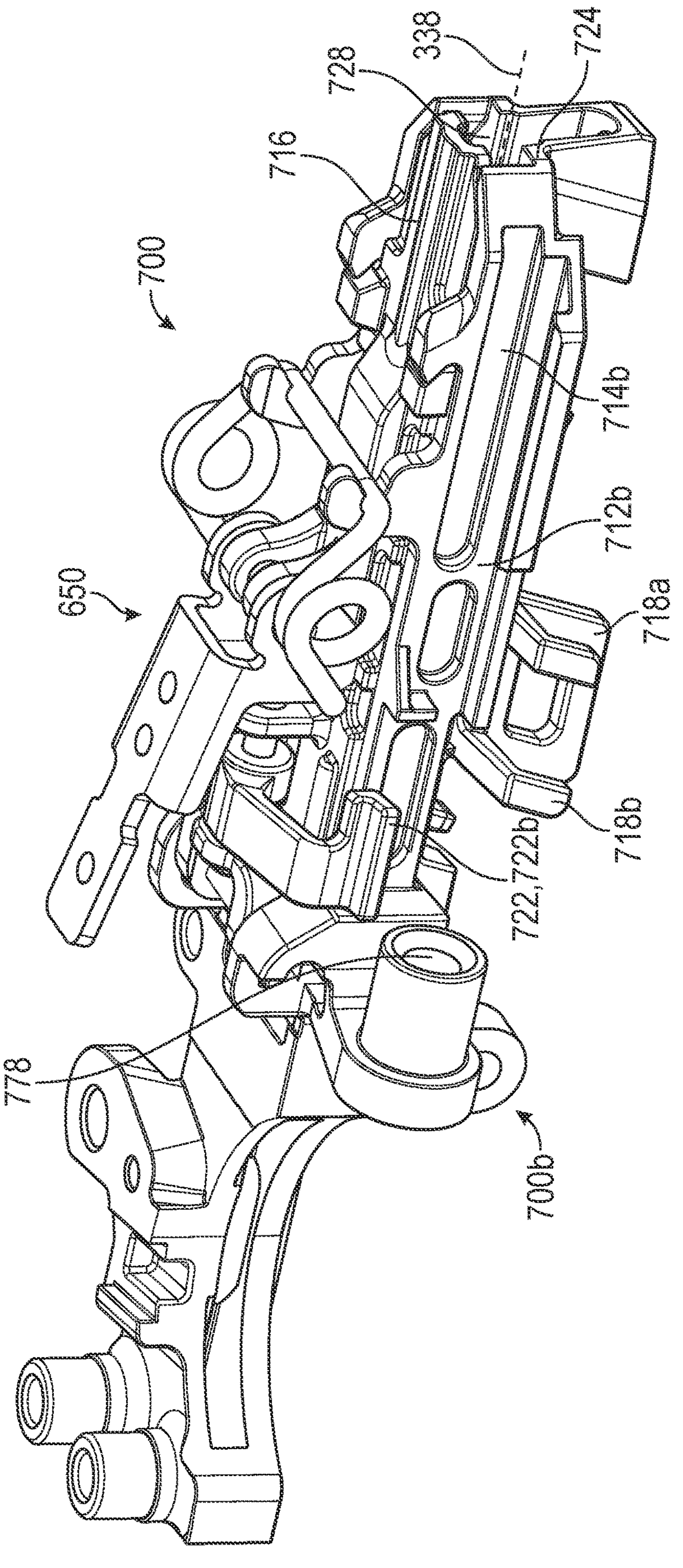
FIG. 35A is another perspective view of the nosepiece assembly of the powered fastener driver FIG. 29.
Figure 35B:
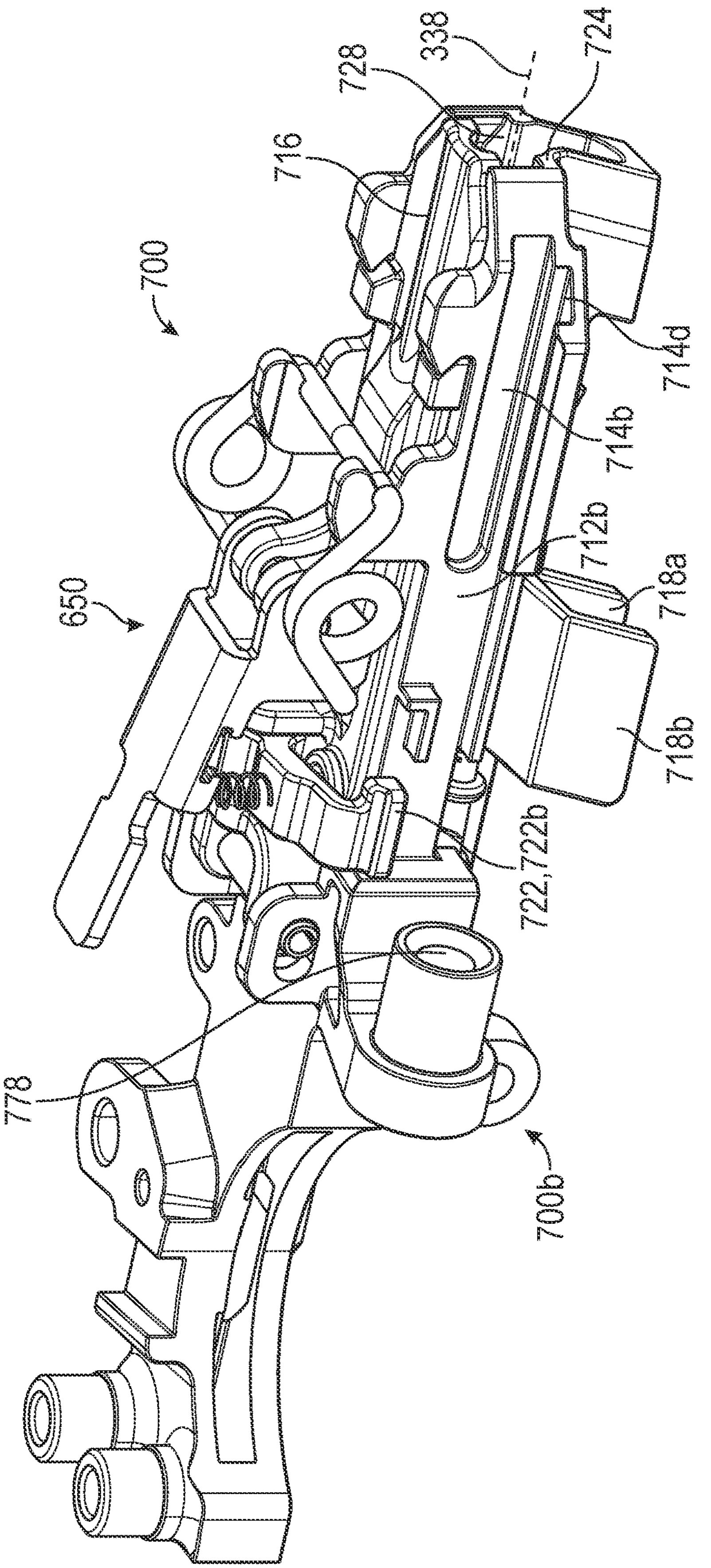
FIG. 35B is another perspective view of a nosepiece assembly for use with the powered fastener driver FIG. 29.
Figure 46:
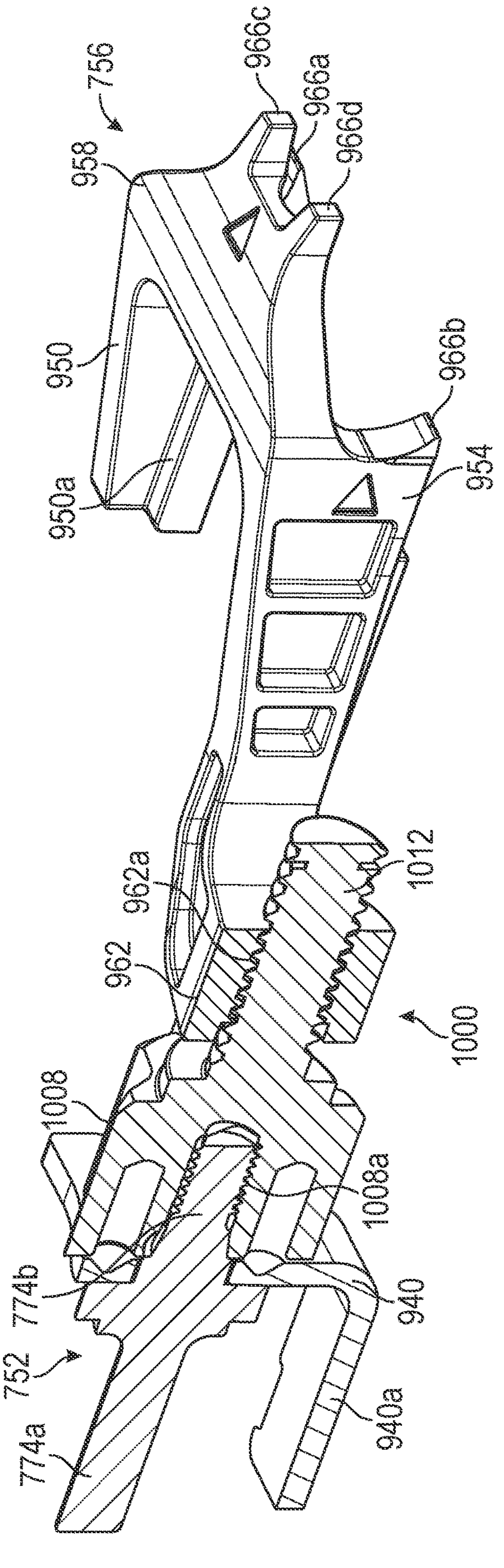
FIG. 46 is a cross-sectional view of the workpiece contact assembly of the powered fastener driver of FIG. 29 taken along the line 46-46 of FIG. 30A.

A first section 752 includes the first end 744 of the workpiece contact assembly 736. The first section 752 includes a body that has a first portion 774*a* and a second portion 774*b*. The first portion 774*a* is movably received in a bore 778 (FIG. 34) of the base portion 712 of the nosepiece assembly 700. The second portion 774*b* is a threaded portion. The spring 764 is seated between the base portion 712 of the nosepiece assembly 700 and the body of the first section 752. The second section 756 includes the second end 748 that is configured to engage a workpiece. As shown in FIGS. 34 and 46, the workpiece contact assembly 736 further includes a dry-fire lockout member 940 (e.g., a dry-fire lockout projection) coupled thereto. The dry-fire lockout member 940 is positioned between the first portion 774*a* and the second portion 774*b* of the first section 752 and specifically is coupled to the body of the first section 752 to move with the workpiece contact assembly 736. The dry-fire lockout member 940 has a portion 940*a* that is movably received in the housing 380 and configured to allow and prevent actuation of the motor 346.

Figure 47A:
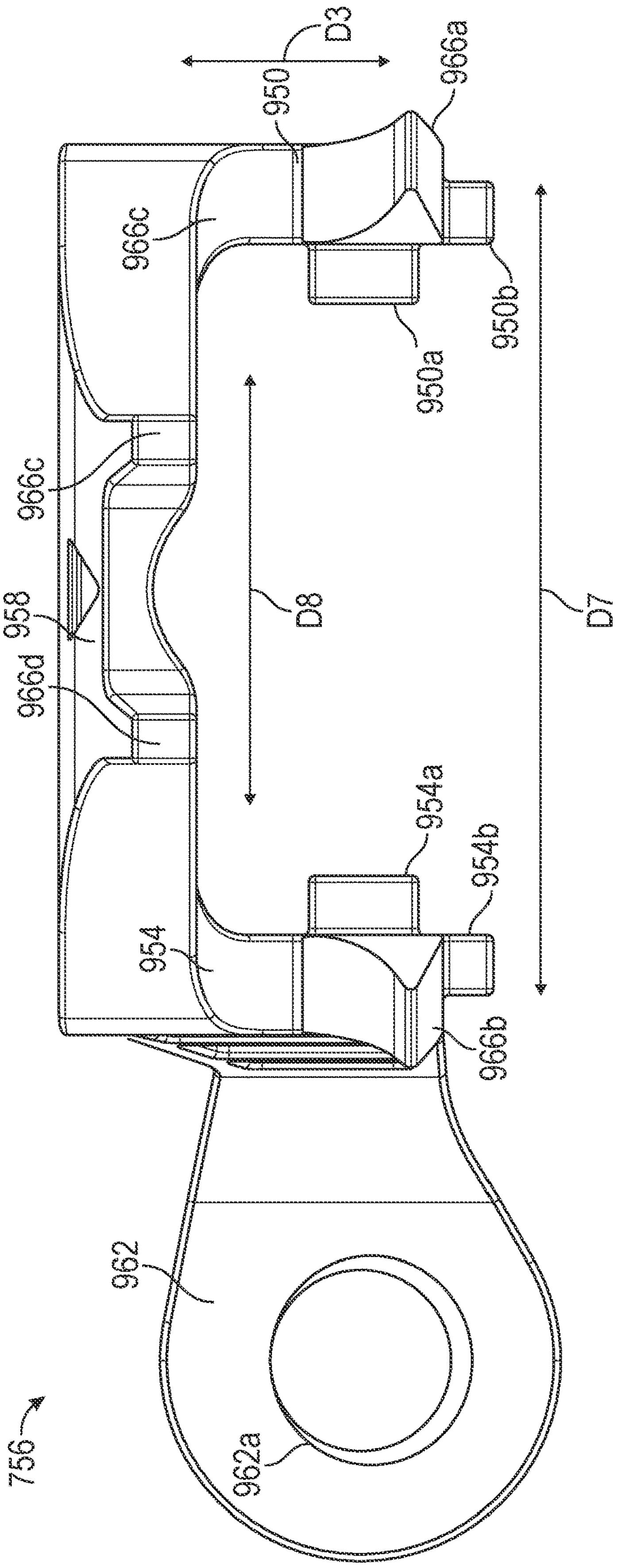
FIG. 47A is a perspective view of a portion of the workpiece contact assembly of the powered fastener driver of FIG. 29.
Figure 47B:
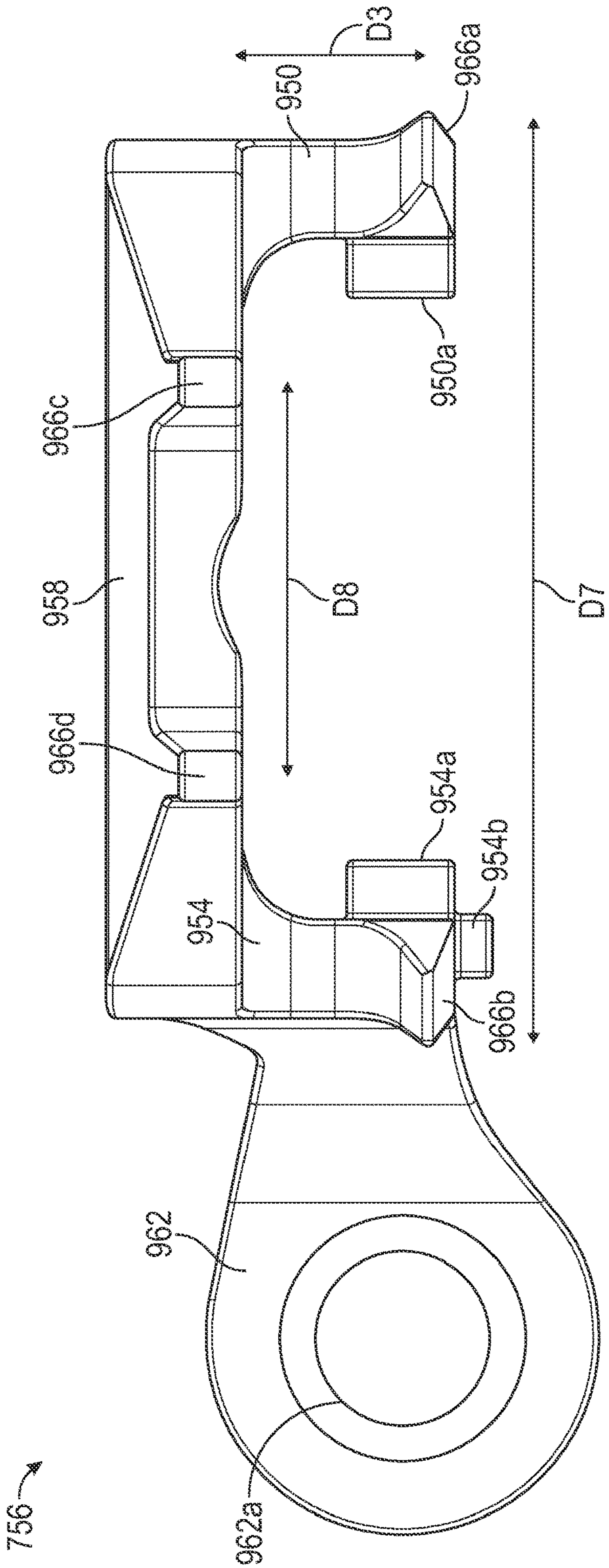
FIG. 47B is a perspective view of a portion of a workpiece contact assembly according to another embodiment for use with nosepiece assembly of FIG. 35B.
Figure 48A:
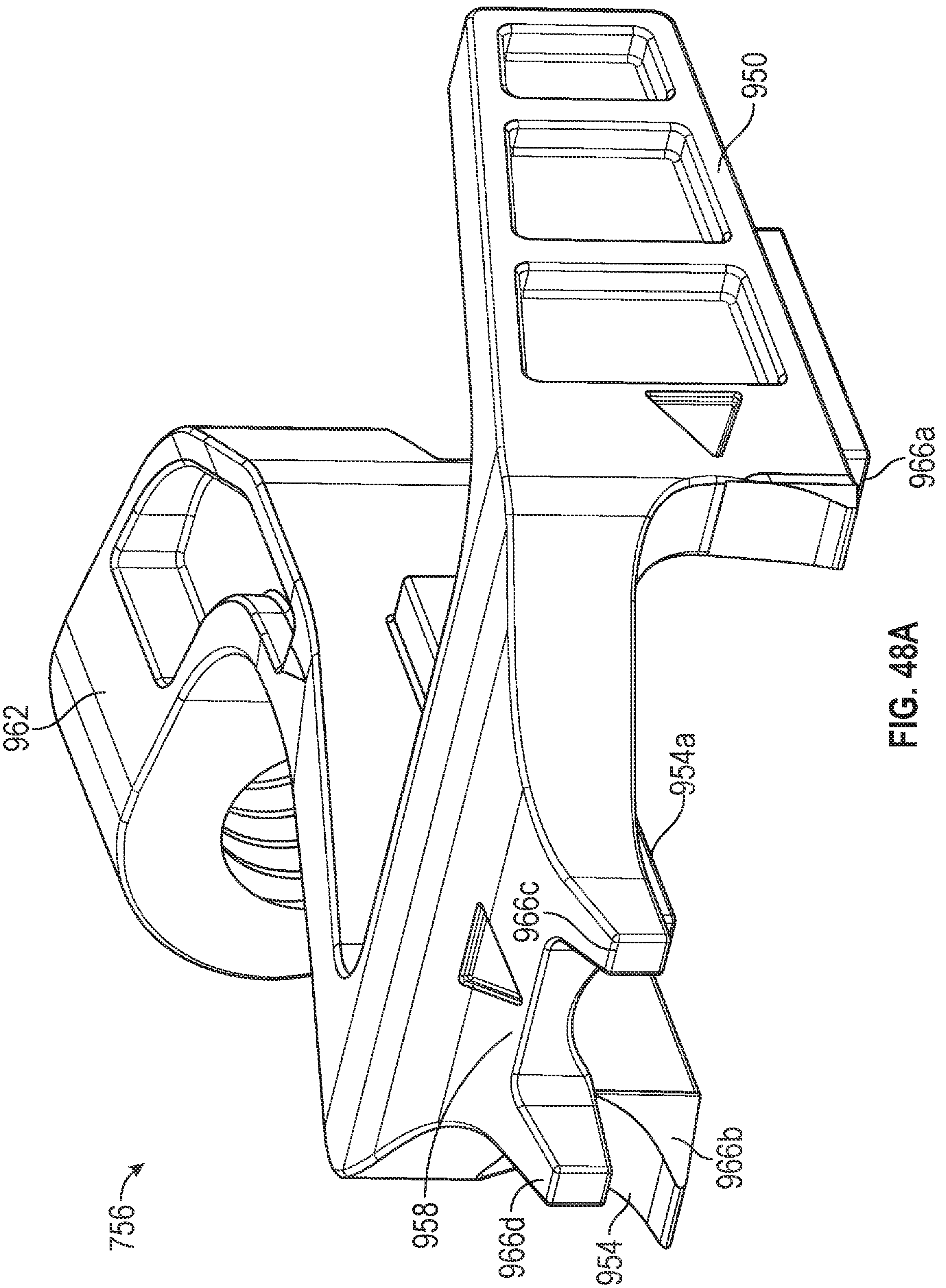
FIG. 48A is another perspective view of a portion of the workpiece contact assembly of the powered fastener driver of FIG. 29.
Figure 48B:
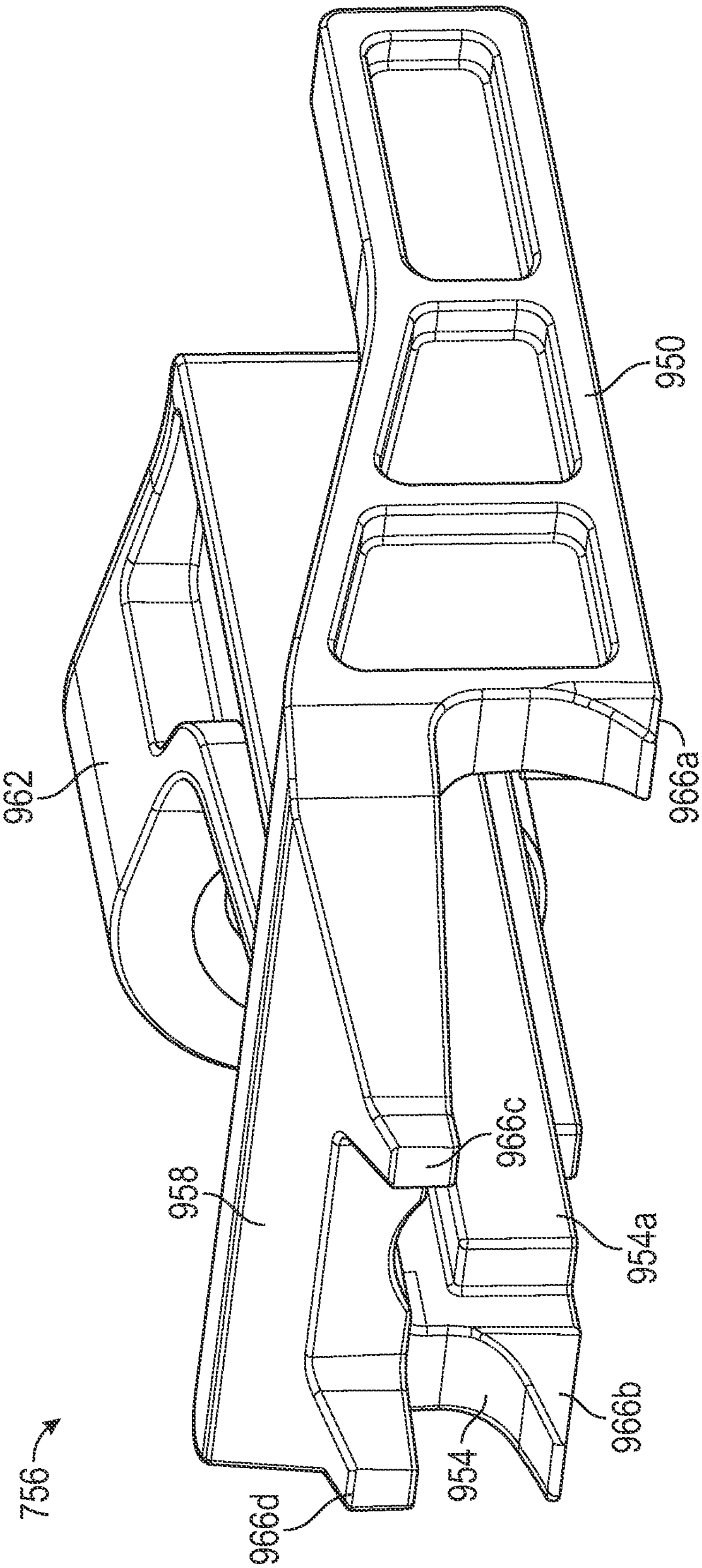
FIG. 48B is a perspective view of a portion of the workpiece contact assembly of FIG. 47B.

The second section 756 includes a body that has a first portion 950 that is positioned adjacent to the first side 712*a* of the base portion 712 of the nosepiece assembly 700, a second portion 954 that is positioned adjacent to the second side 712*b* of the base portion 712 of the nosepiece assembly 700, and a connecting portion 958 (e.g., tip portion) that is coupled between the first portion 950 and the second portion 958. The first portion 950 includes a projection 950*a* extending from a first or inner surface. Similarly, the second portion 954 includes a projection 954*a* extending from a first or inner surface. In the embodiment of FIGS. 47A and 47B, each of the first and second portions 950, 954 further include a projection 954*a*, 954*b* that extends from a second or outer surface thereof. In the illustrated embodiment, the second surface is a surface that intersects the inner surface. In other embodiments, either of the first portion or the second portion 950, 954 may include the projection 950*a*, 954*b*. In the embodiment of FIG. 47B and FIG. 48B, for example, the second portion 954 includes the projection 954*b*. The projections 950*a*, 954*a*, 954*a*, 954*b* are oriented parallel to one another. The projections 950*a*, 954*a* are configured to be received in the respective slots 714*a*, 714*b* in the first and second sides 712*a*, 714*b* of the base portion 712. Similarly, the projections 950*b*, 954*b* is configured to be received in the respective tracks 714*c*, 714*d* of the base portion 712. The second portion 954 includes a coupling portion 962 extending from a second or outer surface. The coupling portion 962 defines a threaded aperture 962*a* extending therethough. The threaded aperture 962*a* is configured to extend parallel to the driving axis 338. The connecting portion 958 wraps around the nosepiece assembly 700 such that a connecting portion 958 is located on a front of the driver 300 (i.e., in front of the nosepiece assembly 700) and below (i.e., downwardly relative) the nosepiece assembly 700. In addition, the connecting portion 958 of the proposed design includes a plurality of tabs 966 for facilitating engagement between the workpiece contact assembly 736 and the workpiece. In the illustrated embodiment, a first tab 966*a* extends from the first portion 950 and a second tab 966*b* extends from the second portion 954. Additionally, third and fourth tabs 966*a*, 966*d* extend from the connecting portion 958. The first and second tabs 966*a*, 966*b* are spaced apart from the third and fourth tabs 966*c*, 966*d* by a distance D3. In the illustrated embodiment, a distal end of the tab 966*a* extending from the first portion 950 and a distal end of the tab 966*b* extending from the second portion 954 are in a first plane, and distal ends of the pair of tabs 966*c*, 966*d* extending form the connection portion 958 are in a second plane spaced apart from the first plane. As shown, the second plane is further from the housing than the first plane. Further, the distal ends of the tabs 966*a*, 966*b* are spaced apart by a distance D7 that is greater than a distance D8 between the distal ends of the tabs 966*c*, 966*d*. Each of the tabs 966*a*, 966*b*, 966*c*, 966*d* extend generally away from the driving axis 338.

In the embodiment described herein, the first portion 950 is positioned on the first side 700*a* of the nosepiece assembly 700 and slidable relative to the base portion 712, the second portion 954 is positioned on the second side 700*b* of the nosepiece assembly 700 and is slidable relative to the base portion 712, and the connecting portion 958 overlaps the nosepiece assembly 700 (e.g., is positioned on a side of the nosepiece assembly that is opposite the magazine 200 or is forward of the nosepiece assembly 700) and is also below the distal end 732 of the nosepiece assembly 700 at least a portion of the nosepiece assembly 700 (e.g., downward relative to the nosepiece assembly 700). In contrast, in conventional designs, the second section 756 of the workpiece contact assembly 736 is completely in front of the nosepiece assembly 700, to the side of the nosepiece assembly 700, or is on the side and wraps around a rear of the nosepiece assembly 700 such that a connecting portion is located rearward of the nosepiece assembly 700.

The first and second sections 752, 756 are coupled together by a depth of drive adjustment mechanism 1000, which adjusts the effective length of the workpiece contact assembly 736. With reference to FIGS. 2B and 2C, the depth of drive adjustment mechanism 1000 includes an adjustment knob 1008 and a screw portion 1012 extending from the adjustment knob 1008. The screw portion 1012 is threadably received in the threaded aperture 962*a* of the second section 756. The adjustment knob 1008 includes a threaded bore 1008*a* that rotatably receives the second portion 774*b* of the first section 752. As noted above, the screw portion 1012 extends between the first section 752 and the second section 756 of the workpiece contact assembly 736. That is, the second section 756 is threadably coupled to the screw portion 1012 via engagement between the screw portion 1012 and the threaded aperture 962*a*. Furthermore, the first section 752, and therefore the screw portion 1012, are coupled for co-rotation with the adjustment knob 1008. Accordingly, the screw portion 1012 and the adjustment knob 1008 are rotatably supported by the first section 752. Rotation of the adjustment knob 1008 axially threads the second section 756 along the screw portion 1012 for adjusting a protruding length of the workpiece contact assembly 736 relative to the distal end 732 of the nosepiece assembly 700. More specifically, rotation of the adjustment knob 1008 moves the second section 756 relative to the first section 752 for adjusting an effective length of the workpiece contact assembly 736. As such, the adjustment knob 1008 may be termed as an actuator.

The depth of drive adjustment mechanism 1000 adjusts the depth to which a fastener is driven into the workpiece. In particular, the depth of drive adjustment mechanism 1000 adjusts the length that the workpiece contact assembly 736 protrudes relative to the distal end 732 of the nosepiece assembly 700, thereby changing the distance between the distal end 732 of the nosepiece assembly 700 and the workpiece contact assembly 736 in the extended position. In other words, the depth of drive adjustment mechanism 1000 adjusts how far the workpiece contact assembly 736 extends past the nosepiece assembly 700 for abutting with a workpiece. The larger the gap between the distal end 732 of the nosepiece assembly 700 and the workpiece, the shallower the depth a fastener will be driven into the workpiece. As such, the position of the workpiece contact assembly 736 with respect to the nosepiece assembly 700 is adjustable to adjust the depth to which a fastener is driven.

With reference to FIGS. 30A, 38A, and FIGS. 42A-42B, the magazine 200 further includes a pusher assembly 1480. The pusher assembly 1480 is slidably coupled to the magazine 200 and configured to bias the fasteners in the magazine 200 toward the nosepiece assembly 700. Additionally, the pusher assembly 1480 is configured to ensure that the nails are head biased, rather than tip biased, as will be discussed below. The illustrated pusher assembly 1480 includes a first portion or pusher body 1484, a pusher finger 1730 pivotably coupled to the pusher body 1484, and a second portion or dry-fire lockout member 1488 (e.g., dry-first lockout post or dry-fire lockout extension) fixedly coupled to and extending from the pusher body 1484. In the illustrated embodiment, the dry-fire lockout member 1488 extends from the pusher body 1484 in a direction towards the nosepiece assembly. The pusher assembly 1480 further includes a spring assembly that has a roller (not shown) supported by the pusher body 1484 and a spring 1492 supported by the roller. A stationary end 1492*a* of the spring 1492 is coupled to the magazine 200. The spring assembly is configured to exert a biasing force on the pusher assembly 1480 for moving the pusher assembly 1480 in the direction of arrow 1496 (FIG. 29).

The pusher finger 1730 includes a first end 1730*a* that is positioned between the pusher body 1484 and the magazine 200 and a second end 1730*b* that extends outwardly from the pusher body 1484. The pusher finger 1730 is pivotably coupled to the pusher body 1484 by a pin (not shown) extending through the pusher finger 1730 at a location between the first end 1730*a* and the second end 1730*b*. The pusher finger 1730 is movable between an engaged position in which the first end 1730*a* is positioned within the fastener channel 204 and configured to engage the last fastener in the fastener channel 204 (FIG. 38A) and a disengaged position in which the first end 1730*a* is at least partially removed from the fastener channel 204. A spring 1730*c* biases the pusher finger 1730 into the engaged position. A force exerted on the second end 1730*b* of the pusher finger 1730 temporarily moves the pusher finger 1730 from the engaged position to the disengaged position such that the pusher assembly 1480 is movable relative to the magazine 200. When the force is removed from the second end 1730*b* of the pusher finger 1730, the bias of the spring returns the pusher finger 1730 to the engaged position.

As shown in the FIG. 38A, the first end 1730*a* of the finger 1730 is configured to engage the last nail between the binder 52 and the second head 38, 138. In the illustrated embodiment, the collation has a first binder segment 52 positioned adjacent the tip 30 and a second binder segment 52 positioned adjacent the second head 38, 138 and the first end 1730*a* of the finger 1730 is positioned between the second binder segment 52 and the second head 38, 138. As shown, therefore, the first end 1730*a* of the finger 1730 is configured to be positioned adjacent to the groove 252 and between the rails 274 of the magazine 200. This placement of the finger 1730 causes the nails to be head biased, rather than tip biased in which the finger 1730 engages the nails between the binder 52 and tip 30. That is, the finger 1730 biases the nails at a location closer to the heads 34, 38, 134, 138 than the tips 30. This configuration helps to prevent the nails from being jammed by ensuring that the heads 34, 38, 134, 138 are appropriately positioned within the firing channel 724 for engagement by the driver blade 326.

With reference to FIG. 34, the powered fastener driver 300 further includes a dry-fire lockout assembly 1650. The dry-fire lockout assembly 1650 prevents the powered fastener driver 300 from operating when the number of fasteners remaining in the magazine 200 drops below a predetermined value. The dry-fire lockout mechanism 1650 includes a dry-fire lockout member 1488 that is integrated with the pusher assembly 22 and the dry-fire lockout link 722 that is integrated in the nosepiece assembly 700. The dry-fire lockout assembly 1650 of the illustrated embodiment therefore includes the dry-fire lockout member 1488 of the pusher assembly 1480, the dry-fire locket link 722 of the cover portion 716, and the dry-fire lockout member 940 of the workpiece contact assembly 736. In the illustrated embodiment, the dry-fire lockout member 1488 is fixedly coupled to the pusher body 1484, as mentioned above. Moreover, as shown, the dry-fire lockout member 1488 is not positioned on the same side of the nosepiece assembly 700 as the second end 722*b* of the dry-fire lockout link 722.

Figure 43:
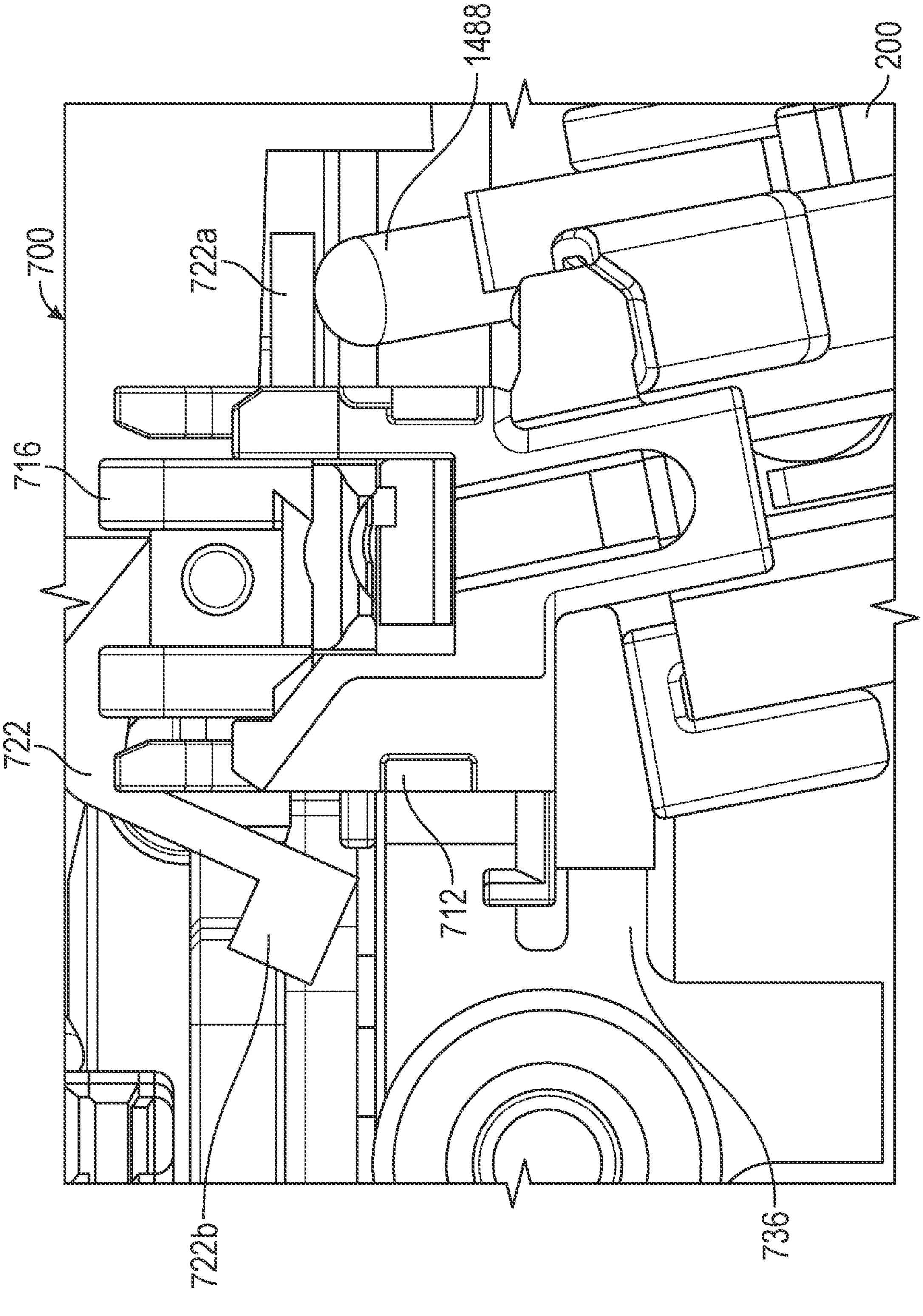
FIG. 43 is a schematic view of a dry-fire lockout mechanism of the powered fastener driver of FIG. 29 in an unblocked position.
Figure 44:
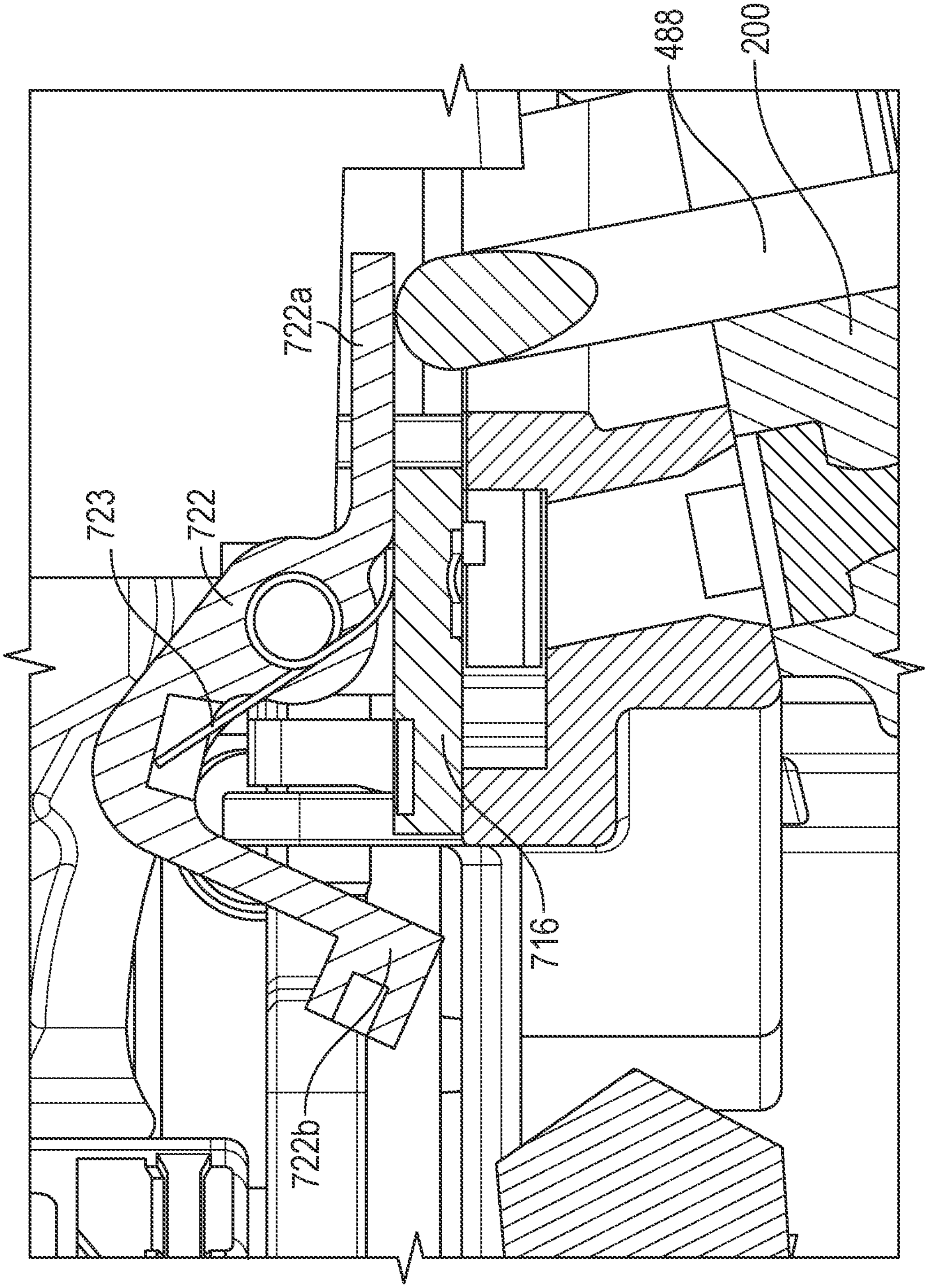
FIG. 44 is another schematic view of a dry-fire lockout mechanism of the powered fastener driver of FIG. 29 in the unblocked position.

As shown in FIGS. 43-44, when there are more than the predetermined number of fasteners in the magazine 200, the dry-fire lockout member 1488 of the pusher assembly 1480 is spaced apart from the first end 722*a* of the dry-fire lockout link 722 such that second end 722*b* of the dry-fire lockout link 722 is in the unblocked position and therefore is spaced apart from a path of movement of the workpiece contact assembly 736 (e.g., the dry-fire lockout member 940). The dry-fire lockout link 722 is biased into the unblocked position (e.g., by a spring 723, shown in FIG. 44, positioned between the dry-fire lockout link 722 and the base portion 716). Accordingly, the second end 722*b* of the dry-fire lockout link 722 is configured to allow the movement of the workpiece contact assembly 736 from the extended position toward the retracted position when there are more than the predetermined number of fasteners remaining in the magazine 200.

Figure 45:
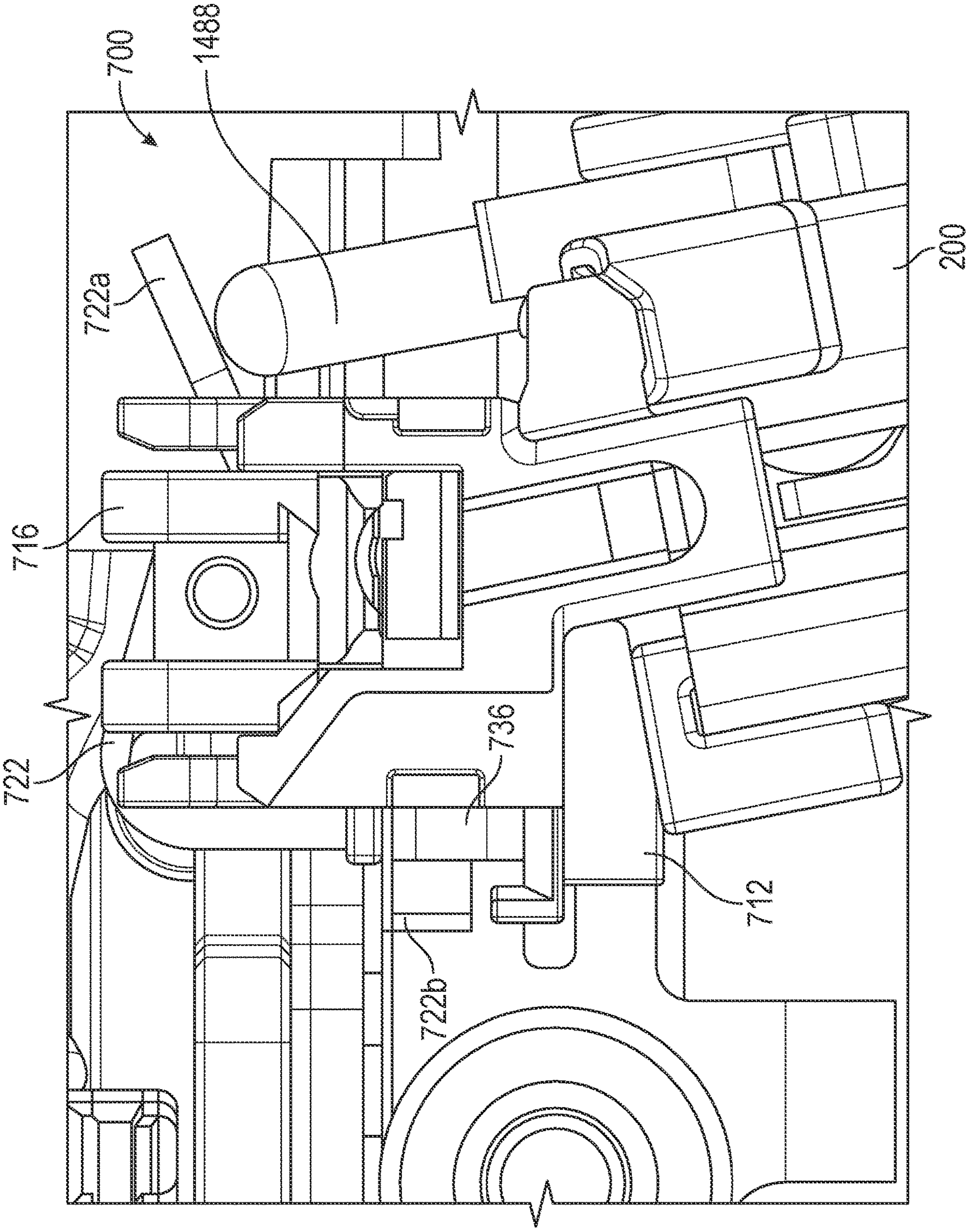
FIG. 45 is a schematic view of a dry-fire lockout mechanism of the powered fastener driver of FIG. 29 in a blocked position.

As shown in FIGS. 34 and 45, when there number of fasteners is equal to the predetermined number of fasteners in the magazine 200, the dry-fire lockout member 1488 of the pusher assembly 1480 contacts the first end 722*a* of the dry-fire lockout link 1488 to move the second end 722*b* of the dry-fire lockout link 722 into the blocked position in which the second end 722*b* is positioned in a path of movement of the workpiece contact assembly 736 (e.g., dry-fire lockout member 940). That is, a force on the first end of the dry-fire lockout link 722 by the dry-fire lockout member 1488 overcomes the bias of the spring 723 to move the dry-fire lockout link 722 form the unblocked position to the blocked position. Accordingly, the second end 722*b* of the dry-fire lockout link 722 is configured to block the movement of the workpiece contact assembly 736 from the extended position toward the retracted position when there is a predetermined number of fasteners remaining in the magazine 200.

Various features of the invention are set forth in the following claims.

The invention claimed is:

1. A fastening device comprising:
- a magazine including
  - a magazine channel having a rectangular cross-sectional shape and configured to receive at least one of a first head of a fastener and a second head of the fastener;
  - a magazine slot interconnected with the magazine channel and configured to receive a body of the fastener;
  - an end cap positioned opposite the magazine channel and the magazine slot and including an end cap channel having a first compartment interconnected with and spaced from a second compartment by a connector compartment, the first compartment configured to receive the first head of the fastener and the second compartment configured to receive the second head of the fastener, and
  - wherein a first distance is defined between the first compartment and the second compartment, and the first and second compartments and the first distance cooperate to define a parameter of the fastener that is receivable in the magazine, and
- a nosepiece assembly including a firing channel from which consecutive fasteners from the magazine are driven along a driving axis, the nosepiece assembly including a base portion coupled to the magazine and a cover portion pivotally coupled to the base portion,
- wherein the base portion and the cover portion cooperatively define the firing channel,
- wherein the cover portion includes a recess that extends generally parallel to the firing channel,
- wherein the recess has a width that is wider than a width of the body of the fastener but narrower than a width of either the first head or the second head, and
- wherein the recess is a first recess and further comprising a second recess positioned on and in communication with a first side of the first recess and a third recess positioned on and in communication with a second side of the first recess, the first recess defining a first depth, the second recess defining a second depth that is less than the first depth, and the third recess defining a third depth that is less than the first depth.

2. The fastening device of claim 1, wherein the first distance between the first compartment and the second compartment is 10 mm to 20 mm.

3. The fastening device of claim 1, wherein the first distance between the first compartment and the second compartment is greater 10.9 mm.

4. The fastening device of claim 1, wherein the end cap channel has a body compartment interconnected with the second compartment.

5. The fastening device of claim 1, wherein the end cap channel further includes a connector compartment connecting the first compartment to the second compartment.

6. The fastening device of claim 1, further comprising a guide positioned within in the magazine channel, the guide having a rectangular cross-sectional shape, the guide defining a guide slot that is positioned within the magazine channel and aligned with the magazine slot.

7. The fastening device of claim 1, wherein the first recess includes a first tapered surface at a first end thereof and a second tapered surface at a second end thereof, the first tapered surface being positioned at an angle relative to the driving axis that is different from an angle at which the second tapered surface is positioned relative to the driving axis.

8. The fastening device of claim 1, wherein the first depth is variable along a length of the first recess, the second depth is variable along a length of the second recess, and a third depth is variable along a length of the third recess.

9. The fastening device of claim 1, wherein each of the second recess and the third recess defines a width that is less than a maximum diameter of the fastener.

10. A fastening device comprising:

a fastener including a body having a tip and a second end opposite the tip, a first head positioned at the second end, and a second head positioned between the tip and the second end;

a magazine including a magazine channel configured to receive the first head of the fastener;

a magazine slot interconnected with the magazine channel and configured to receive a body and the second head of the fastener;

a guide positioned within the magazine channel, the guide circumscribing the magazine channel, the guide defining a guide slot that is positioned within the magazine channel and aligned with the magazine slot;

an end cap channel positioned opposite the magazine channel and the magazine slot and having a first compartment interconnected with and spaced from a second compartment by a connector compartment, the first compartment configured to receive the first head and the second compartment configured to receive the second head, wherein a first distance is defined between the first head and the second head, wherein a second distance is defined between the first compartment and the second compartment, wherein the second distance is the same as the first distance and limits at least one parameter of the fastener that is receivable in the magazine, and wherein a third distance defined between opposite ends of the magazine slot is greater than a fourth distance defined between opposite ends of the guide slot, a nosepiece assembly including a firing channel from which consecutive fasteners from the magazine are driven along a driving axis, the nosepiece assembly including a recess that extends generally parallel to the firing channel and is on an opposite side of the firing channel from the magazine, wherein the recess has a width that is wider than a width of the body of the fastener but narrower than a width of either the first head or the second head, and wherein the recess is a first recess and further comprising a second recess positioned on and in communication with a first side of the first recess and a third recess positioned on and in communication with a second side of the first recess, the first recess defining a first depth, the second recess defining a second depth that is less than the first depth, and the third recess defining a third depth that is less than the first depth.

11. The fastening device of claim 10, wherein the second distance between the first compartment and the second compartment is 10 mm to 20 mm.

12. The fastening device of claim 10, wherein the second distance between the first compartment and the second compartment is greater 10.9 mm.

13. The fastening device of claim 10, wherein the end cap channel has a body compartment interconnected with the second compartment.

14. The fastening device of claim 10, wherein the end cap channel further includes a connector compartment connecting the first compartment to the second compartment.

15. A fastening device comprising:

a fastener including a body having a tip and a second end opposite the tip, a first head positioned at the second end, and a second head positioned between the tip and the second end; and a magazine including a magazine channel configured to receive the first head of the fastener;

a magazine slot interconnected with the magazine channel and configured to receive a body and the second head of the fastener;

an end cap channel positioned opposite the magazine channel and the magazine slot and having a first compartment and a second compartment that are connected via a connector compartment;

wherein the first head is received in the first compartment and the second head is received in the second compartment, and a nosepiece assembly including a firing channel from which consecutive fasteners from the magazine are driven along a driving axis, the nosepiece assembly including a recess that extends generally parallel to the firing channel and is on an opposite side of the firing channel from the magazine, wherein the recess has a width that is wider than a width of the body of the fastener but narrower than a width of either the first head or the second head, and wherein the recess is a first recess and further comprising a second recess positioned on and in communication with a first side of the first recess and a third recess positioned on and in communication with a second side of the first recess, the first recess defining a first depth, the second recess defining a second depth that is less than the first depth, and the third recess defining a third depth that is less than the first depth.

16. The fastening device of claim 15, wherein a first distance between the first compartment and the second compartment is 10 mm to 20 mm.

17. The fastening device of claim 15, wherein a first distance between the first compartment and the second compartment is greater 10.9 mm.

18. The fastening device of claim 15, wherein the end cap channel has a body compartment interconnected with the second compartment.

19. The fastening device of claim 15, wherein a first distance between the first head and the second head is 10 mm to 20 mm.

20. The fastening device of claim 15, wherein a first distance between the first head and the second head is greater 10.9 mm.

* * * * *